(12) United States Patent
Ling et al.

(10) Patent No.: US 9,723,528 B2
(45) Date of Patent: Aug. 1, 2017

(54) METHODS AND APPARATUS TO PROVIDE PACKET SWITCHED SERVICE CONTINUITY DURING CIRCUIT SWITCHED FALLBACK OPERATION

(75) Inventors: Xinhua Ling, Waterloo (CA); Xiaoming Zhao, Plano, TX (US); Stefano Faccin, Hayward, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 230 days.

(21) Appl. No.: 13/237,890

(22) Filed: Sep. 20, 2011

(65) Prior Publication Data
US 2012/0069817 A1  Mar. 22, 2012

Related U.S. Application Data

(60) Provisional application No. 61/384,655, filed on Sep. 20, 2010.

(51) Int. Cl.
*H04W 36/00* (2009.01)
*H04W 36/14* (2009.01)

(52) U.S. Cl.
CPC ........ *H04W 36/14* (2013.01); *H04W 36/0022* (2013.01)

(58) Field of Classification Search
USPC ....... 370/328, 331, 352, 400, 401, 466, 476, 370/310; 455/436, 437, 438, 439, 444, 455/445, 442, 453
See application file for complete search history.

(56) References Cited

U.S. PATENT DOCUMENTS

| | | | | |
|---|---|---|---|---|
| 8,185,152 | B1 * | 5/2012 | Goldner | 455/552.1 |
| 8,270,978 | B1 * | 9/2012 | Faccin et al. | 455/438 |
| 2005/0202828 | A1 * | 9/2005 | Pecen et al. | 455/453 |
| 2006/0111115 | A1 | 5/2006 | Marin et al. | |
| 2007/0041360 | A1 * | 2/2007 | Gallagher et al. | 370/352 |
| 2007/0218911 | A1 | 9/2007 | Islam et al. | |
| 2009/0017826 | A1 * | 1/2009 | Shaheen | 455/442 |
| 2009/0258671 | A1 * | 10/2009 | Kekki | H04W 76/027 455/552.1 |
| 2009/0268654 | A1 * | 10/2009 | Baglin et al. | 370/311 |

(Continued)

FOREIGN PATENT DOCUMENTS

| CN | 101374341 | | 2/2009 |
|---|---|---|---|
| EP | 2166724 | A1 * | 3/2010 |

(Continued)

OTHER PUBLICATIONS

3GPP; Technical Specification Group Services and System Aspects; CS fallback in EPS; Stage 2 (Release 10), 3GPP Standard; 3GPP TS 23.272, V10.0.0; Jun. 10, 2010, whole document.*

(Continued)

*Primary Examiner* — Hanh N Nguyen
*Assistant Examiner* — Jose L Perez
(74) *Attorney, Agent, or Firm* — Fish & Richardson P.C.

(57) ABSTRACT

Methods and apparatus to provide packet switched service continuity during circuit switched fallback operation are described. One example method includes determining that a target system does not support packet switched handover; determining if non-3GPP access for packet switched service is available; and triggering handover to the non-3GPP access.

28 Claims, 75 Drawing Sheets

(56) References Cited

U.S. PATENT DOCUMENTS

| | | | |
|---|---|---|---|
| 2009/0274122 A1* | 11/2009 | Wu | 370/331 |
| 2010/0020765 A1* | 1/2010 | Cheng et al. | 370/331 |
| 2010/0080172 A1* | 4/2010 | Jin et al. | 370/328 |
| 2010/0098023 A1* | 4/2010 | Aghili | H04W 36/0022 370/331 |
| 2010/0142483 A1* | 6/2010 | Wu et al. | 370/331 |
| 2010/0172301 A1* | 7/2010 | Watfa | H04W 36/0022 370/328 |
| 2010/0195616 A1* | 8/2010 | Vikberg et al. | 370/331 |
| 2010/0279677 A1* | 11/2010 | Dwyer | H04W 48/16 455/422.1 |
| 2010/0297979 A1* | 11/2010 | Watfa et al. | 455/404.1 |
| 2011/0090794 A1* | 4/2011 | Cherian et al. | 370/235 |
| 2011/0096706 A1* | 4/2011 | Ramasamy et al. | 370/310 |
| 2012/0063414 A1* | 3/2012 | Ramachandran | 370/331 |

FOREIGN PATENT DOCUMENTS

| | | |
|---|---|---|
| EP | 2192734 | 6/2010 |
| WO | WO 2009018164 A2 * | 2/2009 |
| WO | WO 2010044730 A2 * | 4/2010 |

OTHER PUBLICATIONS

3GPP (3GPP TS 44.060 V10.1.0 3rd Generation Partnership Project; Technical Specification Group GSM/EDGE Radio Access Network; GPRS; MS—BSS interface; RLC/MAC protocol (Release 10) (Jun. 2010)), whole document.*

3GPP TS 23.261 V10.0.0 (3rd Generation Partnership Project; Technical Specification Group Services and System Aspects; IP flow mobility and seamless Wirless Local Area Network (WLAN) offload; Stage 2 (Release 10)), Jun. 2010, pp. 7, 9-11, 14-15.*

3GPP TR 23.861 V1.3.0, Sep. 2009, 3rd Generation Partnership Project; Technical Specification Group Services and System Aspects; Multi access PDN connectivity and IP flow mobility (Release 9), whole document.*

3GPP TS 23.272 V10.0.0, Jun. 2010, 3rd Generation Partnership Project; Technical Specification Group Services and System Aspects; Circuit Switched (CS) fallback in Evolved Packet System (EPS); Stage 2 (Release 10), whole document.*

Pfaffenberger, Webster's New World Computer Dictionary, entry for "Central Processing Unit", Hungry Minds, Inc., Ninth Edition, 2001, p. 68.*

Nokia Siemens Networks, Hitachi, Huawei, KDDI, Kyocera, Motorola, NEC, Qualcomm Europe ("CR to 36.331 for Enhanced CSFB to 1xRTT with concurrent PS handover", R2-095218) 3GPP TSG-RAN WG2 #67, Aug. 24-28, 2009, whole document.*

3GPP TS 23.261 V10.0.0 (3rd Generation Partnership Project; Technical Specification Group Services and System Aspects; IP flow mobility and seamless Wireless Local Area Network (WLAN) offload; Stage 2 (Release 10), Jun. 2010, whole document.*

3GPP TR 23.861 V1.3.0 (3rd Generation Partnership Project; Technical Specification Group Services and System Aspects; Multi access PDN connectivity and IP flow mobility (Release 9)), Sep. 2009, whole document.*

3GPP TS 23.272 V10.0.0, (3rd Generation Partnership Project; Technical Specification Group Services and System Aspects; Circuit Switched (CS) fallback in Evolved Packet System (EPS); Stage 2 (Release 10)), Jun. 2010, whole document.*

3GPP, 3GPP TS 23.327 V9.0.0 (Dec. 2009), 3rd Generation Partnership Project; Technical Specification Group Services and System Aspects; Mobility between 3GPP-Wireless Local Area Network (WLAN) interworking and 3GPP systems (Release 9), Dec. 2009, 3GPP, pp. 6, 8, 12, 17.*

3GPP, 3GPP TS 23.261 V10.0.0 (3rd Generation Partnership Project; Technical Specification Group Services and System Aspects; IP flow mobility and seamless Wireless Local Area Network (WLAN) offload; Stage 2 (Release 10)), Jun. 2010, pp. 4-5, 14-15.*

3GPP, 3GPP TR 23.861 V1.3.0 (Sep. 2009) (3rd Generation Partnership Project; Technical Specification Group Services and System Aspects; Multi access PDN connectivity and IP flow mobility (Release 9)), Sep. 2009, pp. 6, 41.*

3GPP, 3GPP TS 23.272 V10.0.0 (Jun. 2010) (3rd Generation Partnership Project; Technical Specification Group Services and System Aspects; Circuit Switched (CS) fallback in Evolved Packet System (EPS); Stage 2 (Release 10)), Jun. 2010, pp. 7, 25.*

3GPP, 3GPP TS 23.221 V9.4.0 (Jun. 2010), 3rd Generation Partnership Project; Technical Specification Group Services and System Aspects; Architectural requirements (Release 9), Jun. 2010, pp. 6, 35.*

Nokia Siemens Networks, Hitachi, Huawei, KDDI, Kyocera, Motorola, NEC, Qualcomm Europe ("CR to 36.331 for Enhanced CSFB to 1xRTT with concurrent PS handover", R2-095218) 3GPP TSG-RAN WG2 #67, Aug. 24-28, 2009, whole document.*

International Searching Authority, Partial International Search issued in PCT/US2011/052425, 3 pages.

3rd Generation Partnership Project; Technical Specification Group GSM/EDGE, Radio Access Network; General Packet Radio, Service (GPRS); Mobile Station (MS)—Base, Station System (BSS) interface; Radio Link, Control/Medium Access Control (RLC/MAC), protocol (Release 10); 3GPP Standard; 3GPP TS 44.060; V10.1.0; Jun. 14, 2010, 609 pages.

3rd Generation Partnership Project; Technical Specification Group Services and System Aspects; Circuit Switched(CS) fallback in Evolved Packet System (EPS); Stage 2 (Release 10), 3GPP Standard; 3GPP TS 23.272, V10.0.0; Jun. 10, 2010; 73 Pages.

3rd Generation Partnership Project; Technical Specification Group Services and System Aspects; Architecture enhancements for non-3GPP accesses (Release 10), 3GPP Standard; 3GPP TS 23.402, 3rd, V10.0.0; Jun. 10, 2010; 208 Pages.

International Bureau, International Preliminary Report on Patentability issued in International application No. PCT/US2011/052425, mailed Apr. 4, 2013, 17 pages.

International Searching Authority, International Search Report and Written Opinion issued in International Application No. PCT/US2011/052425, dated May 21, 2012, 24 pages.

Samsung, Suspending EPS Bearers, 3GPP Draft; S2-083482 CSFB Suspend R3, 3rd Generation Partnership Project (3GPP), Mobile Competence Centre, dated May 2, 2008, 3 pages.

3rd Generation Partnership Project; Technical Specification Group Core Network and Terminals; Mobile radio interface Layer 3 specification; Core network protocols; Stage 3 (Release 9), 3GPP Technical Specification, 3GPP TS 24.008 V9.3.0, dated Jun. 14, 2010, 612 pages.

3rd Generation Partnership Project; Technical Specification Group GSM/EDGE; Radio Access Network; General Packet Radio Service (GPRS); Mobile Station (MS)—Base Station System (BSS) interface; Radio Link Control / Medium Access Control (RLC/MAC) protocol (Release 10), 3GPP Technical Specification, 3GPP TS 44.060 v10.1.0, dated Jun. 14, 2010, 613 pages.

3rd Generation Partnership Project; Technical Specification Group Services and System Aspects; General Packet Radio Service (GPRS) enhancements for Evolved Universal Terrestrial Radio Access Network (E-UTRAN) access (Release 10), 3GPP Technical Specification, 3GPP TS 23.401 v10.0.0, dated Jun. 10, 2010, 261 pages.

"3rd Generation Partnership Project; Technical Specification Group Services and System Aspects; General Packet Radio Service (GPRS); Service Description; Stage 2 (Release 10)," 3GPP TS 23.060 V10.0.0, Jun. 2010 (303 pages).

"3rd Generation Partnership Project; Technical Specification Group Services and System Aspects; IP flow mobility and seamless Wirless Local Area Network (WLAN) offload; Stage 2 (Release 10)," 3GPP TS 23.261 V10.0.0, Jun. 2010 (20 pages).

"3rd Generation Partnership Project; Technical Specification Group Services and System Aspects; Multi access PDN connectivity and IP flow mobility (Release 9)," 3GPP TR 23.861 V1.3.0, Sep. 2009 (49 pages).

Digital cellular telecommunications system (Phase 2+); Universal Mobile Telecommunications System (UMTS); General Packet

(56) References Cited

OTHER PUBLICATIONS

Radio Service (GPRS); Service description; Stage 2 (3GPP TS 23.060 version 7.9.0 Release 7), ETSI TS 123 060 V7.9.0, Jan. 2010 (218 pages).
"Digital cellular telecommunications system (Phase 2+); Universal Mobile Telecommunications System (UMTS); General Packet Radio Service (GPRS); Service description; Stage 2 (3GPP TS 23.060 version 8.9.0 Release 8)," ETSI TS 123 060 V8.9.0, Jul. 2010 (282 pages).
"Digital cellular telecommunications system (Phase 2+); Universal Mobile Telecommunications System (UMTS); General Packet Radio Service (GPRS); Service description; Stage 2 (3GPP TS 23.060 version 9.5.0 Release 9)," ETSI TS 123 060 V9.5.0, Jul. 2010 (300 pages).
"Universal Mobile Telecommunications System (UMTS); LTE; Non-Access-Stratum (NAS) protocol for Evolved Packet System (EPS); Stage 3 (3GPP TS 24.301 version 8.6.0 Release 8)," ETSI TS 124 301 V8.6.0, Jun. 2010 (263 pages).
"Universal Mobile Telecommunications System (UMTS); LTE; Non-Access-Stratum (NAS) protocol for Evolved Packet System (EPS); Stage 3 (3GPP TS 24.301 version 9.3.0 Release 9)," ETSI TS 124 301 V9.3.0, Jun. 2010 (282 pages).
"Digital cellular telecommunications system (Phase 2+); Universal Mobile Telecommunications System (UMTS); LTE; Mobility management based on Dual-Stack Mobile IPv6; Stage 3 (3GPP TS 24.303 version 8.6.0 Release 8)," ETSI TS 124 303 V8.6.0, Jun. 2010 (33 pages).
"Digital cellular telecommunications system (Phase 2+); Universal Mobile Telecommunications System (UMTS); LTE; Mobility management based on Dual-Stack Mobile IPv6; Stage 3 (3GPP TS 24.303 version 9.2.0 Release 9)," ETSI TS 124 303 V9.2.0, Jun. 2010 (33 pages).
"Universal Mobile Telecommunications System (UMTS); LTE; Access Network Discovery and Selection Function (ANDSF) Management Object (MO) (3GPP TS 24.312 version 8.6.0 Release 8)," ETSI TS 124 312 V8.6.0, Jul. 2012 (91 pages).
"Universal Mobile Telecommunications System (UMTS); LTE; Access Network Discovery and Selection Function (ANDSF) Management Object (MO) (3GPP TS 24.312 version 9.1.0 Release 9)," ETSI TS 124 312 V9.1.0, Apr. 2010 (87 pages).
"Universal Mobile Telecommunications System (UMTS); LTE; 3G security; Wireless Local Area Network (WLAN) interworking security (3GPP TS 33.234 version 9.2.0 Release 9)," ETSI TS 133 234 V9.2.0, Jul. 2010 (104 pages).
"Digital cellular telecommunications system (Phase 2+); Universal Mobile Telecommunications System (UMTS); LTE; 3GPP System Architecture Evolution (SAE); Security aspects of non-3GPP accesses (3GPP TS 33.402 version 8.6.0 Release 8)," ETSI TS 133 402 V8.6.0, Jan. 2010 (45 pages).
"Digital cellular telecommunications system (Phase 2+); Universal Mobile Telecommunications System (UMTS); LTE; 3GPP System Architecture Evolution (SAE); Security aspects of non-3GPP accesses (3GPP TS 33.402 version 9.4.0 Release 9)," ETSI TS 133 402 V9.4.0, Jul. 2010 (49 pages).
"Digital cellular telecommunications system (Phase 2+); Mobile radio interface layer 3 specification; Radio Resource Control (RRC) protocol (3GPP TS 44.018 version 7.19.1 Release 7)," ETSI TS 144 018 V7.19.1, Apr. 2010 (403 pages).
"Digital cellular telecommunications system (Phase 2+); Mobile radio interface layer 3 specification; Radio Resource Control (RRC) protocol (3GPP TS 44.018 version 8.11.0 Release 8)," ETSI TS 144 018 V8.11.0, Jun. 2010 (427 pages).
"Digital cellular telecommunications system (Phase 2+); Mobile radio interface layer 3 specification; Radio Resource Control (RRC) protocol (3GPP TS 44.018 version 9.5.0 Release 9)," ETSI TS 144 018 V9.5.0, Jun. 2010 (432 pages).
Office Action issued in related Chinese Application No. 201180055729.3 on Apr. 20, 2016.
Office Action issued in related Canadian Application No. 2,811,727 on Jan. 22, 2016.
Office Action issued in Canadian Application No. 2311727 on Nov. 7, 2016.
Office Action issued in Chinese Application No. 201180055729.3 on Jan. 9, 2017.
Telecom Italia; "Using IMS SC and Multi Access PDN Connectivity for IP Flow Mobility"; 3GPP TSG SA WG2 Meeting #71 (TD S2-091764); Feb. 16-20, 2009; Budapest, Hungary; 3 pages.

\* cited by examiner

6.3 Mobile Originating call in Active Mode - PS HO supported

This flow may be executed when the eNodeB knows that both the UE and the network support PS HO, in the normal case. Clause 6.6 describes the procedure when the procedure is rejected by the MME.

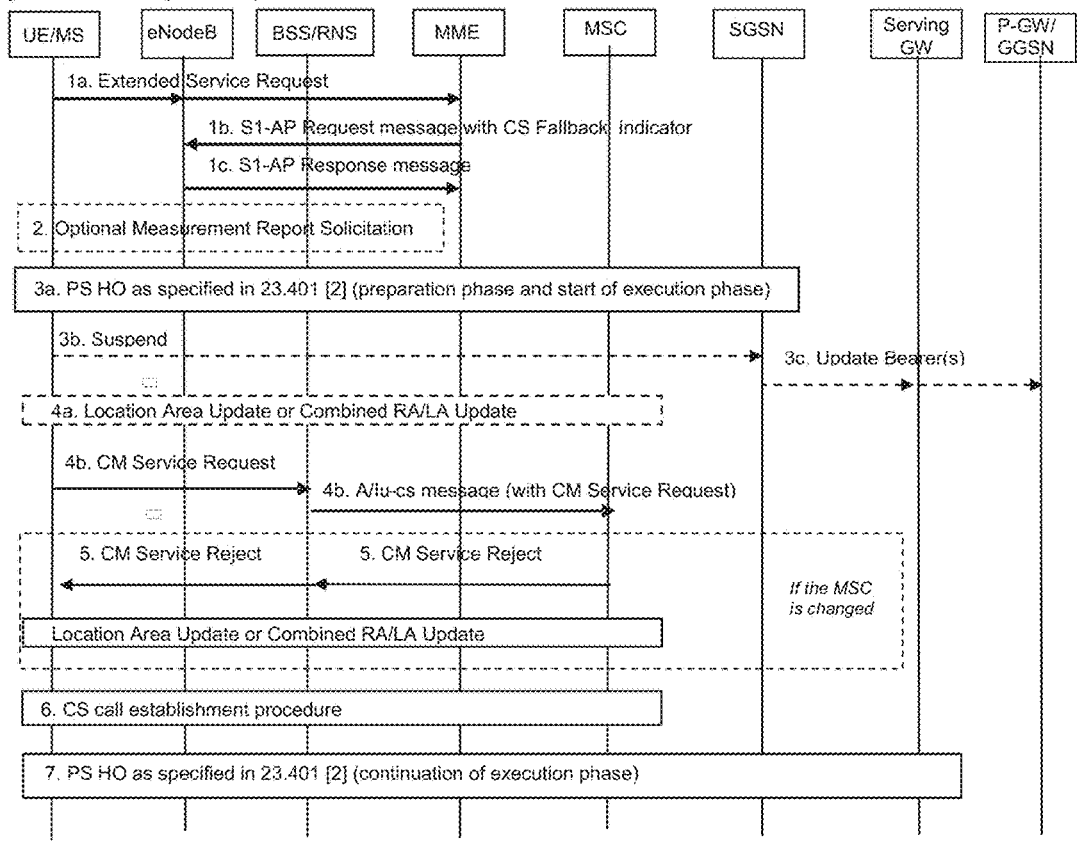

Figure 6.2-1: CS Call Request in E-UTRAN, Call in GERAN/UTRAN

NOTE 1: DTM is not mandatory for CS Fallback to work and is not linked to PS HO.

...

3b. If the target RAT is GERAN and the UE has entered Dedicated Mode, the UE may starts the Suspend procedure (see TS 44.018 [4]) unless both the UE and the Target cell support DTM in which case TBF re-establishment may be performed. If a non-3GPP access for PS service is available and if the UE is configured to perform the handover to a non-3GPP access, the UE shall initiate the handover of all or some of the active PDN connections to the non-3GPP access as specified in TS 23.402. If the UE is already connected to the non-3GPP access, the UE does not start the Suspend procedure for the PDN connections it is handing over to non-3GPP before triggering the handover.

...

In step 3b, the UE shall delay the handover of PDN connections to non-3GPP based on configuration information.

FIG. 3A

6.3 Mobile Originating call in Active Mode – No PS HO support

This procedure is executed when PS HO is not supported, in the normal case.
Clause 6.6 describes the procedure when the procedure is rejected by the MME.

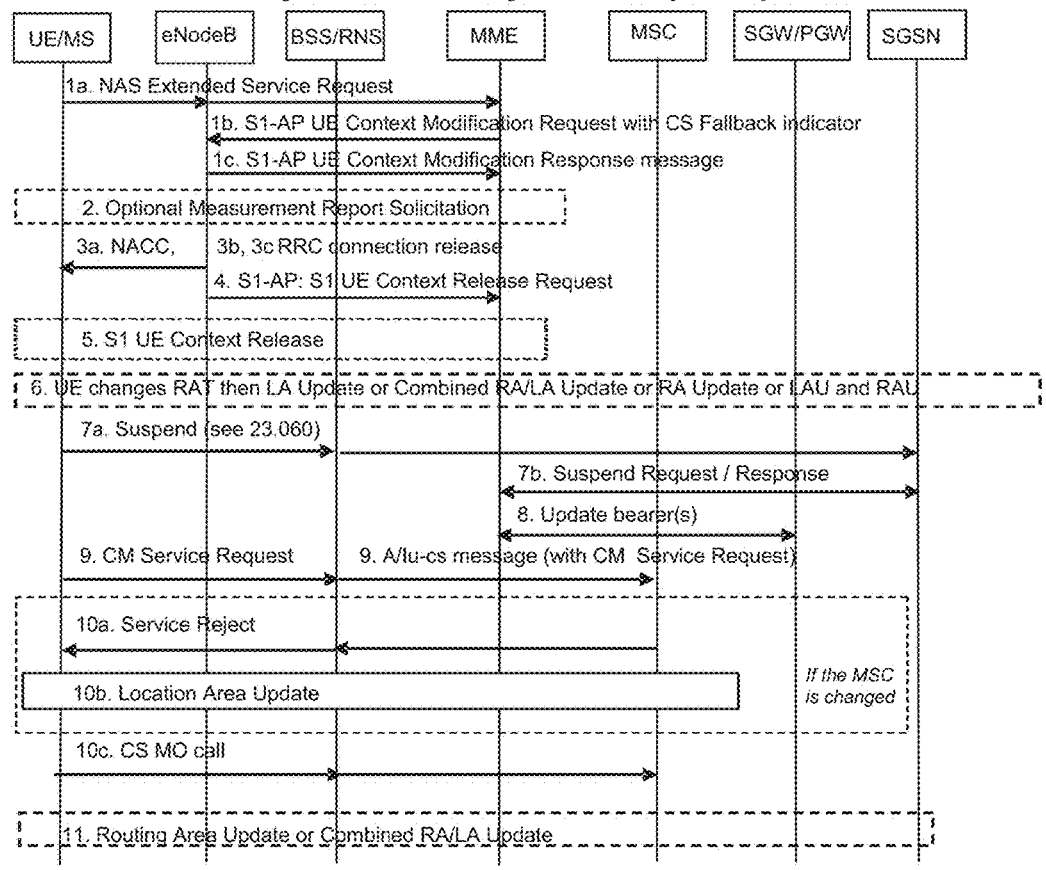

Figure 6.3-1: CS Call Request in E-UTRAN, Call in GERAN/UTRAN without PS HO

...

7. If the target RAT is GERAN and DTM is not supported, the UE <u>may</u> starts the Suspend procedure specified in TS 23.060 [3], clause 16.2.1.1.2. This triggers the SGSN to send a Suspend Request message to the MME. The MME returns a Suspend Response to the SGSN, which contains the MM and PDP contexts of the UE. <u>If a non-3GPP access for PS service is available and if the UE is configured to perform the handover to a non-3GPP access, the UE shall initiate the handover of the all or some of the active PDN connections to the non-3GPP access as specified in TS 23.402. If the UE is already connected to the non-3GPP access, the UE does not start the Suspend procedure for the PDN connections it is handing over to non-3GPP before triggering the handover.</u>

...

<u>In step 7, the UE shall delay the handover of PDN connections to non-3GPP based on configuration information.</u>

FIG. 3B

7.3 Mobile Terminating call in Active Mode - PS HO supported

This flow may be executed when the eNodeB knows that both the UE and the network support PS HO in the normal case. Clause 6.6 describes the procedure when the procedure is rejected by the MME.

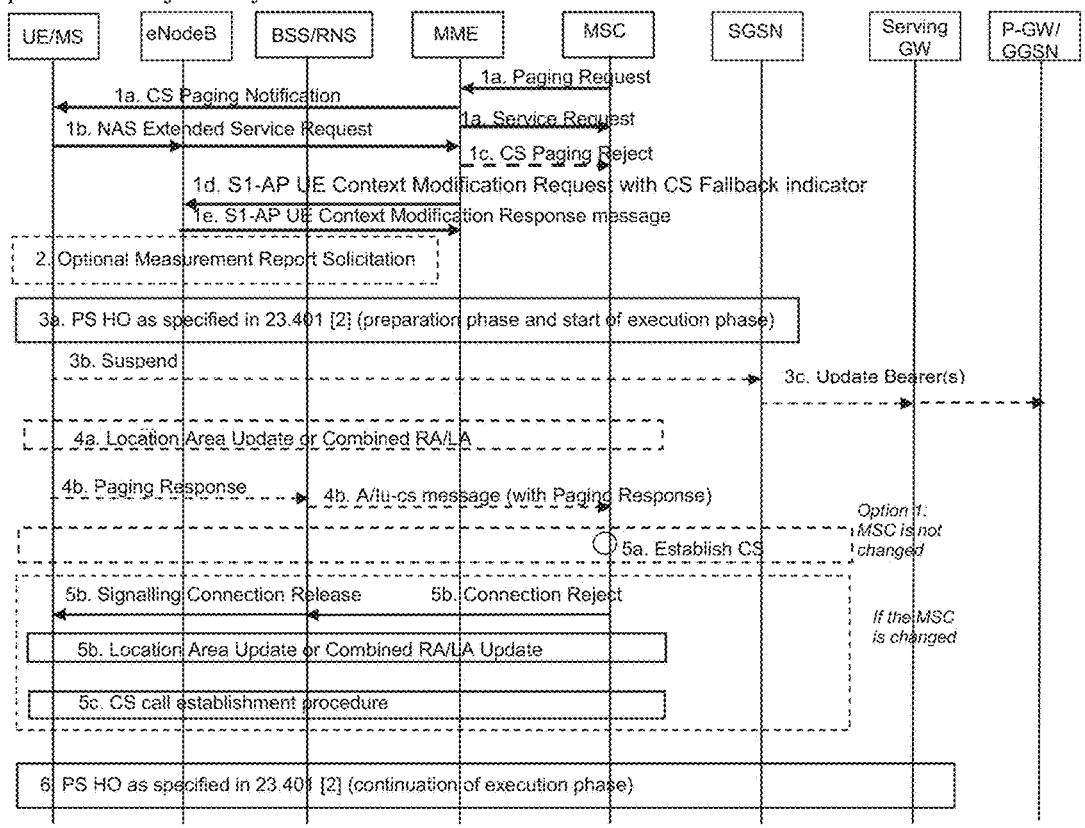

Figure 7.3-1: CS Page in E-UTRAN, Call in GERAN/UTRAN

...

3b. If the target RAT is GERAN and the UE has entered Dedicated Mode, the UE starts the Suspend procedure (see TS 44.018 [4]) unless both the UE and the Target cell support DTM in which case TBF re-establishment may be performed. If a non-3GPP access for PS service is available and if the UE is configured to perform the handover to a non-3GPP access, the UE shall initiate the handover of all or some of the active PDN connections to the non-3GPP access as specified in TS 23.402. If the UE is already connected to the non-3GPP access, the UE does not start the Suspend procedure for the PDN connections it is handing over to non-3GPP before triggering the handover.

...

In step 3b, if the UE is so configured, the UE shall delay the handover of PDN connections to non-3GPP based on configuration information.

FIG. 3C

7.4 Mobile Terminating call in Active Mode - No PS HO support

This procedure is executed when PS HO is not supported, in the normal case. Clause 6.6 describes the procedure when the procedure is rejected by the MME.

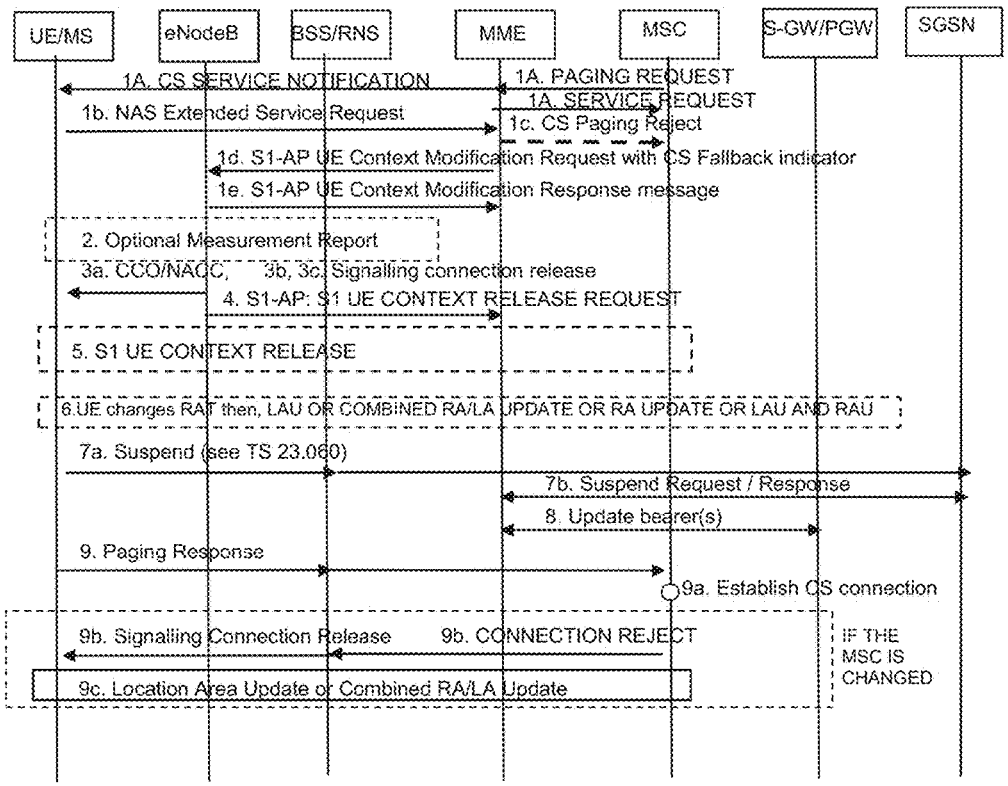

Figure 7.4-1: CS Page in E-UTRAN, Call in GERAN/UTRAN without PS HO

...

7. If the target RAT is GERAN and DTM is not supported, the UE may starts the Suspend procedure specified in TS 23.060 [3], clause 16.2.1.1.2. This triggers the SGSN to send a Suspend Request message to the MME. The MME returns a Suspend Response to the SGSN even though GUTI cannot be derived from the P-TMSI and RAI pair. <u>If a non-3GPP access for PS service is available and if the UE is configured to perform the handover to a non-3GPP access, the UE shall initiate the handover of all or some of the active PDN connections to the non-3GPP access as specified in TS 23.402. If the UE is already connected to the non-3GPP access, the UE does not start the Suspend procedure for the PDN connections it is handing over to non-3GPP before triggering the handover.</u>

...

If the UE remains on UTRAN/GERAN after the CS voice call is terminated the UE performs normal mobility management procedures as defined in TS 23.060 [3] and TS 24.008 [21].
<u>In step 7, if the UE is so configured, the UE shall delay the handover of PDN connections to non-3GPP based on configuration information.</u>

FIG. 3D

8.2.3 E-UTRAN to Untrusted Non-3GPP IP Access Handover with PMIPv6 on S2b

This clause shows a call flow for a handover when a UE moves from an E-UTRAN to an untrusted non-3GPP access network. PMIPv6/GTP is assumed to be used on the S5/S8 interface and PMIPv6 is used on the S2b interface.

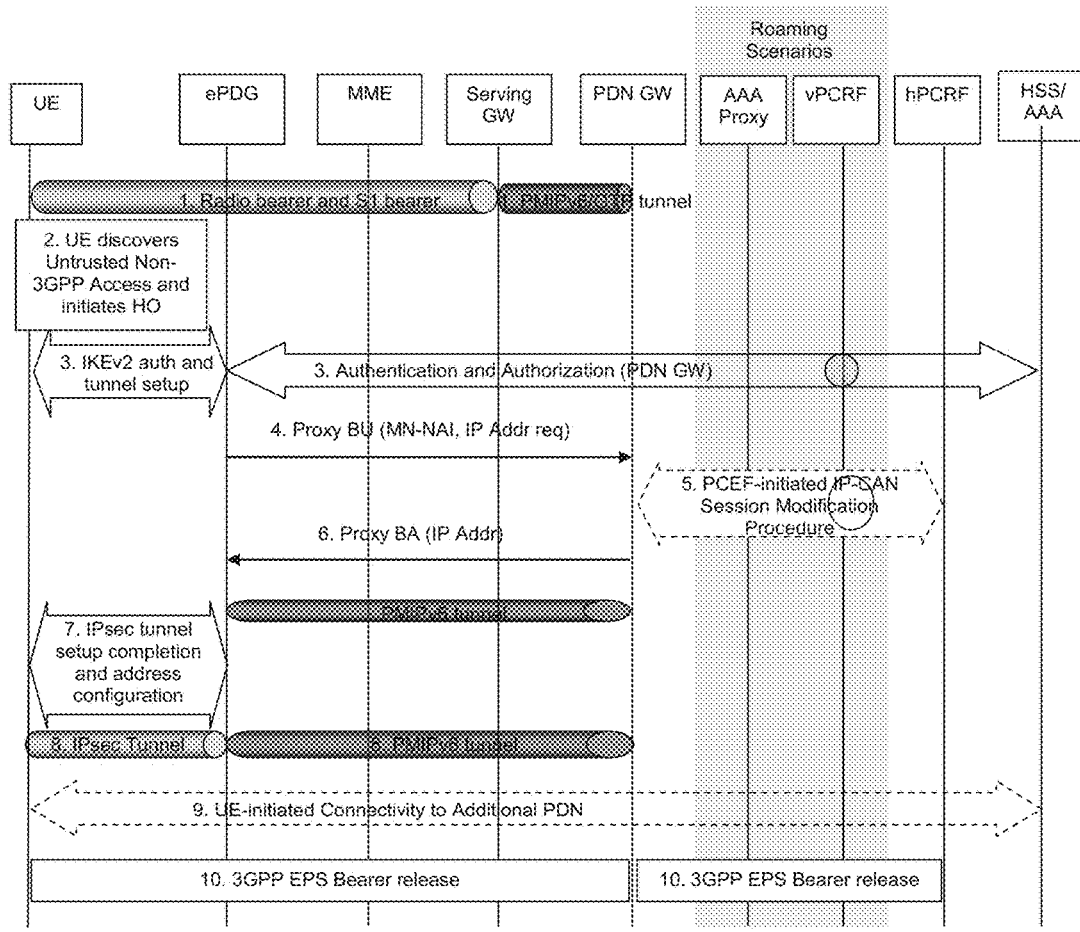

Figure 8.2.3-1: E-UTRAN to Untrusted Non-3GPP IP Access Handover

...

6) The PDN GW processes the Proxy Binding Update message from the ePDG, updates the binding cache entry for the UE and responds with a Proxy Binding Acknowledgement (MN_NAI, Lifetime, GRE key for uplink traffic, UE Address Info, Charging ID, Additional Parameters) message. In the Proxy Binding Ack, the PDN GW replies with the same IP address and/or prefix that was assigned to the UE earlier. If the corresponding Proxy Binding Update contains a PDN connection identity, the PDN GW shall acknowledge if the PDN GW supports multiple PDN connections to a single APN. At this point a PMIPv6 tunnel exists between PDN GW and ePDG. Since this step is triggered by the Proxy Binding Update message from the ePDG in step 4, it can occur after step 4 and does not need to wait for step 5. If the PS bearers corresponding to the PDN connection are suspended (e.g. due to a previous CS Fallback procedure), the PDN GW shall resume the bearers status.

FIG. 3E

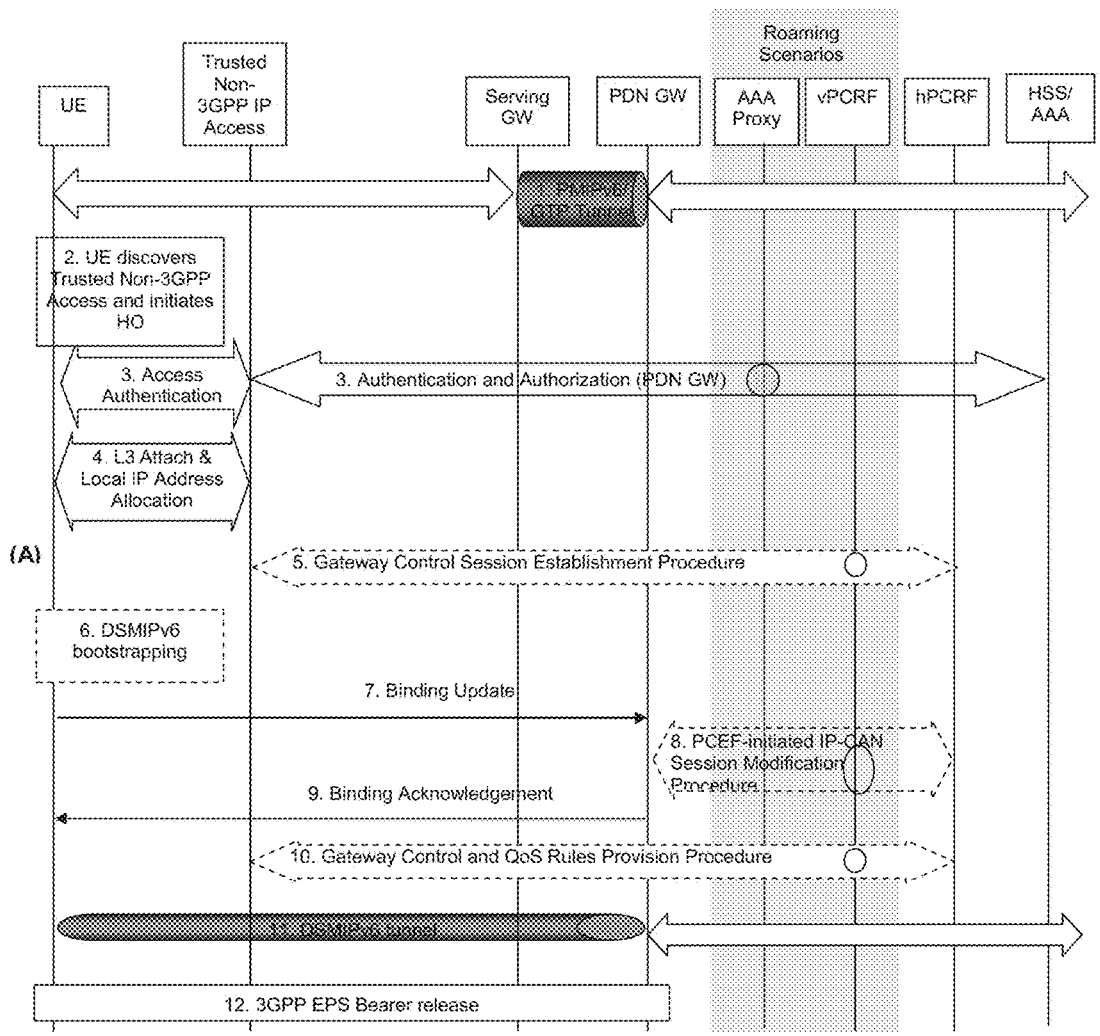

Figure 8.4.2-1: 3GPP S5 to Trusted Non-3GPP S2c (DSMIPv6) Handover

...

7) The UE sends a DSMIPv6 BU message to the PDN GW to register its CoA, the CoA is the local IP address allocated in step 4. The UE shall inform the PDN GW that the whole home prefix shall be moved. If the PS bearers corresponding to the PDN connection are suspended (e.g. due to a previous CS Fallback procedure), the PDN GW shall resume the bearers status.

FIG. 3F 8.4.3 3GPP Access to Untrusted Non-3GPP IP Access Handover with DSMIPv6 over S2c

...

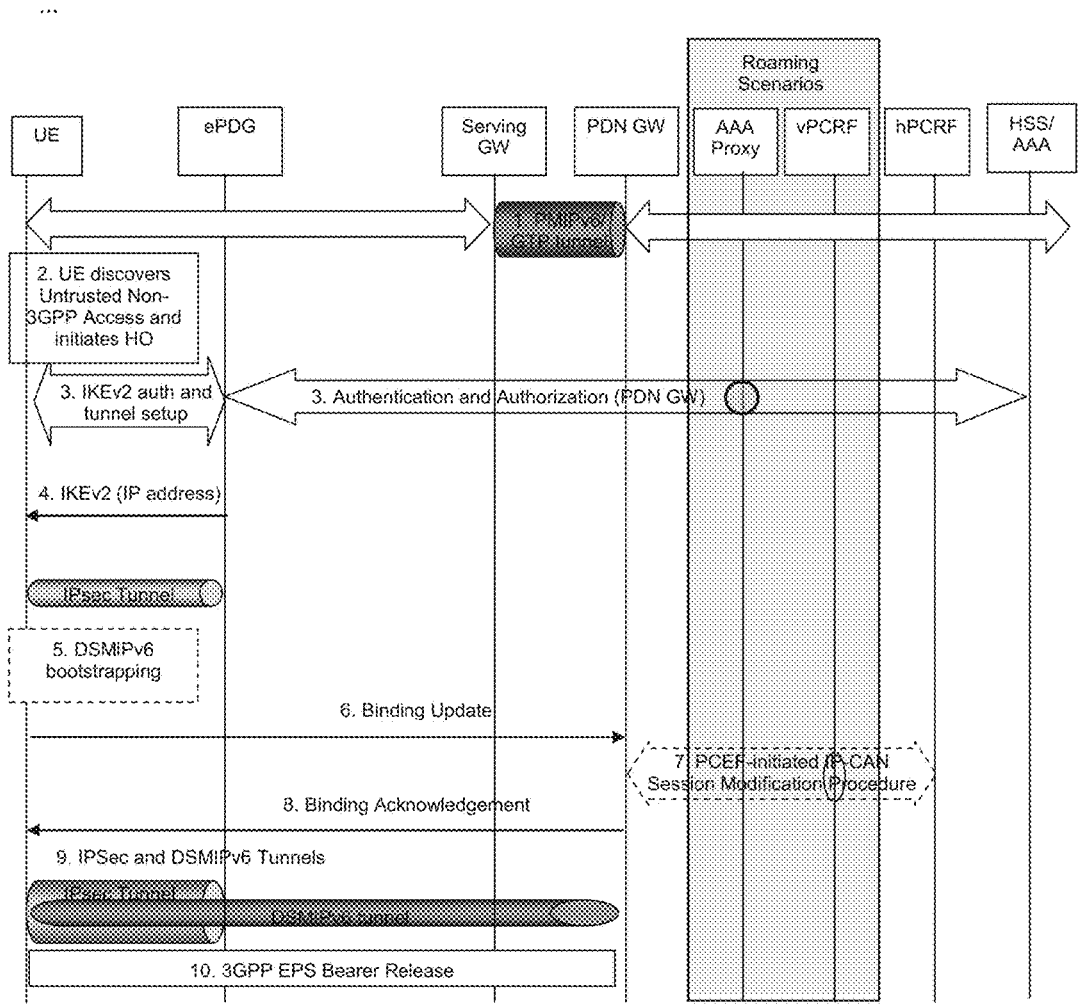

Figure 8.4.3-1: 3GPP Access to Untrusted Non-3GPP IP Access with S2c (DSMIPv6) Handover

...

6. The UE sends a DSMIPv6 BU message to the PDN GW to register its CoA. The UE shall inform the PDN GW that the whole home prefix shall be moved. If the PS bearers corresponding to the PDN connection are suspended (e.g. due to a previous CS Fallback procedure), the PDN GW shall resume the bearers status.

5.4.4.1 PDN GW initiated bearer deactivation

The bearer deactivation procedure for a GTP based S5/S8 is depicted in figure 5.4.4.1-1. In this procedure, the UE is assumed to be in ECM-CONNECTED. This procedure can be used to deactivate a dedicated bearer or deactivate all bearers belonging to a PDN address. If the default bearer belonging to a PDN connection is deactivated, the PDN GW deactivates all bearers belonging to the PDN connection.

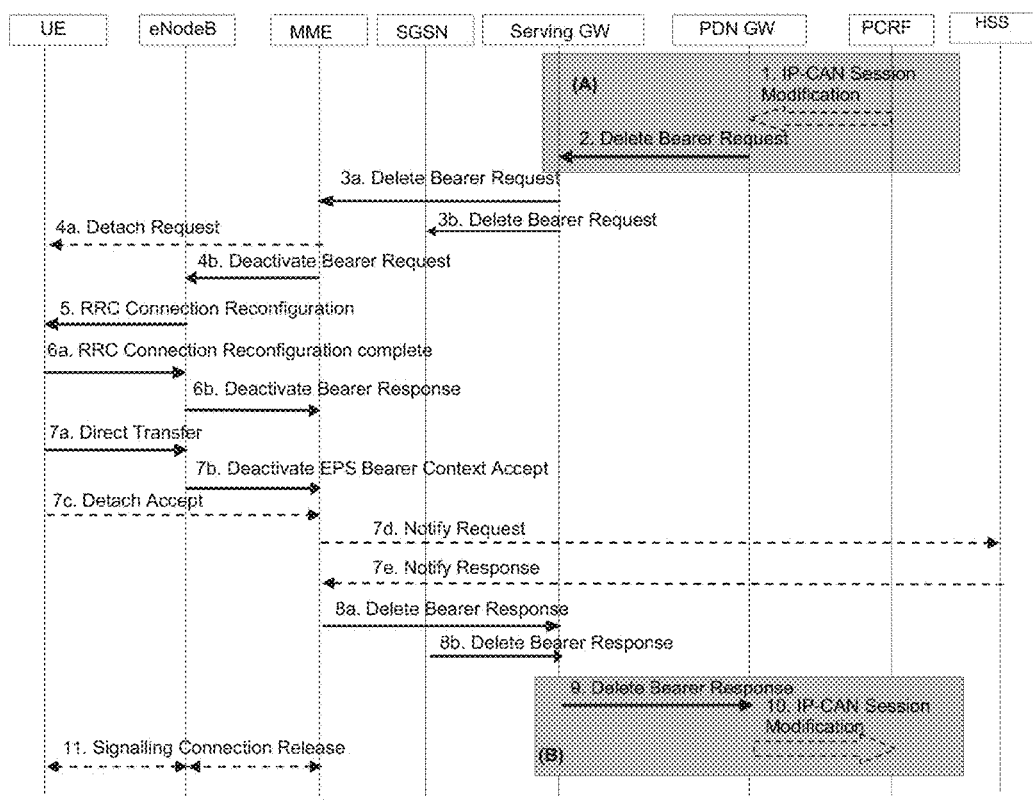

Figure 5.4.4.1-1: PDN GW Initiated Bearer Deactivation, UE in active mode

...

4c. If the bearers corresponding to the PDN connection are suspended, e.g. because of a previous CS Fallback procedure without PS Handover, steps 4 to 7 are omitted.

...

Steps 4 to 7 are not performed when the UE is in (a) ECM-IDLE and the last PDN connection of the UE is not being deleted or (b) UE is in ECM-IDLE and the last PDN connection is deleted due to ISR deactivation or due to handover to non-3GPP access, or if the bearers corresponding to the PDN connection are suspended, e.g. because of a previous CS Fallback procedure without PS Handover. The EPS bearer state is synchronized between the UE and the network at the next ECM-IDLE to ECM-CONNECTED transition (e.g. Service Request or TAU procedure).

FIG. 5A

5.4.4.1 PDN GW initiated bearer deactivation

The bearer deactivation procedure for a GTP based S5/S8 is depicted in figure 5.4.4.1-1. In this procedure, the UE is assumed to be in ECM-CONNECTED. This procedure can be used to deactivate a dedicated bearer or deactivate all bearers belonging to a PDN address. If the default bearer belonging to a PDN connection is deactivated, the PDN GW deactivates all bearers belonging to the PDN connection.

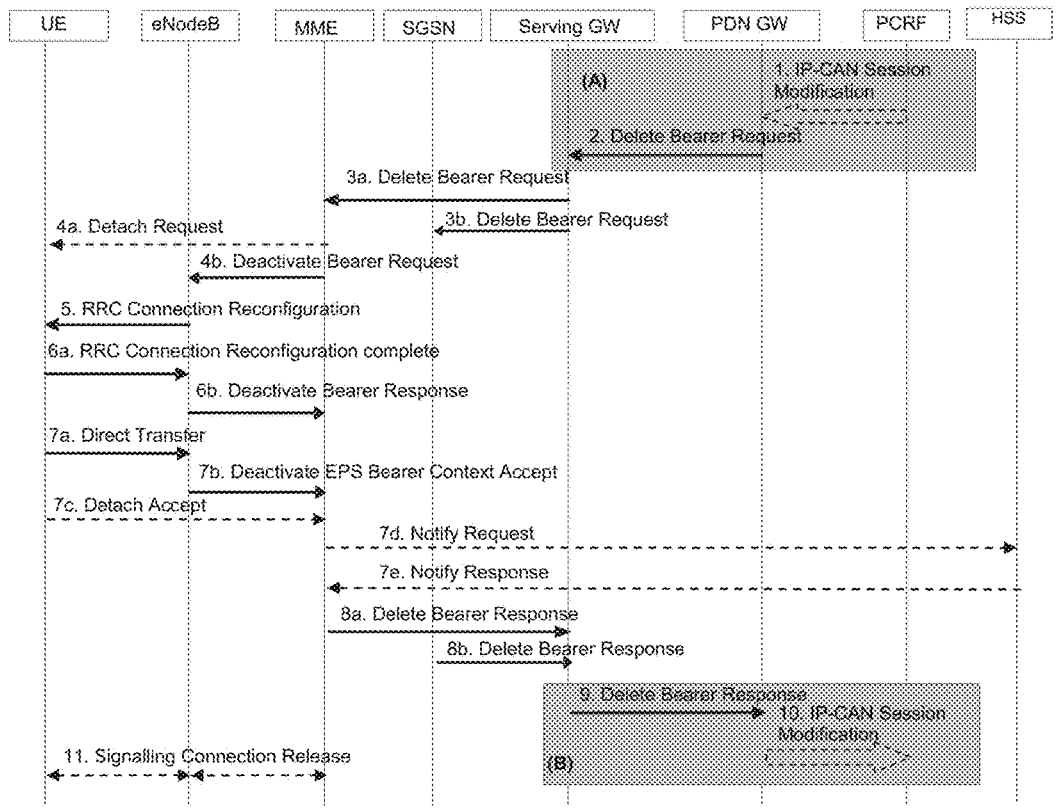

Figure 5.4.4.1-1: PDN GW Initiated Bearer Deactivation, UE in active mode

FIG. 5B

NOTE 1: Steps 3-8 are common for architecture variants with GTP based S5/S8 and PMIP-based S5/S8. For an PMIP-based S5/S8, procedure steps (A) and (B) are defined in TS 23.402 [2]. Steps 1, 2, 9 and 10 concern GTP-based S5/S8.

1. If dynamic PCC is not deployed,

...

2. The PDN GW sends a Delete Bearer Request (PTI, EPS Bearer Identity, Causes) message to the Serving GW. The Procedure Transaction Id (PTI) parameter in this step and in the following steps is only used when the procedure was initiated by a UE Requested Bearer Resource Modification Procedure - see clause 5.4.5. This message can include an indication that all bearers belonging to that PDN connection shall be released. The PDN GW includes 'Cause' IE in the Delete Bearer Request message and sets the IE to 'RAT changed from 3GPP to Non-3GPP' if the Delete Bearer Request message is caused by handover without optimization occurs from 3GPP to non-3GPP. <u>The PDN GW sets the 'Cause' IE to 'RAT changed from 3GPP to Non-3GPP, bearers suspended' if the Delete Bearer Request message is caused by handover without optimization occurs from 3GPP to non-3GPP and the bearers are suspended (e.g. because of a previous CS Fallback with no HO support).</u>

4c. <u>If the 'Cause' IE is set to 'RAT changed from 3GPP to Non-3GPP, bearers suspended', steps 4 to 7 are omitted.</u>

5. The eNodeB sends

...

Steps 4 to 7 are not performed when the UE is in (a) ECM-IDLE and the last PDN connection of the UE is not being deleted or (b) UE is in ECM-IDLE and the last PDN connection is deleted due to ISR deactivation or due to handover to non-3GPP access<u>, or if the bearers corresponding to the PDN connection are suspended, e.g. because of a previous CS Fallback procedure without PS Handover</u>. The EPS bearer state is synchronized between the UE and the network at the next ECM-IDLE to ECM-CONNECTED transition (e.g. Service Request or TAU procedure).

6.5 Returning back to E-UTRAN

Once CS service ends in CS domain, existing mechanisms can be used to move the UE to E-UTRAN, no specific CS Fallback mechanisms are needed.

When the UE moves to E-UTRAN, if the EPS service was suspended during the CS service, it is resumed according to the procedure shown in the figure 6.5-1 below.

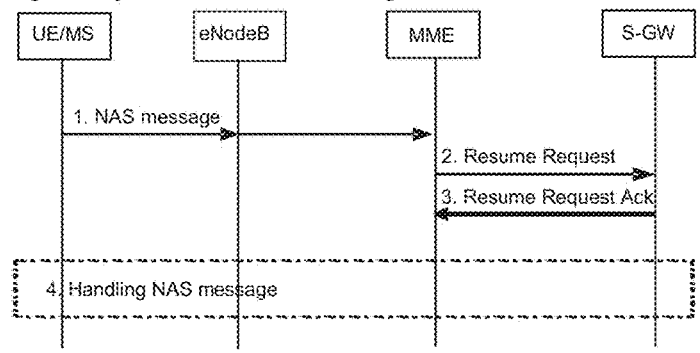

Figure 6.5-1: Resume Procedure returning from CS fallback no PS HO

1. The UE sends a NAS message, e.g. Service Request or TAU, to the MME. If the UE had performed an handover of the PDN connections corresponding to the suspended bearers from E-UTRAN to non-3GPP after the UE performed the CS Fallback, the UE triggers an attach procedure for the CS fallback as described in section 5.2 of 3GPP TS 23.272 by including the Request Type set to "handover".

2. If the UE context in the MME indicates that UE is in suspended status, the MME sends a Resume Request (IMSI) message to the S-GW that requests the resumption of EPS bearers for the UE.

3. The S-GW acknowledges the Resume Request and clears the UE's suspending status.

4. The NAS message is processed accordingly.

FIG. 7A

6.5 Returning back to E-UTRAN

Once CS service ends in CS domain, existing mechanisms can be used to move the UE to E-UTRAN, no specific CS Fallback mechanisms are needed.
When the UE moves to E-UTRAN, if the EPS service was suspended during the CS service, it is resumed according to the procedure shown in the figure 6.5-1 below.

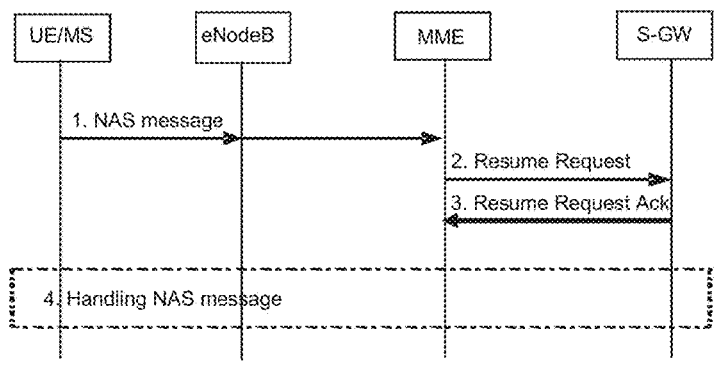

Figure 6.5-1: Resume Procedure returning from CS fallback no PS HO

1. The UE sends a NAS message, e.g. Service Request or TAU, to the MME.

2. If the UE context in the MME indicates that UE is in suspended status, the MME sends a Resume Request (IMSI) message to the S-GW that requests the resumption of EPS bearers for the UE.

3. The S-GW acknowledges the Resume Request and clears the UE's suspending status.

4. The NAS message is processed accordingly.

When the UE moves to E-UTRAN, if one or more PDN connections were handed over to non-3GPP when the CS Fallback was triggered, the UE may handover the PDN connections from non-3GPP to E-UTRAN.

FIG. 7B

6.5 Returning back to E-UTRAN

Once CS service ends in CS domain, existing mechanisms can be used to move the UE to E-UTRAN, no specific CS Fallback mechanisms are needed.

When the UE moves to E-UTRAN, if the EPS service was suspended during the CS service, it is resumed according to the procedure shown in the figure 6.5-1 below.

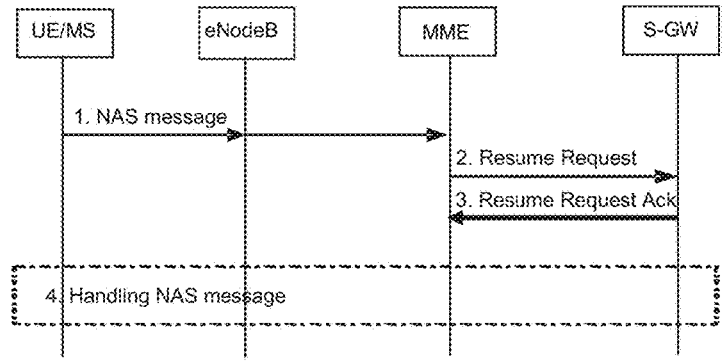

Figure 6.5-1: Resume Procedure returning from CS fallback no PS HO

1. The UE sends a NAS message, e.g. Service Request or TAU, to the MME.

2. If the UE context in the MME indicates that UE is in suspended status, the MME sends a Resume Request (IMSI) message to the S-GW that requests the resumption of EPS bearers for the UE.

3. The S-GW acknowledges the Resume Request and clears the UE's suspending status.

4. The NAS message is processed accordingly.

If one or more IP flows of one or more PDN connections were moved to non-3GPP when the CS Fallback was triggered, the UE may also move IP flows back to E-UTRAN using IP flow mobility (see 3GPP TS 23.402).

FIG. 7C 5.2    Attach procedure

The attach procedure for the CS fallback and SMS over SGs in EPS is realized based on the combined GPRS/IMSI Attach procedure specified in TS 23.060 [3].

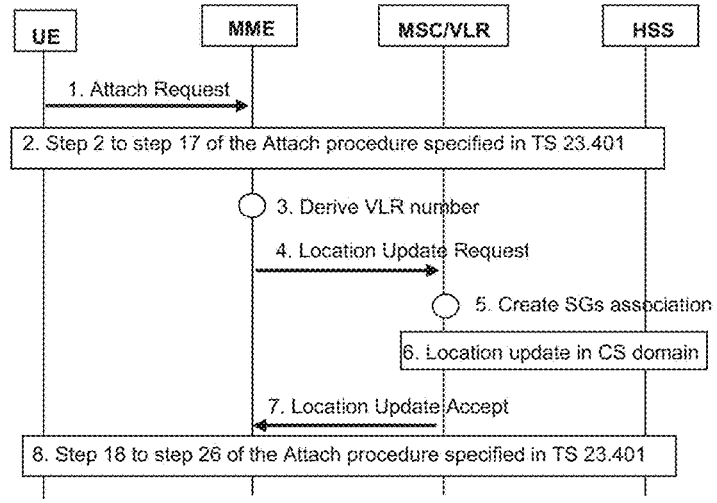

Figure 5.2-1: Attach Procedure

1) The UE initiates the attach procedure by the transmission of an Attach Request (parameters as specified in TS 23.401 [2] including the Attach Type and Mobile Station Classmark 2) message to the MME. The Attach Type indicates that the UE requests a combined EPS/IMSI attach and informs the network that the UE is capable and configured to use CS fallback. If the UE needs SMS service but not CSFB, the UE shall include an "SMS-only" indication in the combined EPS/IMSI Attach Request. See clause 5.4.4. If the UE performs the attach procedure when returning to E-UTRAN after having performed a CS fallback procedure and having handed over the PDN connections to a non-3GPP access, the UE includes the Request Type set to "handover".

FIG. 7D 6.3 Mobile Originating call in Active Mode - PS HO supported

This flow may be executed when the eNodeB knows that both the UE and the network support PS HO, in the normal case. Clause 6.6 describes the procedure when the procedure is rejected by the MME.

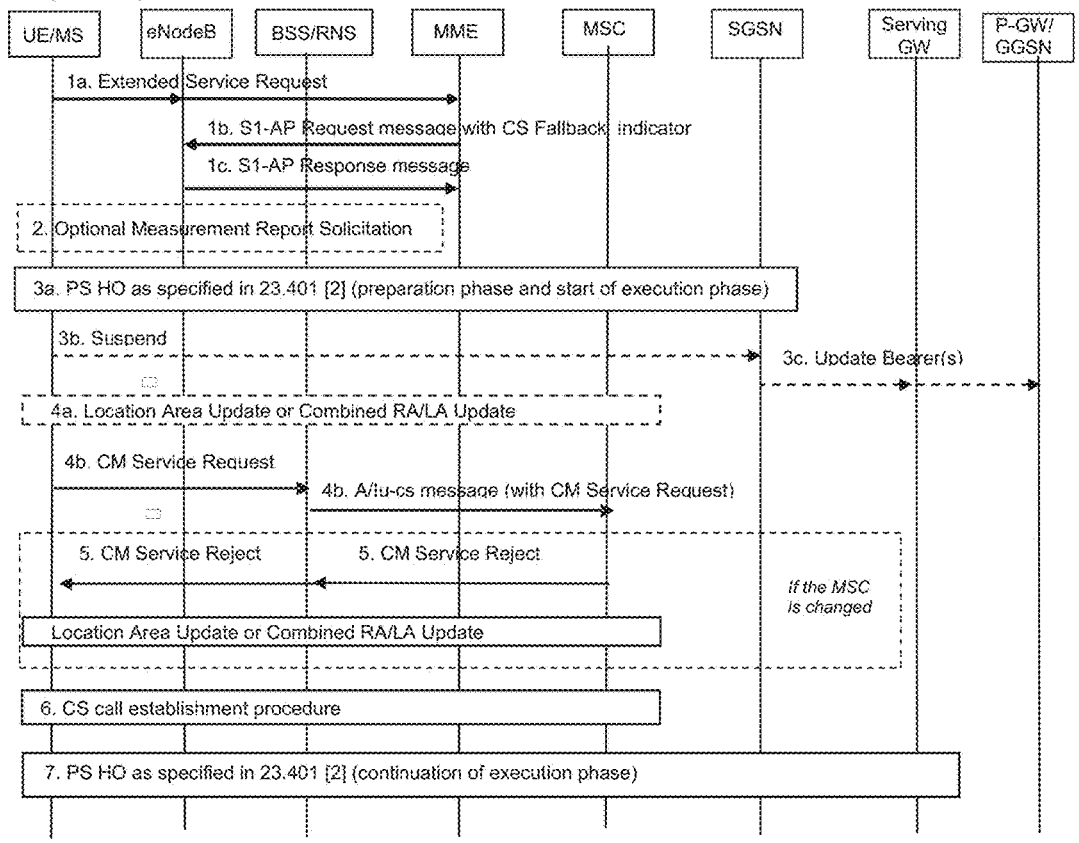

Figure 6.2-1: CS Call Request in E-UTRAN, Call in GERAN/UTRAN

...3b. If the target RAT is GERAN and the UE has entered Dedicated Mode, the UE may starts the Suspend procedure (see TS 44.018 [4]) unless both the UE and the Target cell support DTM in which case TBF re-establishment may be performed. If a non-3GPP access for PS service is available and if the UE is configured to perform the handover to a non-3GPP access, the UE shall initiate IP flows mobility of one or more IP flows of one or more PDN connections to the non-3GPP access as specified in TS 23.402 while maintaining one IP flow on the E-UTRAN access.

...

In step 3b, the UE shall delay the handover of PDN connections to non-3GPP based on configuration information.

FIG. 8A

Mobile Terminating call in idle mode

The procedure for Mobile Terminating Call in idle mode is illustrated in figure 7.2-1.

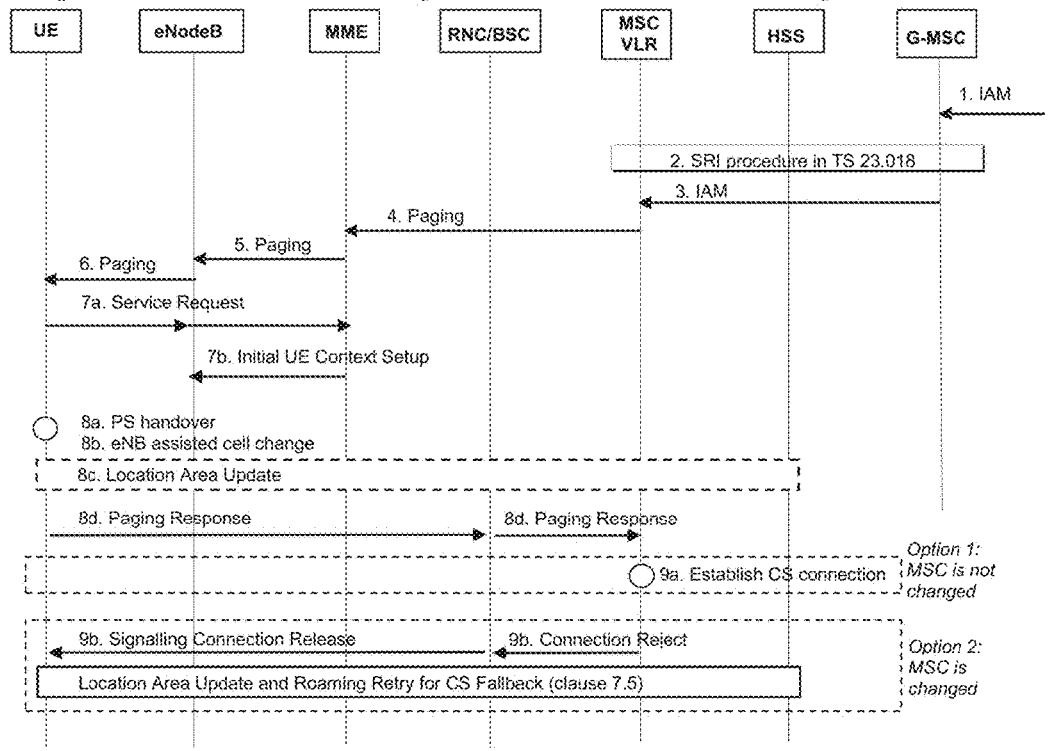

Figure 7.2-1: Mobile Terminating Call in idle mode

...

8b. If the UE or the network does not support PS handover: Upon receipt of the Initial UE Context Setup message with a CS Fallback Indicator the eNodeB may optionally solicit measurement reports from the UE to determine the target cell to redirect the UE to. After that, based on the UE and network capability supporting NACC, the eNB triggers an inter RAT cell change order (optionally with NACC) to a GERAN neighbour cell or releases the RRC Connection with redirection info to change to CS capable RATs (RAT, frequency). In this case the UE receives in inter-RAT cell change order that may contain a CS Fallback Indicator which indicates to UE that the cell change order is triggered due to a CS fallback request. If the inter-RAT cell change order contains a CS Fallback Indicator and the UE fails to establish connection to the target RAT, then the UE considers that CS fallback has failed. <u>If a non-3GPP access for PS service is available and if the UE is configured to perform the handover to a non-3GPP access, the UE shall initiate IP flows mobility of one or more IP flows of one or more PDN connections to the non-3GPP access as specified in TS 23.402.</u>

...

<u>In step 8b, if the UE is so configured, the UE shall delay the handover of PDN connections to non-3GPP based on configuration information.</u>

FIG. 8B

7.4 Mobile Terminating call in Active Mode - No PS HO support

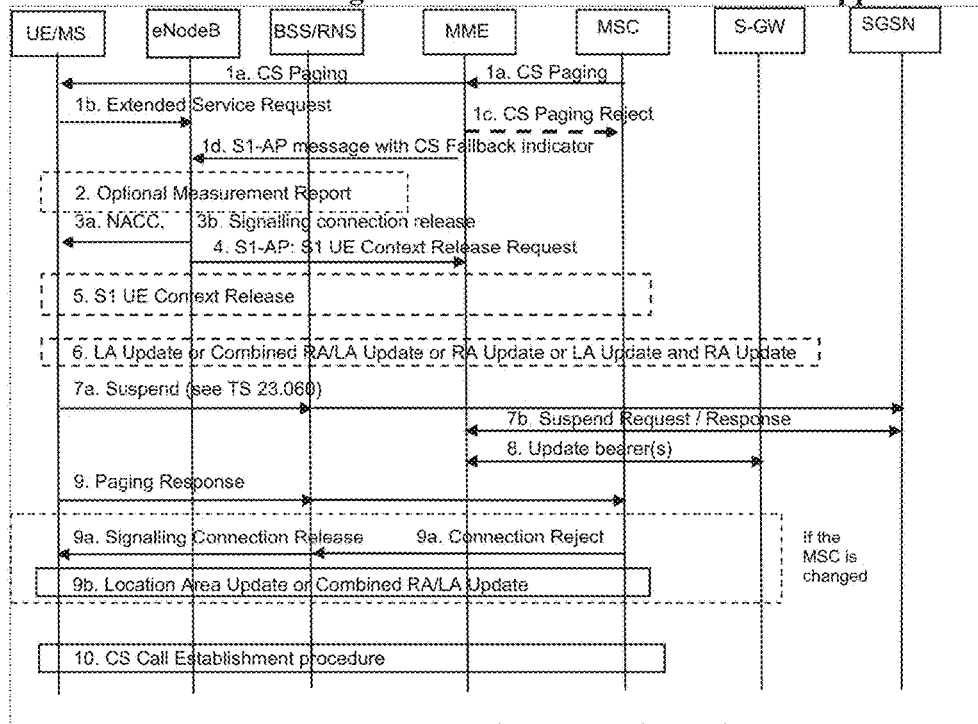

Figure 7.4-1: CS Page in E-UTRAN, Call in GERAN/UTRAN without PS HO

...

7. If the target RAT is GERAN and DTM is not supported, the UE starts the Suspend procedure specified in TS 23.060 [3], clause 16.2.1.1.2. This triggers the SGSN to send a Suspend Request message to the MME. The MME returns a Suspend Response to the SGSN, which contains the MM and PDP contexts of the UE. <u>If a non-3GPP access for PS service is available and if the UE is configured to perform the handover to a non-3GPP access, the UE shall initiate IP flows mobility of one or more IP flows of one or more PDN connections to the non-3GPP access as specified in TS 23.402.</u>

...

<u>In step 7, if the UE is so configured, the UE shall delay the handover of PDN connections to non-3GPP based on configuration information.</u>

FIG. 8C 5.4  IP flow mobility within a PDN connection

...

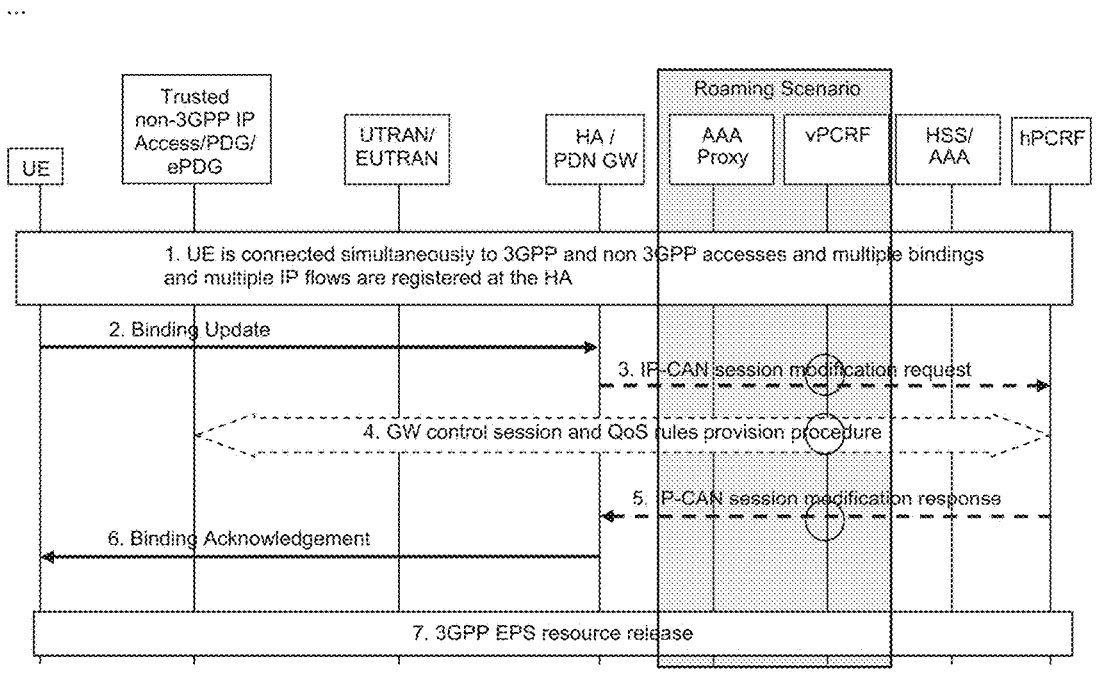

Figure 5.4-1: IP Flow Mobility

1. The UE is simultaneously connected to a 3GPP access and a WLAN access based on the procedures specified in clauses 5.2 and 5.3. Based on current routeing rules some traffic is routed through the 3GPP access and some other traffic through the WLAN access.

2. The UE sends a Binding Update (HoA, BID, FID) to the HA to install a new routeing rule or to modify the routeing address of an existing routeing rule to route the respective traffic (identified by the included FID) through one particular access (identified by the included BID) or to remove an existing routeing rule . In case of new routeing rule with a new FID option, the UE includes the routeing filter description. If the PS bearers corresponding to the PDN connection are suspended (e.g. due to a previous CS Fallback procedure), the PDN GW shall resume the bearers status.

4.8 Network Discovery and Selection

4.8.0 General Principles

The following principles apply when the UE is registered in the Home PLMN or in a PLMN which is equivalent to the home PLMN and when both 3GPP and non-3GPP accesses are available or when multiple non-3GPP accesses are available:

- The EPS network may provide the UE with assistance data/policies about available accesses located in the Home PLMN or in a PLMN equivalent to the Home PLMN, to allow the UE to scan for accesses and select an access.

- If the UE is capable of routing different IP flows to the same PDN connection through different access networks (see TS 23.261 [xx]), the EPS network shall allow the operator to influence the access where a specific IP flow shall be routed.

- If the UE is capable of routing different simultaneously active PDN connections through different access networks, the EPS network shall allow the operator to influence the access where a specific PDN connection shall be routed.- Assistance data/policies are provided only after establishing secure communication, as specified in TS 33.402 [45].

- <u>The EPS network shall allow the operator to influence whether EPS bearers shall be handed over to a non-3GPP access if upon performing CS fallback the UE suspends the EPS bearers. If the UE is capable of routing different IP flows to the same PDN connection through different access networks (see TS 23.261 [xx]), the EPS network shall allow the operator to influence which IP flows shall be handed over to a non-3GPP access if upon performing CS fallback the UE suspends the EPS bearers.</u>

...

4.8.2 Network Elements

4.8.2.1 Access Network Discovery and Selection Function (ANDSF)

The ANDSF shall be able to provide the following information:
1) Inter-system mobility policy:

- The inter-system mobility policy is a set of operator-defined rules and preferences that affect the inter-system mobility decisions taken by the UE. The UE uses the inter-system mobility policy when it can route IP traffic only over a single radio access interface at a given time (e.g. is not IFOM capable or its IFOM capability is disabled) in order to:

(i) decide when inter-system mobility is allowed or restricted; and (ii) to select the most preferable access technology type or access network that should be used to access EPC.

(iii) if the UE supports CSFB, decide whether the IP traffic shall be handed over to a non-3GPP access if upon performing CS fallback the UE suspends the EPS bearers (e.g. all traffic to a specific APN, or all traffic belonging to a specific IP flow, or all traffic of a specific application, etc).

...

2) Access network discovery information:

...

3) Inter-System Routing Policy:

- The ANDSF may provide a list of Inter-System Routing Policies to UEs that are capable of routing IP traffic simultaneously over multiple radio access interfaces. The UE uses the inter-system routing policies when it can route IP traffic simultaneously over multiple radio access interfaces (e.g. it is an IFOM capable UE with the IFOM capability enabled) in order to meet the operator routing / offload preferences by:

(i) deciding when an access technology type / access network is restricted for a specific IP traffic flow and/or a specific APN; and (ii) selecting the most preferable access technologies / access networks and/or APNs which shall be used by the UE when available to route IP traffic that matches specific criteria (e.g. all traffic to a specific APN, or all traffic belonging to a specific IP flow, or all traffic of a specific application, etc).

(iii) if the UE supports CSFB, selecting which IP traffic shall be handed over to a non-3GPP access if upon performing CS fallback the UE suspends the EPS bearers (e.g. all traffic to a specific APN, or all traffic belonging to a specific IP flow, or all traffic of a specific application, etc).

FIG. 17B

6.8.2.2.4.2 Use of Inter-system Mobility Policy

...

<u>Inter-system mobility policies for routing of IP traffic shall be used by a UE that is configured based on 3GPP TS 24.312 [xx] to move PS traffic to non-3GPP when performing CS Fallback to GERAN/UTRAN, as defined in 3GPP TS 23.272 [XX].</u>

....

6.8.2.2.4.4 Use of Inter-System Routing Policies

A UE that is IFOM capable or MAPCON capable or both shall use the ISRP if available. The ISRP if available in a UE that is not IFOM capable and not MAPCON capable will be ignored by that UE. <u>If the UE is configured as defined in 3GPP TS 24.312 [xx] to move PS traffic to non-3GPP when performing CS Fallback as defined in 3GPP TS 23.272 [XX] to GERAN/UTRAN, the UE shall use the ISRP to decide which traffic shall be moved to non-3GPP.</u>
A UE that is IFOM capable or MAPCON capable or both uses the ISRP to:-
- select an access technology or an access network or both for routing user plane traffic matching specific APNs identified in the ISRP;

- <u>-</u> select an access technology or an access network or both for routing user plane traffic matching specific IP flows identified in the ISRP;

- <u>if the UE supports CSFB, select which IP traffic shall be handed over to a non-3GPP access if upon performing CS fallback the UE suspends the EPS bearers (e.g. all traffic to a specific APN, or all traffic belonging to a specific IP flow, or all traffic of a specific application, etc).</u>

- decide if an access technology or access network or both are restricted for a specific APN identified in the ISRP; and

- decide if an access technology or access network or both are restricted for a specific IP flows identified in the ISRP.

The following definitions are added to TS 24.312:

IFOM capable UE: A UE that is capable of routing different IP flows to the same PDN connection through different access networks.
MAPCON capable UE: A UE that is capable of routing different simultaneously active PDN connections through different access networks.

The ANDSF MO defined in TS 24.302 is modified by adding the following (this is a pseudo stage 3 CR):

5.7 <X>/Policy/<X>/CSFallback
The CSFallback node indicates the preferences related to CS Fallback.
- Occurrence: One
- Format: node
- Access Types: Get, Replace
- Values: N/A 5.8 <X>/Policy/<X>/CSFallback/<X>
This interior node acts as a placeholder for one or more preferences related to CS Fallback.
- Occurrence: OneOrMore
- Format: node
- Access Types: Get, Replace
- Values: N/A 5.9 <X>/Policy/<X>/CSFallback/<X>/CSFallbackNon3GPPHandover
The CSFallbackNon3GPPHandover leaf indicates the policy for moving the PS traffic to a non-3GPP access when the UE triggers CS Fallback.
- Occurrence: One
- Format: chr
- Access Types: Get, Replace
- Values: <shall, should, shall not perform>
Shall – Indicates that the UE shall move PS traffic to non-3GPP upon performing CS Fallback
Should – Indicates that the UE should move PS traffic to non-3GPP upon performing CS Fallback
Shall not – Indicates that the UE shall not move PS traffic to non-3GPP upon performing CS Fallback

FIG. 19A

5.10 <X>/Policy/<X>/CSFallback/<X>/
CSFallbackNon3GPPIFOM
The CSFallbackNon3GPPMechanism leaf indicates the mechanism the UE can use to move PS traffic to a non-3GPP access when the UE triggers CS Fallback.
- Occurrence: One
- Format: bool
- Access Types: Get, Replace
- Values: 0,1
0 – Indicates that, if the UE is IFOM capable, then the UE shall not use IP Flow mobility to move PS traffic to non-3GPP upon performing CS Fallback
1 – Indicates that, if the UE is IFOM capable, then the UE may use IP Flow mobility to move PS traffic to non-3GPP upon performing CS Fallback 5.11 <X>/Policy/<X>/CSFallback/<X>/
CSFallbackNon3GPPMAPCON
The CSFallbackNon3GPPMechanism leaf indicates the mechanism the UE can use to move PS traffic to a non-3GPP access when the UE triggers CS Fallback.
- Occurrence: One
- Format: bool
- Access Types: Get, Replace
- Values: 0,1
0 – Indicates that, if the UE is MAPCON capable, then the UE shall not use IP Flow mobility to move PS traffic to non-3GPP upon performing CS Fallback
1 – Indicates that, if the UE is MAPCON capable, then the UE may use IP Flow mobility to move PS traffic to non-3GPP upon performing CS Fallback 5.12 <X>/Policy/<X>/CSFallback/<X>/
CSFallbackNon3GPPHandoverAPN
The CSFallbackNon3GPPHandoverAPN leaf indicates the policy related to APNs for the handover to a non-3GPP access when the UE triggers CS Fallback.
- Occurrence: OneOrMore
- Format: chr
- Access Types: Get, Replace
- Values: <APN>
APN is a value coded according to the structure for Access Point Name defined 3GPP TS 23.003. The APN indicates whether the UE shall or shall not handover the PDN connection corresponding to the APN to a non-3GPP access when the UE triggers CS Fallback.

FIG. 19B 5.13 <X>/Policy/<X>/CSFallback/<X>/
CSFallbackNon3GPPHandoverCSService
The CSFallbackNon3GPPHandoverCSService leaf indicates the policy related to CS services for the handover to a non-3GPP access when the UE triggers CS Fallback.
- Occurrence: One
- Format: bool
- Access Types: Get, Replace
- Values: 0, 1
0 - Indicates that the UE shall perform handover to non-3GPP access only when the UE triggers CS Fallback for voice
1 - Indicates that the UE shall not perform handover to non-3GPP access when the UE triggers CS Fallback also for other services (e.g. LCS)

5.14 <X>/Policy/<X>/CSFallback/<X>/
CSFallbackNon3GPPHandoverDelay
The CSFallbackNon3GPPHandoverDelay leaf indicates the policy related to when the UE moves the PS traffic to a non-3GPP access upon the UE triggering CS Fallback.
- Occurrence: One
- Format: int
- Access Types: Get, Replace
- Values: <Delay>
A Delay value of 0 indicates that the UE shall trigger the handover upon performing the CS Fallback
A Delay value different from 0 sahlle be interpreted by the UE as the delay in seconds before the UE shall trigger the handover after performing the CS Fallback

FIG. 19C 3.4.25 GPRS suspension procedure 3.4.25.1   General

This procedure enables the network to suspend GPRS services packet flow in the downlink direction. The support of this procedure is conditional to the support of GPRS by the mobile station.
When a mobile station which is IMSI attached for GPRS services (see 3GPP TS 24.008) enters the dedicated mode, and when the mobile station limitations make it unable to handle both dedicated mode and either packet idle mode or packet transfer mode simultaneously, the mobile station shall perform the GPRS suspension procedure. If the mobile station supports mobility to non-3GPP accesses (see 3GPP TS 24.302 and 3GPP TS 24.303), and if the mobile station is configured to handover the suspended bearers to a non-3GPP access (see 3GPP TS 24.312), then if a non-3GPP access is available the mobile station shall handover the suspended PS bearers to a non-3GPP access according to the mechanisms and conditions defined in 3GPP TS 24.302 and 3GPP TS 24.303.
The RR sublayer of the mobile station shall indicate a RR GPRS suspend condition to the MM sublayer, see 3GPP TS 24.008.

FIG. 20

6.5.1.2 UE requested PDN connectivity procedure initiation

When the PDN CONNECTIVITY REQUEST message is sent together with an ATTACH REQUEST message, the UE shall not include the APN.
...
The UE shall set the request type to "initial request" when the UE is establishing connectivity to a PDN for the first time, i.e. when it is an initial attach to that PDN. The UE shall set the request type to "emergency" when the UE is requesting PDN connectivity for emergency bearer services for the first time. The UE shall set the request type to "handover" when the connectivity to a PDN is established upon handover from a non-3GPP access network and the UE was connected to that PDN before the handover to the 3GPP access network, and when the PDN CONNECTIVITY REQUEST is piggybacked in ATTACH REQUEST and the UE indicates "combined EPS/IMSI attach" in the EPS attach type IE of the ATTACH REQUEST.

NOTE 2: For emergency bearer services, the handover from non-3GPP access to E-UTRA is not supported.

CR to 3GPP TS 23.272:

5.3.2 MME-initiated Detach procedure

The MME-initiated detach procedure for the CS fallback and SMS over SGs in EPS is realized based on the SGSN-Initiated Detach Procedure specified in TS 23.060 [3].

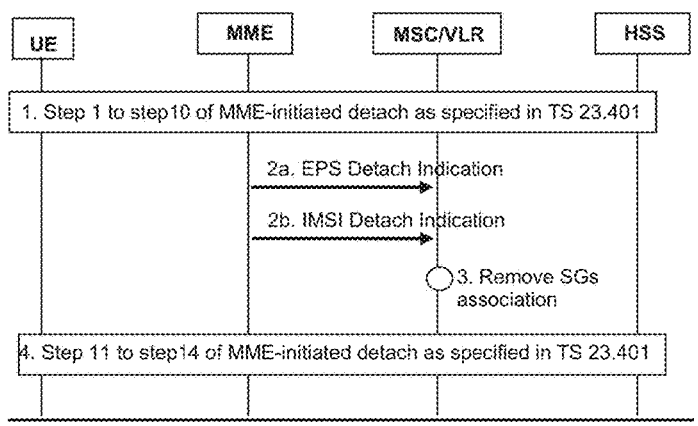

Figure 5.3.2-1: MME-initiated Detach Procedure

1) Either The the MME-initiated Detach procedure is performed as specified in TS 23.401 [2] or the PDN GW Initiated Bearer Deactivation procedure is performed as specified in TS 23.401 [2] for the last PDN connection.

2a) If EPS service is not allowed for the UE the MME sends an EPS Detach Indication (IMSI) message to the MSC/VLR.

2b) If the UE is required to be IMSI detached, the MME sends an IMSI Detach Indication (IMSI) message to the MSC/VLR. If the last PDN connection of the UE is being released with the PDN GW Initiated Bearer Deactivation procedure and if the EPS bearers corresponding to the PDN connection are suspended, step 2b is not performed.

3) The MSC/VLR removes the association with the MME.

4) The MME-initiated Detach procedure is completed with step 11 to step 14 as specified in TS 23.401 [2], or the PDN GW Initiated Bearer Deactivation procedure is completed as specified in TS 23.401 [2].

FIG. 22

These CRs apply to New Status in MME based on PDN GW Request.

CRs to 23.401

5.4.2 Bearer modification with bearer QoS update 5.4.3 PDN GW initiated bearer modification without bearer QoS update The bearer modification procedure without bearer QoS update is used to update the TFT for an active default or dedicated bearer, or to modify the APN-AMBR.

NOTE 1: If neither the contents of the TFT nor the APN-AMBR are modified, this procedure does not apply.

<u>The procedure is also used when the PDN GW receives the request to perform handover of a PDN connection to a non-3GPP access as specified in 3GPP TS 23.402 and the EPS bearers corresponding to the PDN connections are suspended due to the UE having performed a GPRS suspend procedure, e.g. during a CS Fallback procedure, as specified in 3GPP TS 23.272.</u>

The procedure for a GTP based S5/S8 is depicted in figure 5.4.3-1. In this procedure there is no need to update the underlying radio bearer(s). This procedure may be triggered if the APN-AMBR is changed by the PCRF/PDN GW.

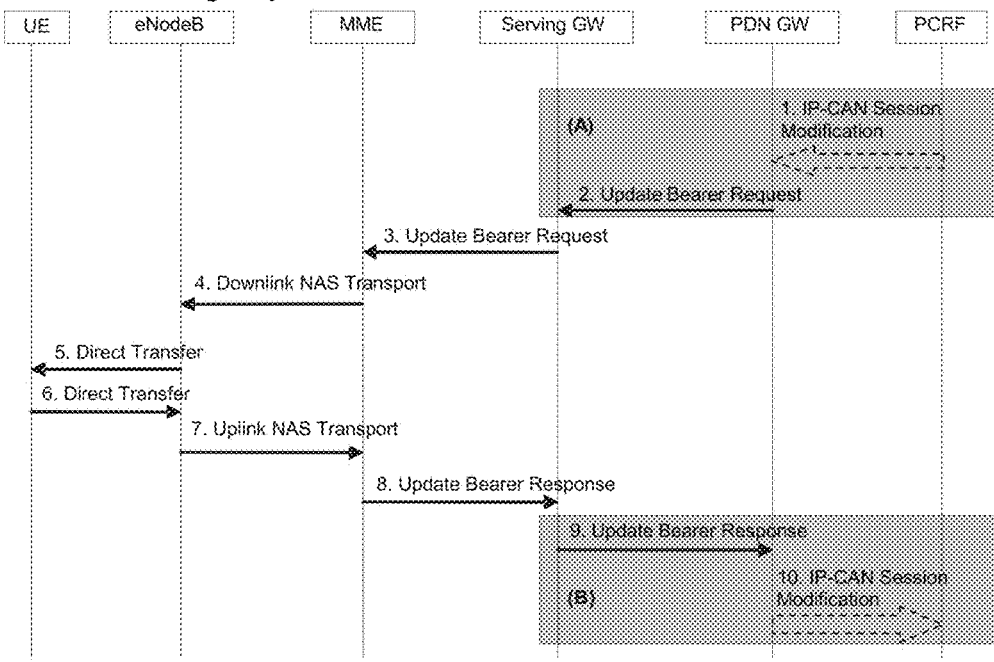

Figure 5.4.3-1: Bearer Modification Procedure without Bearer QoS Update

FIG. 23A

NOTE 2: Steps 3-8 are common for architecture variants with GTP based S5/S8 and PMIP-based S5/S8. For an PMIP-based S5/S8, procedure steps (A) and (B) are defined in TS 23.402 [2]. Steps 1, 2, 9 and 10 concern GTP based S5/S8. Steps 3-8 may also be used within the HSS Initiated Subscribed QoS Modification.

1. If dynamic PCC is deployed, the PCRF sends a PCC decision provision (QoS policy) message to the PDN GW. This corresponds to the beginning of the PCRF-initiated IP-CAN Session Modification procedure or to the PCRF response in the PCEF initiated IP-CAN Session Modification procedure as defined in TS 23.203 [6], up to the point that the PDN GW requests IP-CAN Bearer Signalling. If dynamic PCC is not deployed, the PDN GW may apply local QoS policy.

NOTE 3: if the PDN GW receives a request to handover the PDN connection to a non-3GPP access according to the procedures specified in 3GPP TS 23.402, then the PDN GW skips step 1.

2. The PDN GW uses this QoS policy to determine that a service data flow shall be aggregated to or removed from an active bearer. The PDN GW generates the TFT and determines that no update of the EPS Bearer QoS is needed. The PDN GW then sends the Update Bearer Request (PTI, EPS Bearer Identity, APN-AMBR, TFT) message to the Serving GW. The Procedure Transaction Id (PTI) parameter is used when the procedure was initiated by a UE Requested Bearer Resource Modification procedure – see clause 5.4.5.

If the PDN GW receives a request to handover the PDN connection to a non-3GPP access according to the procedures specified in 3GPP TS 23.402 and the EPS bearers corresponding to the PDN connection are suspended due to the UE having performed a GPRS suspend procedure, then the PDN GW sends the Update Bearer Request (PTI, EPS Bearer Identity, APN-AMBR, TFT, Cause) message to the Serving GW and the PDN GW sets the 'Cause' IE to 'RAT changed from 3GPP to Non-3GPP for suspended bearers'.

3. The Serving GW sends the Update Bearer Request (PTI, EPS Bearer Identity, APN-AMBR, TFT, Cause) message to the MME.

If the PDN GW has set the 'Cause' IE to 'RAT changed from 3GPP to Non-3GPP for suspended bearers', then the MME skips steps 4 to 7. The MME marks the EPS bearer context as "suspended EPS bearer over non-3GPP".

Otherwise, If the UE is in ECM-IDLE state the MME will trigger the Network Triggered Service Request from step 3 (which is specified in clause 5.3.4.3). In that case the following steps 4-7 may be combined into Network Triggered Service Request procedure or be performed standalone.

4a. Steps 4b to 7 are skipped if the UE is ECM-IDLE or the EPS bearers for the UE are suspended. If the PDN GW sets the 'Cause' IE to 'RAT changed from 3GPP to Non-3GPP for suspended bearers', the MME maintains the MM state of the UE to EMM-DEREGISTERED and marks the EPS bearer context as "suspended EPS bearer over non-3GPP".

4b. The MME builds a Session Management Request message including the TFT, APN-AMBR and EPS Bearer Identity. The MME then sends a Downlink NAS Transport (Session Management Configuration) message to the eNodeB. If the APN AMBR has changed, the MME may also update the UE AMBR. And if the UE-AMBR is updated, the MME signal a modified UE-AMBR value to the eNB by using S1-AP UE Context Modification Procedure.

...

8. The MME acknowledges the bearer modification to the Serving GW by sending an Update Bearer Response (EPS Bearer Identity) message. If the PDN GW has set the 'Cause' IE to 'RAT changed from 3GPP to Non-3GPP for suspended bearers', then the MME marks the EPS bearer context as "suspended EPS bearer over non-3GPP".

9. The Serving GW acknowledges the bearer modification to the PDN GW by sending an Update Bearer Response (EPS Bearer Identity) message. If the PDN GW has set the 'Cause' IE to 'RAT changed from 3GPP to Non-3GPP for suspended bearers', then the Serving GW marks the EPS bearer context as "suspended EPS bearer over non-3GPP".

FIG. 23B

10. If the bearer modification procedure was triggered by a PCC Decision Provision message from the PCRF, the PDN GW indicates to the PCRF whether the requested PCC decision (QoS policy) could be enforced or not by sending a Provision Ack message. This then allows the PCRF-Initiated IP-CAN Session Modification procedure or the PCEF initiated IP-CAN Session Modification procedure as defined in TS 23.203 [6] to continue and eventually conclude, proceeding after the completion of IP-CAN bearer signalling.

NOTE 3: The exact signalling of step 1 and 10 (e.g. for local break-out) is outside the scope of this specification. This signalling and its interaction with the bearer activation procedure are to be specified in TS 23.203 [6]. Steps 1 and 10 are included here only for completeness.

5.4.4 Bearer deactivation

5.4.4.1 PDN GW initiated bearer deactivation

The bearer deactivation procedure for a GTP based S5/S8 is depicted in figure 5.4.4.1-1. In this procedure, the UE is assumed to be in ECM-CONNECTED. This procedure can be used to deactivate a dedicated bearer or deactivate all bearers belonging to a PDN address. If the default bearer belonging to a PDN connection is deactivated, the PDN GW deactivates all bearers belonging to the PDN connection.

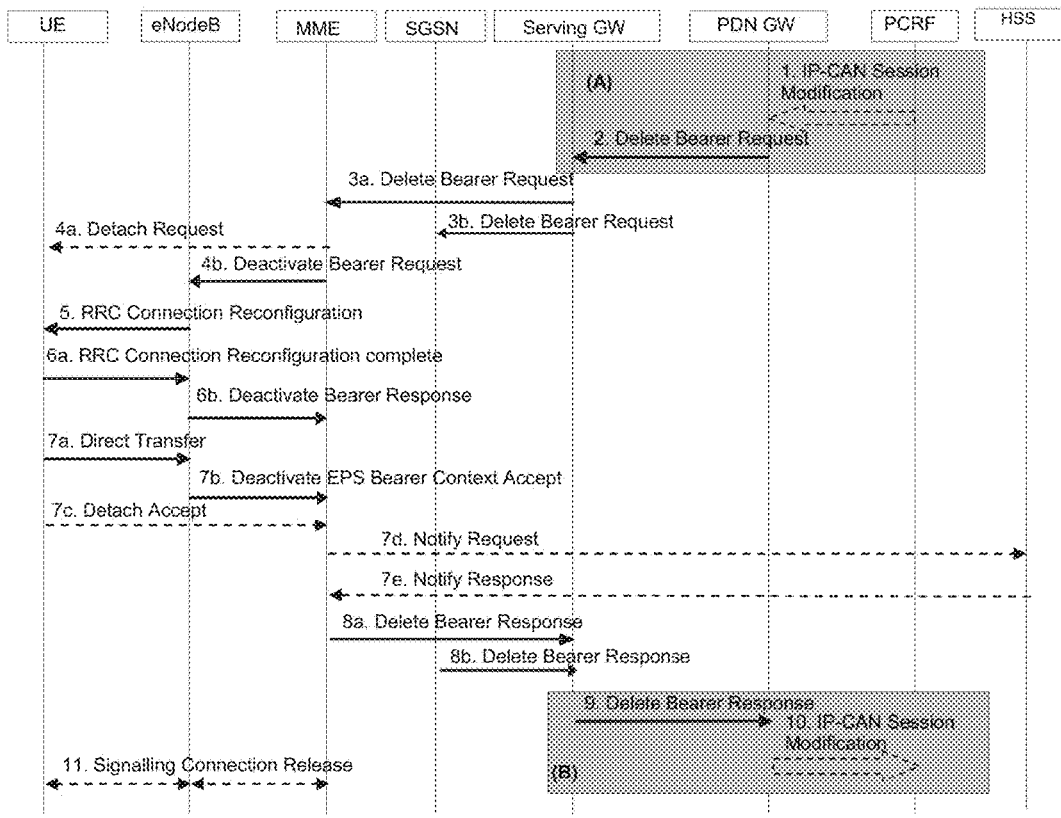

Figure 5.4.4.1-1: PDN GW Initiated Bearer Deactivation, UE in active mode

FIG. 23C

NOTE 1: Steps 3-8 are common for architecture variants with GTP based S5/S8 and PMIP-based S5/S8. For an PMIP-based S5/S8, procedure steps (A) and (B) are defined in TS 23.402 [2]. Steps 1, 2, 9 and 10 concern GTP-based S5/S8.

1. If dynamic PCC is not deployed ...

2. The PDN GW sends a Delete Bearer Request (PTI, EPS Bearer Identity, Causes) message to the Serving GW. The Procedure Transaction Id (PTI) parameter in this step and in the following steps is only used when the procedure was initiated by a UE Requested Bearer Resource Modification Procedure - see clause 5.4.5. This message can include an indication that all bearers belonging to that PDN connection shall be released. The PDN GW includes 'Cause' IE in the Delete Bearer Request message and sets the IE to 'RAT changed from 3GPP to Non-3GPP' if the Delete Bearer Request message is caused by handover without optimization occurs from 3GPP to non-3GPP. The PDN GW sets the 'Cause' IE to 'RAT changed from 3GPP to Non-3GPP for suspended bearers' if the Delete Bearer Request message is caused by handover without optimization occurs from 3GPP to non-3GPP and the EPS bearers corresponding to the PDN connection are suspended.

...

7d. The MME should send a Notify Request to the HSS/AAA to remove the corresponding APN and PDN GW identity pairs for this UE if all the bearers belonging to this PDN connection are deactivated and this is the last PDN connection for the APN for the same UE and the subscription data indicates that the user is allowed to perform handover to non-3GPP accesses. MME shall skip this step when the release cause indicated by PDN GW is set to 'RAT changed from 3GPP to Non-3GPP' or to 'RAT changed from 3GPP to Non-3GPP for suspended bearers'.

For the emergency PDN connection the MME shall not send any Notify Request to an HSS.

NOTE 4: When the handover to non-3GPP access is unlikely, a VPLMN's operator may configure the MME NOT to send notification to the HSS. All MMEs and S4-SGSNs in the VPLMN should be configured in the same way to ensure consistency.

7e. After receiving the Notify request from MME, the HSS removes corresponding APN and PDN GW identity pairs that were dynamically stored and sends a Notify Response to the MME.

8a. If the PDN GW sets the 'Cause' IE to 'RAT changed from 3GPP to Non-3GPP for suspended bearers', the MME maintains the bearer context related to the EPS bearers and marks the bearer context as "suspended EPS bearer over non-3GPP", otherwise tThe MME deletes the bearer context related to the deactivated EPS bearer. and The MME acknowledges the bearer deactivation to the Serving GW by sending a Delete Bearer Response (EPS Bearer Identity) message.

8b. The SGSN deletes PDP Context related to the deactivated EPS bearer and acknowledges the bearer deactivation to the Serving GW by sending a Delete Bearer Response (EPS Bearer Identity) message.

9. If ISR is activated, after receiving the two Delete Bearer Response messages from the MME and the SGSN, or if ISR is not activated, after receiving the Delete Bearer Response messages from the MME, if the PDN GW sets the 'Cause' IE to 'RAT changed from 3GPP to Non-3GPP for suspended bearers', the Serving GW maintains the bearer context related to the EPS bearers and marks the bearer context as "suspended EPS bearer over non-3GPP", otherwise the Serving GW deletes the bearer context related to the deactivated EPS bearer. The Serving GW acknowledges the bearer deactivation to the PDN GW by sending a Delete Bearer Response (EPS Bearer Identity) message.

10. if the PDN GW sets the 'Cause' IE to 'RAT changed from 3GPP to Non-3GPP for suspended bearers', the PDN GW maintains the bearer context related to the EPS bearers and marks the bearer context as "suspended EPS bearer over non-3GPP", otherwise The the PDN GW deletes the bearer context related to the deactivated EPS bearer. If the dedicated bearer deactivation procedure was triggered by receiving a PCC decision message from the PCRF, the PDN GW indicates to the PCRF whether the requested PCC decision was successfully enforced by completing the PCRF-initiated IP-CAN Session Modification procedure or the PCEF initiated IP-CAN Session Modification procedure as defined in TS 23.203 [6], proceeding after the completion of IP-CAN bearer signalling.

FIG. 23D

11. If the UE is being explicitly detached , the MME releases the S1-MME signalling connection for the UE by sending an S1 Release Command (Cause) message to the eNodeB. The details of this step are covered in the "S1 Release Procedure", as described in clause 5.3.5 by step 4 to step 6.

NOTE 5: The exact signalling of step 1 and 10 (e.g. for local break-out) is outside the scope of this specification. This signalling and its interaction with the dedicated bearer activation procedure are to be specified in TS 23.203 [6]. Steps 1 and 10 are included here only for completeness.

Steps 4 to 7 are not performed when the UE is in (a) ECM-IDLE and the last PDN connection of the UE is not being deleted or (b) UE is in ECM-IDLE and the last PDN connection is deleted due to ISR deactivation or due to handover to non-3GPP access. The EPS bearer state is synchronized between the UE and the network at the next ECM-IDLE to ECM-CONNECTED transition (e.g. Service Request or TAU procedure).
If all the bearers belonging to a UE are released, the MME shall change the MM state of the UE to EMM-DEREGISTERED and the MME sends the S1 Release Command to the eNodeB, which initiates the release of the RRC connection for the given UE if it is not released yet, and returns an S1 Release Complete message to the MME. <u>If all the bearers belonging to a UE are released and if the PDN GW sets the 'Cause' IE to 'RAT changed from 3GPP to Non-3GPP for suspended bearers', the MME maintains the MM state of the UE to EMM-DEREGISTERED.</u>
...

FIG. 23E

CRs to TS 29.274 for SGW and PGW Suspension Behavior. These apply to new Status in MME based on PDN GW Request and New Status in MME based on bearer Suspension and Hand Over.

7.4 CS Fallback and SRVCC related messages

7.4.1 Suspend Notification

The Suspend Notification message shall be sent on the S11 interface by the MME to the SGW and on the S5/S8 interface by the SGW to the PGW as part of the 1xRTT CS fallback procedures in 3GPP TS 23.272 [21].
The Suspend Notification message shall be sent on the S3 interface by the SGSN to the MME, on the S11 interface by the MME to the SGW, and on the S5/S8 interface by the SGW to the PGW as part of the SRVCC procedures in 3GPP TS 23.216 [43] or the CS fallback from E-UTRAN access to UTRAN/GERAN CS domain access related procedures in 3GPP TS 23.272 [21].
The Suspend Notification message shall be sent on the S16 interface as per the inter-SGSN suspend procedures in 3GPP TS 23.060 [35].
The Suspend Notification message shall be sent on the S16, the S4 and the S5/S8 interfaces as part of the SRVCC from UTRAN (HSPA) to GERAN without DTM support procedure in 3GPP TS 23.216 [43].
The Suspend Notification message shall be sent on the S4 and the S5/S8 interfaces as part of the CS fallback from E-UTRAN to GERAN CS domain related procedures in 3GPP TS 23.272 [21].
After receiving a Suspend Notification message, the SGW/PGW should discard packets it receives for the suspended UE. <u>After receiving a Suspend Notification message, the MME and the SGW and the PGW shall mark the UE EPS bearers as "suspended EPS bearer over non-3GPP".</u>

Table 7.4.1-1 specifies the presence requirements and conditions of the IEs in the message.

Table 7.4.1-1: Information Element in Suspend Notification

| Information elements | P | Condition / Comment | IE Type | Ins. |
|---|---|---|---|---|
| IMSI | C | This IE shall be included only on the S11 interface. | IMSI | 0 |
| Routeing Area Identity(RAI) | C | This IE shall be included only on the S3 interface. | ULI for RAI | 0 |
|  | CO | This IE shall be included on the S16 interface. |  |  |
| Linked Bearer Identity (LBI) | CO | This IE shall be included on the S11/S4 interface to indicate the default bearer associated with the PDN connection. | EBI | 0 |
| Packet TMSI(P-TMSI) | C | This IE shall be included only on the S3 interface. | P-TMSI | 0 |
|  | CO | This IE shall be included on the S16 interface. |  |  |
| Private Extension | O |  | Private Extension | VS |

FIG. 24

CRs to TS 29.274 for MME Suspension Behavior.

These apply to concept 6.2. change of status in MME for the option where there is a new ESM state.

7.4 CS Fallback and SRVCC related messages

7.4.1 Suspend Notification

The Suspend Notification message shall be sent on the S11 interface by the MME to the SGW and on the S5/S8 interface by the SGW to the PGW as part of the 1xRTT CS fallback procedures in 3GPP TS 23.272 [21].

The Suspend Notification message shall be sent on the S3 interface by the SGSN to the MME, on the S11 interface by the MME to the SGW, and on the S5/S8 interface by the SGW to the PGW as part of the SRVCC procedures in 3GPP TS 23.216 [43] or the CS fallback from E-UTRAN access to UTRAN/GERAN CS domain access related procedures in 3GPP TS 23.272 [21].

The Suspend Notification message shall be sent on the S16 interface as per the inter-SGSN suspend procedures in 3GPP TS 23.060 [35].

The Suspend Notification message shall be sent on the S16, the S4 and the S5/S8 interfaces as part of the SRVCC from UTRAN (HSPA) to GERAN without DTM support procedure in 3GPP TS 23.216 [43].

The Suspend Notification message shall be sent on the S4 and the S5/S8 interfaces as part of the CS fallback from E-UTRAN to GERAN CS domain related procedures in 3GPP TS 23.272 [21].

After receiving a Suspend Notification message, the SGW/PGW should discard packets it receives for the suspended UE. <u>After receiving a Suspend Notification message, the MME shall mark the UE EPS bearers as "suspended EPS bearer over non-3GPP". After receiving a Suspend Notification message, the MME shall set the UE status per EPS bearer context to BEARER CONTEXT SUSPENDED.</u>

Table 7.4.1-1 specifies the presence requirements and conditions of the IEs in the message.

Table 7.4.1-1: Information Element in Suspend Notification

| Information elements | P | Condition / Comment | IE Type | Ins. |
|---|---|---|---|---|
| IMSI | C | This IE shall be included only on the S11 interface. | IMSI | 0 |
| Routeing Area Identity(RAI) | C | This IE shall be included only on the S3 interface. | ULI for RAI | 0 |
|  | CO | This IE shall be included on the S16 interface. |  |  |
| Linked Bearer Identity (LBI) | CO | This IE shall be included on the S11/S4 interface to indicate the default bearer associated with the PDN connection. | EBI | 0 |
| Packet TMSI(P-TMSI) | C | This IE shall be included only on the S3 interface. | P-TMSI | 0 |
|  | CO | This IE shall be included on the S16 interface. |  |  |
| Private Extension | O |  | Private Extension | VS |

FIG. 25

CRs to TS 29274 for SGW and PGW and MME. These apply to New Status in MME based on PDN GW Request.

7.2.9.2 Delete Bearer Request

The direction of this message shall be from PGW to SGW and from SGW to MME/S4-SGSN (see Table 6.1-1).
A Delete Bearer Request message shall be sent as part of the following procedures:
- PGW or MME initiated bearer deactivation procedures,
- UE requested Bearer Resource Modification,
- MS and SGSN Initiated Bearer Deactivation procedure using S4 or
- PGW initiated bearer deactivation procedure using S4.

In the above cases, this Request is sent by the PGW to the SGW and shall be forwarded to the MME or S4-SGSN.
The message shall also be sent on the S4/S11 interface by the SGW to the SGSN/MME to delete the bearer resources on the other ISR associated CN node if the ISRAI flag is not set in the Modify Bearer Request message.
The message shall also be sent on the S4/S11 interface by the SGW to the SGSN/MME to delete the bearer resources on the other ISR associated CN node in the TAU/RAU/Handover procedures if the ISR related Cause IE is included in the Delete Session Request message.
Possible Cause values are:
- "RAT changed from 3GPP to Non-3GPP",
- "ISR deactivation".

FIG. 26A

Table 7.2.9.2-1 specifies the presence of IEs in this message.

Table 7.2.9.2-1: Information Elements in a Delete Bearer Request

| Information elements | P | Condition / Comment | IE Type | Ins. |
|---|---|---|---|---|
| Linked EPS Bearer ID (LBI) | C | If the request corresponds to the bearer deactivation procedure in case all bearers belonging to a PDN connection shall be released, then this IE shall be included to indicate the default bearer associated with the PDN being disconnected.<br>This IE shall be included only when the EPS Bearer ID is not present in the message. | EBI | 0 |
| EPS Bearer IDs | C | This IE shall be used for bearers different from the default one, i.e., for dedicated bearers. In this case at least one dedicated bearer shall be included.<br>Several IEs with this type and instance values shall be included as necessary to represent a list of Bearers. | EBI | 1 |
| Failed Bearer Contexts | O | This IE may be included if the request corresponds to MME initiated bearer deactivation procedure. This IE shall contain the list of failed bearers if partial Bearer Contexts included in the Delete Bearer Command message could not be deleted. | Bearer Context | 0 |
| Procedure Transaction Id (PTI) | C | If the request corresponds to UE requested bearer resource modification procedure for an E-UTRAN, this IE shall be included. | PTI | 0 |
| Protocol Configuration Options (PCO) | C | PGW shall include Protocol Configuration Options (PCO) IE, if available.<br>If SGW receives this IE, SGW shall forward it to SGSN/MME on the S4/S11 interface. | PCO | 0 |
| PGW-FQ-CSID | C | This IE shall be included by the PGW on the S5/S8 interface and shall be forwarded by the SGW on the S11 interface according to the requirements in 3GPP TS 23.007 [17]. | FQ-CSID | 0 |
| SGW-FQ-CSID | C | This IE shall be included by the SGW on the S11 interface according to the requirements in 3GPP TS 23.007 [17]. | FQ-CSID | 1 |
| Cause | C | This IE shall be sent on S11/S4 and S5/S8 interfaces if the message is caused by handover without optimization occurs from 3GPP to non-3GPP. In this case, the Cause value shall be set to "RAT changed from 3GPP to Non-3GPP, bearers suspended'" if the EPS bearers being handed over are suspended, and the PGW or the MME shall mark the EPS bearer contexts as "suspended EPS bearer over non-3GPP" and the PDN connection contexts as "suspended PDN connection over non-3GPP". The MME shall set the UE EPS bearer context state in ESM to BEARER CONTEXT SUSPENDED ON NON-3GPP ACCESS or the MME shall set the UE EMM state to EMM-Registered.Suspended.non3GPP. The SGSN shall set the UE state to GMM-REGISTERED.SUSPENDED.NON-3GPP. Otherwise, the Cause value shall be set to "RAT changed from 3GPP to Non-3GPP".<br>This IE shall also be sent on S11/S4 interfaces when the SGW requests to delete all bearer contexts in an MME or S4-SGSN due to ISR deactivation, and its Cause value shall then be set to "ISR deactivation". | Cause | 0 |
| Private Extension | O | | Private Extension | VS |

FIG. 26B 7.2.15  Update Bearer Request

The direction of this message shall be from PGW to SGW and/or from SGW to MME/S4-SGSN (see Table 6.1-1).
For GTP based S5/S8, the Update Bearer Request shall be sent by the PGW to the SGW and forwarded to the MME as part of the following procedures:
- PGW Initiated Bearer Modification with Bearer QoS Update

- HSS Initiated Subscribed QoS Modification

- PGW Initiated Bearer Modification without Bearer QoS Update

- UE Request Bearer Resource Modification procedure

The message shall also be sent on the S5/S8 interface by the PGW to the SGW and on the S4 interface by the SGW to the SGSN as part of the following procedures:
- PGW Initiated EPS Bearer Modification

- Execution part of MS-Initiated EPS Bearer Modification

- SGSN-Initiated EPS Bearer Modification Procedure using S4

For PMIP based S5/S8, the Update Bearer Request shall be sent on the S11 interface by the SGW to the MME and on the S4 interface by the SGW to the SGSN.
Table 7.2.15-1 specifies the presence requirements and the conditions of the IEs in the message.

FIG. 26C

Table 7.2.15-1: Information Elements in an Update Bearer Request

| Information elements | P | Condition / Comment | IE Type | Ins. |
|---|---|---|---|---|
| Bearer Contexts | M | This IE shall contain contexts related to bearers that need QoS/TFT modification. Several IEs with this type and instance values shall be included as necessary to represent a list of Bearers. If there is no QoS/TFT modification, only one IE with this type and instance value shall be included. | Bearer Context | 0 |
| Procedure Transaction Id (PTI) | C | If the request corresponds to UE requested bearer resource modification procedure for an E-UTRAN or MS initiated EPS bearer modification procedure, this IE shall be included. PTI shall be the same as the one used in the corresponding Bearer Resource Command | PTI | 0 |
| Protocol Configuration Options (PCO) | C | PGW shall include Protocol Configuration Options (PCO) IE, if available. If SGW receives this IE, SGW shall forward it to SGSN/MME on the S4/S11 interface. | PCO | 0 |
| Aggregate Maximum Bit Rate (APN-AMBR) | M | APN-AMBR | AMBR | 0 |
| Change Reporting Action | C | This IE shall be included with the appropriate Action field if the location Change Reporting mechanism is to be started or stopped for this subscriber in the SGSN/MME. | Change Reporting Action | 0 |
| CSG Information Reporting Action | CO | This IE shall be included with the appropriate Action field if the CSG Info reporting mechanism is to be started or stopped for this subscriber in the SGSN/MME. | CSG Information Reporting Action | 0 |
| PGW-FQ-CSID | C | This IE shall be by PGW on S5/S8 and shall be forwarded by SGW on S11 according to the requirements in 3GPP TS 23.007 [17]. | FQ-CSID | 0 |
| SGW-FQ-CSID | C | This IE shall be included by SGW on S11 according to the requirements in 3GPP TS 23.007 [17]. | FQ-CSID | 1 |
| <u>Cause</u> | <u>C</u> | <u>This IE shall be sent on S11/S4 and S5/S8 interfaces if the message is caused by handover without optimization occurs from 3GPP to non-3GPP and if the EPS bearers being handed over are suspended. In this case, the Cause value shall be set to "RAT changed from 3GPP to Non-3GPP", and the PGW or the MME shall mark the EPS bearer contexts as "suspended EPS bearer over non-3GPP" and the PDN connection contexts as "suspended PDN connection over non-3GPP". The MME shall set the UE EPS bearer context to BEARER CONTEXT SUSPENDED ON NON-3GPP ACCESS or the MME shall set the UE EMM state to EMM-Registered.Suspended.non3GPP. The SGSN shall set the UE state to GMM-REGISTERED SUSPENDED NON-3GPP.</u> | <u>Cause</u> | <u>0</u> |
| Private Extension | O | | Private Extension | VS |

8.4 Cause

Cause IE is coded as depicted in Figure 8.4-1.

| Octets | Bits 8 | 7 | 6 | 5 | 4 | 3 | 2 | 1 |
|---|---|---|---|---|---|---|---|---|
| 1 | Type = 2 (decimal) ||||||||
| 2 to 3 | Length = n ||||||||
| 4 | Spare |||| Instance ||||
| 5 | Cause value ||||||||
| 6 | Spare ||||| PCE | BCE | CS |
| a(n+1) | Type of the offending IE ||||||||
| a(n+2) to a(n+3) | Length of the offending IE = 0 ||||||||
| a(n+4) | Spare |||| Instance ||||

1) Figure 8.4-1: Cause

FIG. 26E

Table 8.4-1: Cause values

| Message Type | Cause value (decimal) | Meaning |
|---|---|---|
| | 0 | Reserved. Shall not be sent and if received the Cause shall be treated as an invalid IE |
| Request | 1 | Reserved |
| | 2 | Local Detach |
| | 3 | Complete Detach |
| | 4 | RAT changed from 3GPP to Non-3GPP |
| | 5 | ISR deactivation |
| | 6 | Error Indication received from RNC/eNodeB |
| | 7 | RAT changed from 3GPP to Non-3GPP |
| | 7 8 to 15 | Spare. This value range is reserved for Cause values in a request message |
| Acceptance Response | 16 | Request accepted |
| | 17 | Request accepted partially |
| | 18 | New PDN type due to network preference |
| | 19 | New PDN type due to single address bearer only |
| | 20 to -63 | Spare. This value range is reserved for Cause values in acceptance response message |
| Rejection Response | 64 | Context Not Found |
| | 65 | Invalid Message Format |
| | 66 | Version not supported by next peer |
| | 67 | Invalid length |
| | 68 | Service not supported |
| | 69 | Mandatory IE incorrect |
| | 70 | Mandatory IE missing |
| | 71 | Reserved |
| | 72 | System failure |
| | 73 | No resources available |
| | 74 | Semantic error in the TFT operation |
| | 75 | Syntactic error in the TFT operation |
| | 76 | Semantic errors in packet filter(s) |
| | 77 | Syntactic errors in packet filter(s) |
| | 78 | Missing or unknown APN |
| | 79 | Reserved |
| | 80 | GRE key not found |
| | 81 | Relocation failure |
| | 82 | Denied in RAT |
| | 83 | Preferred PDN type not supported |
| | 84 | All dynamic addresses are occupied |
| | 85 | UE context without TFT already activated |
| | 86 | Protocol type not supported |
| | 87 | UE not responding |
| | 88 | UE refuses |
| | 89 | Service denied |
| | 90 | Unable to page UE |
| | 91 | No memory available |
| | 92 | User authentication failed |
| | 93 | APN access denied – no subscription |
| | 94 | Request rejected |
| | 95 | P-TMSI Signature mismatch |
| | 96 | IMSI not known |
| | 97 | Semantic error in the TAD operation |
| | 98 | Syntactic error in the TAD operation |
| | 99 | Reserved Message Value Received |
| | 100 | Remote peer not responding |
| | 101 | Collision with network initiated request |
| | 102 | Unable to page UE due to Suspension |
| | 103 | Conditional IE missing |
| | 104 | APN Restriction type Incompatible with currently active PDN connection |
| | 105 | Invalid overall length of the triggered response message and a piggybacked |

FIG. 26F

| | | initial message |
|---|---|---|
| | 106 | Data forwarding not supported |
| | 107 | Invalid reply from remote peer |
| | 220 to 255 | Reserved for 3GPP Specific PMIPv6 Error Codes as defined in 3GPP TS 29.275 [26] |
| NOTE: | \multicolumn{2}{l|}{The listed cause values for rejection response message can be also used for request messages if the request message is triggered by a command message.} |

FIG. 26G

CRs to 24.301 for New Status in MME based on PDN GW Request and New Status in MME based on Bearer Suspension and Hand Over.

This CR describes the UE status in both New Status in MME based on PDN GW Request and New Status in MME based on Bearer Suspension and Hand Over.

CRs Related to UE State – option with new UE and MME status in ESM 6.1.3  ESM sublayer states ...
    6.1.3.2  ESM sublayer states in the UE 6.1.3.2.1 BEARER CONTEXT INACTIVE No EPS bearer context exists.
      6.1.3.2.2 BEARER CONTEXT ACTIVE The EPS bearer context is active in the UE.
    <u>6.1.3.2.2 BEARER CONTEXT SUSPENDED ON NON-3GPP ACCESS</u>

<u>The EPS bearer context is active in the UE but is suspended and transferred to non-3GPP.</u>

CRs Related to UE State - option with new UE and MME state in EMM

*5.1.3*  EMM sublayer states 5.1.3.2  EMM sublayer states in the UE 5.1.3.2.1 *General*

In the following subclauses, the possible EMM states of an EMM entity in the UE are described. Subclause 5.1.3.2.2 summarizes the main states of an EMM entity. The substates that have been defined are described in subclause 5.1.3.2.3 and subclause 5.1.3.2.4.
It should be noted, however, that this subclause does not include a description of the detailed behaviour of the UE in the single states and does not cover abnormal cases. A detailed description of the behaviour of the UE is given in subclause 5.2. For the behaviour of the UE in abnormal cases refer to the description of the elementary EMM procedures in subclauses 5.4, 5.5, 5.6 and 5.7.
    *5.1.3.2.2  Main states*

FIG. 27A

5.1.3.2.2.4    EMM-REGISTERED

In the state EMM-REGISTERED an EMM context has been established and a default EPS bearer context has been activated in the UE. When the UE is in EMM-IDLE mode, the UE location is known to the MME with an accuracy of a list of tracking areas containing a certain number of tracking areas. When the UE is in EMM-CONNECTED mode, the UE location is known to the MME with an accuracy of a serving eNodeB. The UE may initiate sending and receiving user data and signalling information and reply to paging. Additionally, tracking area updating or combined tracking area updating procedure is performed (see subclause 5.5.3).

...

*5.1.3.2.4    Substates of state EMM-REGISTERED*

5.1.3.2.4.1    General

The state EMM-REGISTERED is subdivided into a number of substates as described in this subclause.

5.1.3.2.4.2    EMM-REGISTERED.NORMAL-SERVICE

The substate EMM-REGISTERED.NORMAL-SERVICE is chosen by the UE as the primary substate when the UE enters the state EMM-REGISTERED.

<u>5.1.3.2.4.2    EMM-REGISTERED.SUSPENDED.NON-3GPP</u>

<u>The UE shall enter this substate when the UE has performed CS Fallback and has performed the GPRS suspend procedure, and has handed over the PDP contexts to a non-3GPP access.</u>

...

5.2.3    UE behaviour in state EMM-REGISTERED

...

5.2.3.2    Detailed description of UE behaviour in state EMM-REGISTERED 5.2.3.2.8    IMSI-DETACH-INITIATED The UE:
- shall be able to receive and transmit user data and signalling information; and
- shall initiate combined tracking area updating procedure (see subclause 5.5.3.3).

FIG. 27B

5.2.3.2.X REGISTERED.SUSPENDED.NON-3GPP

The UE shall enter this substate when the UE has performed CS Fallback and has performed the GPRS suspend procedure, and has handed over the PDP contexts to a non-3GPP access. In this substate, no user data should be sent and no signalling information shall be sent. The UE shall leave this substate when reselecting to E-UTRAN or when the UE performs the handover of all PDN connections from a non-3GPP access to a 3GPP access.

CRs Related to TAU Usage
 These apply both to the option with new state in ESM and new state in EMM.

5.5.3.2.2 Normal and periodic tracking area updating procedure initiation
The UE in state EMM-REGISTERED shall initiate the tracking area updating procedure by sending a TRACKING AREA UPDATE REQUEST message to the MME,
 ...

o) when the UE is in ESM BEARER CONTEXT SUSPENDED ON NON-3GPP ACCESS or in EMM state EMM-REGISTERED.SUSPENDED.NON-3GPP and the UE enters S1 mode after CS fallback p) when the UE performs an intersystem change from A/Gb mode to S1 mode and the EPS services were previously suspended in A/Gb mode and the UE had handed over one or more EPS bearers to a non-3GPP access

...

When UE initiates the tracking area updating procedure and it has EPS bearers in state ESM BEARER CONTEXT SUSPENDED ON NON-3GPP ACCESS or the UE is in state EMM-REGISTERED.SUSPENDED.NON-3GPP, the UE shall include a request type set to "handover".

When UE initiates the tracking area updating procedure, the UE shall include a request type set to "handover" if the UE performs an intersystem change from A/Gb mode to S1 and the EPS services were previously suspended in A/Gb mode and the UE had handed over one or more EPS bearers to a non-3GPP access network.

If the UE supports A/Gb mode or Iu mode, the UE shall handle the Old GUTI IE as follows:
- If the TIN indicates "P-TMSI" and the UE holds a valid P-TMSI and RAI, the UE shall map the P-TMSI and RAI into the Old GUTI IE. If a P-TMSI signature is associated with the P-TMSI, the UE shall include it in the Old P-TMSI signature IE. Additionally, if the UE holds a valid GUTI, the UE shall indicate the GUTI in the Additional GUTI IE.

NOTE 2: The mapping of the P-TMSI and RAI to the GUTI is specified in 3GPP TS 23.003 [2].

- If the TIN indicates "GUTI" or "RAT-related TMSI" and the UE holds a valid GUTI, the UE shall indicate the GUTI in the Old GUTI IE.

- <u>If the TIN indicates "P-TMSI" and the UE holds a valid GUTI and the UE has EPS bearers in state ESM BEARER CONTEXT SUSPENDED ON NON-3GPP ACCESS or the UE is in state EMM-REGISTERED.SUSPENDED.NON-3GPP, the UE shall indicate the GUTI in the Old GUTI IE</u>

- <u>If the TIN indicates "P-TMSI" and the UE holds a valid GUTI and if the UE performs an intersystem change from A/Gb mode to S1 and the EPS services were previously suspended in A/Gb mode and if the UE had handed over one or more EPS bearers to a non-3GPP access network, then the UE shall indicate the GUTI in the Old GUTI IE</u>

...

Alternative 1: MME re-establishes the bearers upon TAU

5.5.3.2.4     Normal and periodic tracking area updating procedure accepted by the network If the tracking area update request has been accepted by the network, the MME shall send a TRACKING AREA UPDATE ACCEPT message to the UE.

<u>If the UE EPS bearer contexts in the MME are marked as "suspended EPS bearer over non-3GPP" or the UE is in state EMM-SUSPENDED.NON-3GPP in the MME, and the UE provides a Request Type set to "handover", the MME shall re-establish the EPS bearer contexts and perform a bearer modification procedure.</u>

<u>If the UE EPS bearer contexts are in ESM BEARER CONTEXT SUSPENDED ON NON-3GPP ACCESS in the MME or the UE is in state EMM-SUSPENDED.NON-3GPP in the MME and the UE provides a Request Type set to "handover", the MME shall re-establish the EPS bearer contexts and perform a bearer modification procedure.</u>

If an EPS bearer context status IE is included in the TRACKING AREA UPDATE REQUEST message, the MME shall deactivate all those EPS bearer contexts locally (without peer-to-peer signalling between the MME and the UE) which are active <u>or in state ESM BEARER CONTEXT SUSPENDED ON NON-3GPP ACCESS</u> on the network side <u>or the UE is in state EMM-SUSPENDED.NON-3GPP in the MME</u>, but are indicated by the UE as being inactive.

FIG. 27D

Alternative 2: the UE provides in the EPS bearer context status IE an indication of which EPS bearers are in the special status and the MME deletes the ones that the UE indicate are not active and reconnect the others.

> 5.5.3.2.4 Normal and periodic tracking area updating procedure accepted by the network
>
> If the tracking area update request has been accepted by the network, the MME shall send a TRACKING AREA UPDATE ACCEPT message to the UE.
> ...
> If an EPS bearer context status IE is included in the TRACKING AREA UPDATE REQUEST message, the MME shall deactivate all those EPS bearer contexts locally (without peer-to-peer signalling between the MME and the UE) which are active on the network side, but are indicated by the UE as being inactive. If a default EPS bearer context is marked as inactive in the EPS bearer context status IE included in the TRACKING AREA UPDATE REQUEST message, and this default bearer is not associated with the last PDN of the user in the MME, the MME shall locally deactivate all EPS bearer contexts associated to the PDN connection with the default EPS bearer context without peer-to-peer ESM signalling to the UE.
> If EPS bearer context status IE is included in the TRACKING AREA UPDATE REQUEST message and the UE is in ESM state BEARER CONTEXT SUSPENDED ON NON-3GPP ACCESS in the MME or the UE is in state EMM-SUSPENDED.NON-3GPP in the MME, the MME shall deactivate all those EPS bearer contexts locally (without peer-to-peer signalling between the MME and the UE) which are active on the network side, but are indicated by the UE as being inactive. The MME shall re-establish the EPS bearers if the UE in ESM state BEARER CONTEXT SUSPENDED ON NON-3GPP ACCESS and that are indicated by the UE as requiring re-establishment, or the MME shall re-establish the remaining EPS bearers if the UE is in state EMM-SUSPENDED.NON-3GPP in the MME.
> If the EPS bearer context status IE is included in the TRACKING AREA UPDATE REQUEST, the MME shall include an EPS bearer context status IE in the TRACKING AREA UPDATE ACCEPT message, indicating which EPS bearer contexts are active in the MME.

FIG. 27E

CR Related to TAU message

These apply both to the option with new state in ESM and new state in EMM.

8.2.29 Tracking area update request

8.2.29.1 Message definition

The purposes of sending the tracking area update request by the UE to the network are described in subclause 5.5.3.1. See table 8.2.29.1.

Message type:   TRACKING AREA UPDATE REQUEST

Significance:   dual

Direction:   UE to network

FIG. 27F

Table 8.2.29.1: TRACKING AREA UPDATE REQUEST message content

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | Tracking area update request message identity | Message type 9.8 | M | V | 1 |
|  | EPS update type | EPS update type 9.9.3.14 | M | V | 1/2 |
|  | NAS key set identifier | NAS key set identifier 9.9.3.21 | M | V | 1/2 |
|  | Old GUTI | EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |
| A- | UE radio capability information update needed | UE radio capability information update needed 9.9.3.35 | O | TV | 1 |
| 57 | EPS bearer context status | EPS bearer context status 9.9.2.1 | O | TLV | 4 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |
|  | <u>Request type</u> | <u>Request type</u> <u>9.9.4.14</u> | <u>M</u> | <u>V</u> | <u>1/2</u> |

FIG. 27G 8.2.29.X    Request Type

The UE shall include this IE and set it to "handover" if the UE has EPS bearers in state ESM BEARER CONTEXT SUSPENDED ON NON-3GPP ACCESS or the UE is in state EMM-REGISTERED.Suspended.non-3GPP.

The UE shall include this IE and set it to "handover" if the UE if the UE performs an intersystem change from A/Gb mode to S1 and the EPS services were previously suspended in A/Gb mode and the UE had handed over one or more EPS bearers to a non-3GPP access network CRs Related to Combined TAU
These apply both to the option with new state in ESM and new state in EMM.

5.5.3.3    Combined tracking area updating procedure

5.5.3.3.1    General

Within a combined tracking area updating procedure the messages TRACKING AREA UPDATE ACCEPT and TRACKING AREA UPDATE COMPLETE carry information for the tracking area updating and the location area updating.
The combined tracking area updating procedure follows the normal tracking area updating procedure described in subclause 5.5.3.2.

5.5.3.3.2 Combined tracking area updating procedure initiation

The UE operating in CS/PS mode 1 or CS/PS mode 2, in state EMM-REGISTERED, shall initiate the combined tracking area updating procedure:

...

p) when the UE performs an intersystem change from A/Gb mode to S1 mode and the EPS services were previously suspended in A/Gb mode and the UE had handed over one or more EPS bearers to a non-3GPP access When UE initiates the combined tracking area updating procedure and it has EPS bearers in state ESM BEARER CONTEXT SUSPENDED ON NON-3GPP ACCESS or the UE is in state EMM-REGISTERED.SUSPENDED.NON-3GPP, the UE shall include a request type set to "handover".

When UE initiates the combined tracking area updating procedure, the UE shall include a request type set to "handover" when the UE performs an intersystem change from A/Gb mode to S1 and the EPS services were previously suspended in A/Gb mode and the UE had handed over one or more EPS bearers to a non-3GPP access network

FIG. 27H

CRs Related to Service Request Usage

These apply both to the option with new state in ESM and new state in EMM.

5.6.1.2 Service request procedure initiation

If the UE has pending uplink data or uplink signalling in EMM-IDLE mode to be transmitted or it responds to paging with CN domain indicator set to "PS", the UE initiates the service request procedure by sending a SERVICE REQUEST message to the MME, starts the timer T3417, and enters the state EMM-SERVICE-REQUEST-INITIATED.
If the UE is performing an intersystem change from A/Gb mode to S1 and the EPS services were previously suspended in A/Gb mode and the UE had handed over one or more EPS bearers to a non-3GPP access network, the UE initiates the service request procedure by sending a SERVICE REQUEST message to the MME and the UE shall include a request type set to "handover".

...

5.6.1.4 Service request procedure accepted by the network

...

If the UE EPS bearer contexts in the MME are marked as "suspended EPS bearer over non-3GPP" and the UE provides a Request Type set to "handover", the MME shall re-establish the EPS bearer contexts. The MME shall perform a bearer modification procedure.

If the UE EPS bearer contexts are in ESM BEARER CONTEXT SUSPENDED ON NON-3GPP ACCESS in the MME or the UE is in state EMM-SUSPENDED.NON-3GPP in the MME and the UE provides a Request Type set to "handover", the MME shall re-establish the EPS bearer contexts. The MME shall perform a bearer modification procedure.

FIG. 27I

CR Related to SR Message

These apply both to the option with new state in ESM and new state in EMM.

8.2.25 Service request

This message is sent by the UE to the network to request the establishment of a NAS signalling connection and of the radio and S1 bearers. Its structure does not follow the structure of a standard layer 3 message. See table 8.2.25.1.

Message type: SERVICE REQUEST

Significance: dual

Direction: UE to network

Table 8.2.25.1: SERVICE REQUEST message content

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | KSI and sequence number | KSI and sequence number 9.9.3.19 | M | V | 1 |
| | Message authentication code (short) | Short MAC 9.9.3.28 | M | V | 2 |
| | Request type | Request type 9.9.4.14 | M | V | 1/2 |

8.2.29.X Request Type

The UE shall include this IE and set it to "handover" if the UE has EPS bearers in state ESM BEARER CONTEXT SUSPENDED ON NON-3GPP ACCESS or the UE is in state EMM-REGISTERED The UE shall include this IE and set it to "handover" if the UE performs an intersystem change from A/Gb mode to S1 and the EPS services were previously suspended in A/Gb mode and the UE had handed over one or more EPS bearers to a non-3GPP access network.

FIG. 27J

CRs related to concept New Status in MME based on PDN GW Only For option with new ESM State These CRs are in addition to the CRs above. This section covers the case where the MME has an intermediate new state that it enters when the UE suspends the bearers.

6.1.3.3    ESM sublayer states in the MME

...

<u>6.1.3.3.6    BEARER CONTEXT SUSPENDED ON NON-3GPP ACCESS</u>

<u>The EPS bearer context is active in the network but is suspended and transferred to non-3GPP.</u>

CRs for concept 6.2

These CRs are in addition to the CRs in section 0. This section covers the case where the MME has an intermediate new state that it enters when the UE suspends the bearers.

6.1.3.3    ESM sublayer states in the MME

...

<u>6.1.3.2.2    BEARER CONTEXT SUSPENDED</u>

<u>The EPS bearer context is active in the network but is suspended after the UE has performed CS Fallback.</u>
    <u>6.1.3.2.2    BEARER CONTEXT SUSPENDED ON NON-3GPP ACCESS</u>

<u>The EPS bearer context is active in the network but is suspended and transferred to non-3GPP.</u>

FIG. 28A 5.6.1.4 Service request procedure accepted by the network
...

If the service type information element in the EXTENDED SERVICE REQUEST message indicates "mobile terminating CS fallback or 1xCS fallback" and the CSFB response IE indicates "CS fallback accepted by the UE", or if the service type information element in the EXTENDED SERVICE REQUEST message indicates "mobile originating CS fallback or 1xCS fallback" or "mobile originating CS fallback emergency call or 1xCS fallback emergency call", the network initiates CS fallback procedures.
<u>If the service type information element in the EXTENDED SERVICE REQUEST message indicates "mobile terminating CS fallback or 1xCS fallback" and the CSFB response IE indicates "CS fallback accepted by the UE", the MME shall set the state of the UE EPS bearers to BEARER CONTEXT SUSPENDED.</u>

FIG. 28B

CRs for concept New Status in MME based on Bearer Suspension and Hand Over on MME state and option with new EMM state > 5.1.3.4 *EMM sublayer states in the MME*
>
> ...
>
> 5.1.3.4.3 EMM-REGISTERED
>
> *In the state EMM-REGISTERED, an EMM context has been established and a default EPS bearer context has been activated in the MME.*
>
> ...
>
> 5.1.3.4.X EMM-SUSPENDED-Non-3GPP
>
> *The MME enters the state EMM-DEREGISTERED-SUSPENDED-Non-3GPP when there is an EMM context and the context is suspended (the UE has performed GPRS suspension procedure over GERAN or UTRAN) and the UE has performed handover of PDN connections to non-3GPP.*

FIG. 29

CRs to 24.008 for New Status in MME based on PDN GW Request and New Status in MME based on Bearer Suspension and Hand Over.

CRs Related to the UE state
 no explicit MM establishment between the Network and the mobile station has occurred.

4.1.3 GPRS mobility management (GMM) sublayer states

In this subclause, the GMM protocol of the MS and the network are described by means of two different state machines. In subclause 4.1.3.1, the states of the GMM entity in the MS are introduced. The behaviour of the MS depends on a GPRS update status that is described in subclause 4.1.3.2. The states for the network side are described in subclause 4.1.3.3.

4.1.3.1 GMM states in the MS

...

4.1.3.1.1 Main states

...

4.1.3.1.1.4 GMM-REGISTERED

A GMM context has been established, i.e. the GPRS attach or combined GPRS attach procedure has been successfully performed. In this state, the MS may activate PDP contexts, MBMS contexts, may send and receive user data and signalling information and may reply to a page request. Furthermore, cell and routing area updating are performed.
...

4.1.3.1.3 Substates of state GMM-REGISTERED

The state GMM-REGISTERED is subdivided into several substate as explained below.
...

FIG. 30A

4.1.3.1.3.2    GMM-REGISTERED.SUSPENDED.NON-3GPP (A/Gb mode only)

The MS shall enter this substate when entering dedicated mode and when the MS limitations makes it unable to communicate on GPRS channels and when the MS has handed over the PDP contexts to a non-3GPP access. In this substate, no user data should be sent and no signalling information shall be sent. The MS shall leave this substate when leaving dedicated mode.

4.1.3.3  GMM mobility management states on the network side

...

4.1.3.3.2  Substates of state GMM-REGISTERED

The state GMM-REGISTERED is subdivided into two substates as explained below.
...

4.1.3.3.2.X    GMM-REGISTERED.SUSPENDED.NON-3GPP (A/Gb mode only)

In this substate, the lower layers shall be prevented of sending user data or signalling information. The network shall set the MS state to GMM-REGISTERED.SUSPENDED.NON-3GPP when the MS suspends GPRS service and one or more PDP contexts are handed over to a non-3GPP access.

FIG. 30B

CRs Related to RAU 4.7.5.1.1    Normal and periodic routing area updating procedure initiation To initiate the normal routing area updating procedure, the MS sends the message ROUTING AREA UPDATE REQUEST to the network, starts timer T3330 and changes to state GMM-ROUTING-AREA-UPDATING-INITIATED.

...

<u>If the routing area updating procedure is initiated by the MS due to the MS determining that GPRS resumption shall be performed, and if the MS is in ESM state BEARER CONTEXT SUSPENDED ON NON-3GPP ACCESS or the UE is in state EMM-REGISTERED.SUSPENDED.NON-3GPP, the UE shall include a request type set to "handover".</u>
<u>When the MS initiates the routing area updating procedure, the MS shall include a request type set to "handover" if the UE determines that GPRS resumption shall be performed and the UE had handed over one or more EPS bearers to a non-3GPP access network after performing the GPRS suspension procedure.</u>

4.7.5.1.3    Normal and periodic routing area updating procedure accepted by the network If the routing area updating request has been accepted by the network, a ROUTING AREA UPDATE ACCEPT message shall be sent to the MS. The network may assign a new P-TMSI and/or a new P-TMSI signature for the MS. If a new P-TMSI and/or P-TMSI signature have been assigned to the MS, it/they shall be included in the ROUTING AREA UPDATE ACCEPT message together with the routing area identification.In a shared network the network shall indicate the PLMN identity of the CN operator that has accepted the routing area updating request in the RAI contained in the ROUTING AREA UPDATE ACCEPT message (see 3GPP TS 23.251 [109]).
If a new DRX parameter was included in the ROUTING AREA UPDATE REQUEST message, the network shall store the new DRX parameter and use it for the downlink transfer of signalling and user data.
If the MS has indicated in the ROUTING AREA UPDATE REQUEST message that it supports PS inter-RAT handover from GERAN to UTRAN Iu mode, the network may include in the ROUTING AREA UPDATE ACCEPT message a request to provide the Inter RAT information container.
If the MS has indicated in the ROUTING AREA UPDATE REQUEST message that it supports PS inter-RAT HO from GERAN to E-UTRAN, the network may include in the ROUTING AREA UPDATE ACCEPT message a request to provide the E-UTRAN inter RAT information container.
<u>If the MS has included in the ROUTING AREA UPDATE REQUEST a request type set to "handover", the network shall re-establish the PDP contexts that had previously handed over to non-3GPP.</u>

FIG. 30C

If the MS is in GMM-REGISTERED.SUSPENDED.NON-3GPP in the network, the SGSN shall re-establish the PDP contexts that had previously handed over to non-3GPP.

...

If the PDP context status information element is included in ROUTING AREA UPDATE REQUEST message, then the network shall deactivate all those PDP contexts locally (without peer to peer signalling between the MS and the network), which are not in SM state PDP-INACTIVE on network side but are indicated by the MS as being in state PDP-INACTIVE.
If PDP context status information element is included in the ROUTING AREA UPDATE REQUEST message and the MS is in state GMM-REGISTERED.SUSPENDED.NON-3GPP in the network, the network shall deactivate all those PDP contexts locally (without peer-to-peer signalling between the MS and the network) which are not in SM state PDP-INACTIVE on network side but are indicated by the MS as being in state PDP-INACTIVE. The network shall re-establish the PDP contexts that are indicated by the UE as requiring re-establishment if the MS is in state GMM-REGISTERED.SUSPENDED.NON-3GPP in the network.

9.4.14 Routing area update request

This message is sent by the MS to the network either to request an update of its location file or to request an IMSI attach for non-GPRS services. See table 9.4.14/3GPP TS 24.008.
Message type: ROUTING AREA UPDATE REQUEST Significance:    dual Direction:       MS to network

FIG. 30D

Table 9.4.14/3GPP TS 24.008: ROUTING AREA UPDATE REQUEST message content

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Routing area update request message identity | Message type 10.4 | M | V | 1 |
| | Update type | Update type 10.5.5.18 | M | V | 1/2 |
| | GPRS ciphering key sequence number | Ciphering key sequence number 10.5.1.2 | M | V | 1/2 |
| | Old routing area identification | Routing area identification 10.5.5.15 | M | V | 6 |
| | MS Radio Access capability | MS Radio Access capability 10.5.5.12a | M | LV | 6 - 52 |
| 19 | Old P-TMSI signature | P-TMSI signature 10.5.5.8 | O | TV | 4 |
| 17 | Requested READY timer value | GPRS Timer 10.5.7.3 | O | TV | 2 |
| 27 | DRX parameter | DRX parameter 10.5.5.6 | O | TV | 3 |
| 9- | TMSI status | TMSI status 10.5.5.4 | O | TV | 1 |
| 18 | P-TMSI | Mobile identity 10.5.1.4 | O | TLV | 7 |
| 31 | MS network capability | MS network capability 10.5.5.12 | O | TLV | 4-10 |
| 32 | PDP context status | PDP context status 10.5.7.1 | O | TLV | 4 |
| 33 | PS LCS Capability | PS LCS Capability 10.5.5.22 | O | TLV | 3 |
| 35 | MBMS context status | MBMS context status 10.5.7.6 | O | TLV | 2-18 |
| 58 | UE network capability | UE network capability 10.5.5.26 | O | TLV | 4-15 |
| 1A | Additional mobile identity | Mobile identity 10.5.1.4 | O | TLV | 7 |
| 1B | Additional old routing area identification | Routing area identification 2 10.5.5.15a | O | TLV | 8 |
| 11 | Mobile station classmark 2 | Mobile station classmark 2 10.5.1.6 | O | TLV | 5 |
| 20 | Mobile station classmark 3 | Mobile station classmark 3 10.5.1.7 | O | TLV | 2-34 |
| 40 | Supported Codecs | Supported Codec List 10.5.4.32 | O | TLV | 5-n |
| 5D | Voice domain preference and UE's usage setting | Voice domain preference and UE's usage setting 10.5.5.28 | O | TLV | 3 |
| A- | Request type | Request type 10.5.6.17 | O | TV | 1 |

FIG. 30E

9.5.14.X Request type

This IE is included in the message to indicate whether the PDP context request is for a handover from a non-3GPP access network.

> The UE shall include this IE and set it to "handover" if the MS is in state GMM-REGISTERED.SUSPENDED.NON-3GPP.
>
> The UE shall include this IE and set it to "handover" if the UE resumes GPRS traffic and has previously handed over one or more PDP contexts to a non-3GPP access network.

FIG. 30F

ANDSF CRs for UE Policy for Handling Loss of Non-3GPP Access Network Coverage

CRs to 23.402

The following CR applies to 23.402 and the definition of ANDSF behaviour, and are to be considered as a delta to the CRs defined for concept 4.

4.8 Network Discovery and Selection

4.8.0 General Principles

The following principles apply when the UE is registered in the Home PLMN or in a PLMN which is equivalent to the home PLMN and when both 3GPP and non-3GPP accesses are available or when multiple non-3GPP accesses are available:

...

- <u>The EPS Network shall allow the operator to influence whether the UE shall maintain the EPS bearer context after performing a CS fallback, and suspending the EPS bearers, and handing over the EPS bearer to a non-3GPP access, and the UE losing connectivity over the non-3GPP access, in order to indicate to the UE whether the UE shall resume the EPS bearers upon completion of the CS service.</u>

...

CRs to 24.302

The following CR applies to 24.302 and the definition of ANDSF behaviour:

....

6.8.2.2.4.2 Use of Inter-system Mobility Policy

If more than one set of Inter-system mobility policies is available in the UE, the UE shall only use one set of Inter-system mobility policies at any one time. If available, the inter-system mobility policy of the RPLMN takes precedence. For example, when roaming, the Inter-system mobility policy from V-ANDSF of the RPLMN, if available, takes precedence over the Inter-system mobility policy from H-ANDSF.

<u>If the UE is configured as defined in 3GPP TS 24.312 [xx] to move PS traffic to non-3GPP after performing CS Fallback as defined in 3GPP TS 23.272 [XX] to GERAN/UTRAN and performing GPRS suspend procedure, and the UE has moved the PS traffic to a non-3GPP access, the UE shall use the ISMP to decide whether the UE shall maintain the EPS bearer status when the UE loses connectivity over the non-3GPP access and to decide whether the UE shall attempt to resume the PS bearers after completion of the CS service.</u>

FIG. 31A 6.8.2.2.4.4  Use of Inter-System Routing Policies

A UE that is IFOM capable or MAPCON capable or both shall use the ISRP if available. The ISRP if available in a UE that is not IFOM capable and not MAPCON capable will be ignored by that UE. If the UE is configured as defined in 3GPP TS 24.312 [xx] to move PS traffic to non-3GPP after performing CS Fallback as defined in 3GPP TS 23.272 [XX] to GERAN/UTRAN and performing GPRS suspend procedure, and the UE has moved the PS traffic to a non-3GPP access, the UE shall use the ISMP to decide whether the UE shall maintain the EPS bearer status and for which bearers when the UE loses connectivity over the non-3GPP access and to decide whether the UE shall attempt to resume the PS bearers after completion of the CS service.

A UE that is IFOM capable or MAPCON capable or both uses the ISRP to:-
- select an access technology or an access network or both for routing user plane traffic matching specific APNs identified in the ISRP;

- select an access technology or an access network or both for routing user plane traffic matching specific IP flows identified in the ISRP;

- if the UE supports CSFB, select for which IP traffic the UE shall maintain the EPS bearer context after handing over the PS traffic to a non-3GPP access if upon performing CS fallback the UE suspends the EPS bearers (e.g. all traffic to a specific APN, or all traffic belonging to a specific IP flow, or all traffic of a specific application, etc).

CRs to ANDSF MO TS 24.312

The following definitions are added to TS 24.312:

IFOM capable UE: A UE that is capable of routing different IP flows to the same PDN connection through different access networks.
MAPCON capable UE: A UE that is capable of routing different simultaneously active PDN connections through different access networks.

The ANDSF MO defined in TS 24.302 is modified as follows (this is a pseudo stage 3 CR):

5.7 <X>/Policy/<X>/CSFallback

The CSFallback node indicates the preferences related to CS Fallback.
- Occurrence: One
- Format: node
- Access Types: Get, Replace
- Values: N/A

5.8 <X>/Policy/<X>/CSFallback/<X>

This interior node acts as a placeholder for one or more preferences related to CS Fallback.
- Occurrence: OneOrMore
- Format: node
- Access Types: Get, Replace
- Values: N/A

5.9 <X>/Policy/<X>/CSFallback/<X>/CSFallbackNon3GPPHandover

The CSFallbackNon3GPPHandover leaf indicates the policy for moving the PS traffic to a non-3GPP access when the UE triggers CS Fallback.
- Occurrence: One
- Format: chr
- Access Types: Get, Replace
- Values: <shall, should, shall not perform>
  - Shall – Indicates that the UE shall move PS traffic to non-3GPP upon performing CS Fallback
  - Should – Indicates that the UE should move PS traffic to non-3GPP upon performing CS Fallback
  - Shall not – Indicates that the UE shall not move PS traffic to non-3GPP upon performing CS Fallback

FIG. 31C

5.10 <X>/Policy/<X>/CSFallback/<X>/CSFallbackNon3GPPIFOM

The CSFallbackNon3GPPMechanism leaf indicates the mechanism the UE can use to move PS traffic to a non-3GPP access when the UE triggers CS Fallback.
- Occurrence: One
- Format: bool
- Access Types: Get, Replace
- Values: 0,1
  - 0 – Indicates that, if the UE is IFOM capable, then the UE shall not use IP Flow mobility to move PS traffic to non-3GPP upon performing CS Fallback
  - 1 – Indicates that, if the UE is IFOM capable, then the UE may use IP Flow mobility to move PS traffic to non-3GPP upon performing CS Fallback

5.11 <X>/Policy/<X>/CSFallback/<X>/CSFallbackNon3GPPMAPCON

The CSFallbackNon3GPPMechanism leaf indicates the mechanism the UE can use to move PS traffic to a non-3GPP access when the UE triggers CS Fallback.
- Occurrence: One
- Format: bool
- Access Types: Get, Replace
- Values: 0,1
  - 0 – Indicates that, if the UE is MAPCON capable, then the UE shall not use IP Flow mobility to move PS traffic to non-3GPP upon performing CS Fallback
  - 1 – Indicates that, if the UE is MAPCON capable, then the UE may use IP Flow mobility to move PS traffic to non-3GPP upon performing CS Fallback

5.12 <X>/Policy/<X>/CSFallback/<X>/CSFallbackNon3GPPHandoverAPN

The CSFallbackNon3GPPHandoverAPN leaf indicates the policy related to APNs for the handover to a non-3GPP access when the UE triggers CS Fallback.
- Occurrence: OneOrMore
- Format: chr
- Access Types: Get, Replace
- Values: <APN>

APN is a value coded according to the structure for Access Point Name defined 3GPP TS 23.003. The APN indicates whether the UE shall or shall not handover the PDN connection corresponding to the APN to a non-3GPP access when the UE triggers CS Fallback.

FIG. 31D

5.13 <X>/Policy/<X>/CSFallback/<X>/
CSFallbackNon3GPPHandoverCSService

The CSFallbackNon3GPPHandoverCSService leaf indicates the policy related to CS services for the handover to a non-3GPP access when the UE triggers CS Fallback.
- Occurrence: One
- Format: bool
- Access Types: Get, Replace
- Values: 0, 1

0 - Indicates that the UE shall perform handover to non-3GPP access only when the UE triggers CS Fallback for voice
1 - Indicates that the UE shall not perform handover to non-3GPP access when the UE triggers CS Fallback also for other services (e.g. LCS)

5.14 <X>/Policy/<X>/CSFallback/<X>/
CSFallbackNon3GPPHandoverDelay

The CSFallbackNon3GPPHandoverDelay leaf indicates the policy related to when the UE moves the PS traffic to a non-3GPP access upon the UE triggering CS Fallback.
- Occurrence: One
- Format: int
- Access Types: Get, Replace
- Values: <Delay>

- A Delay value of 0 indicates that the UE shall trigger the handover upon performing the CS Fallback
- A Delay value different from 0 sahlle be interpreted by the UE as the delay in seconds before the UE shall trigger the handover after performing the CS Fallback

FIG. 31E

METHODS AND APPARATUS TO PROVIDE PACKET SWITCHED SERVICE CONTINUITY DURING CIRCUIT SWITCHED FALLBACK OPERATION

CROSS REFERENCE TO RELATED APPLICATION

This application claims the benefit of U.S. Provisional Application No. 61/384,655, filed 20 Sep. 2010, the entire contents of which is explicitly incorporated by reference herein.

FIELD OF THE DISCLOSURE

This disclosure relates generally to mobile communications and, more particularly, to methods and apparatus to provide packet switched service continuity during circuit switched fallback operation.

BACKGROUND

Hand over of communication from one network to another is important for facilitating a positive user experience of, for example, a mobile communication device. However, different networks have different capabilities and must be coordinated in a manner unbeknownst to the user of the mobile communication device.

BRIEF DESCRIPTION OF THE DRAWINGS

FIGS. 3A-3G show example specification changes that may be used to implement the invention disclosed herein.

FIGS. 5A-5C show example specification changes that may be used to implement the invention disclosed herein.

FIGS. 7A-7D show example specification changes that may be used to implement the invention disclosed herein.

FIGS. 8A-8D show example specification changes that may be used to implement the invention disclosed herein.

FIGS. 17A-17B show example specification changes that may be used to implement the invention disclosed herein.

FIG. 18 shows example specification changes that may be used to implement the invention disclosed herein.

FIGS. 19A-19C show example specification changes that may be used to implement the invention disclosed herein.

FIG. 20 shows example specification changes that may be used to implement the invention disclosed herein.

FIG. 21 shows example specification changes that may be used to implement the invention disclosed herein.

FIG. 22 shows example specification changes that may be used to implement the invention disclosed herein.

FIGS. 23A-23E show example specification changes that may be used to implement the invention disclosed herein.

FIG. 24 shows example specification changes that may be used to implement the invention disclosed herein.

FIG. 25 shows example specification changes that may be used to implement the invention disclosed herein.

FIGS. 26A-26G show example specification changes that may be used to implement the invention disclosed herein.

FIGS. 27A-27J show example specification changes that may be used to implement the invention disclosed herein.

FIGS. 28A-28B show example specification changes that may be used to implement the invention disclosed herein.

FIG. 29 shows example specification changes that may be used to implement the invention disclosed herein.

FIGS. 30A-30F show example specification changes that may be used to implement the invention disclosed herein.

FIGS. 31A-31E show example specification changes that may be used to implement the invention disclosed herein.

DETAILED DESCRIPTION

Figure 1:
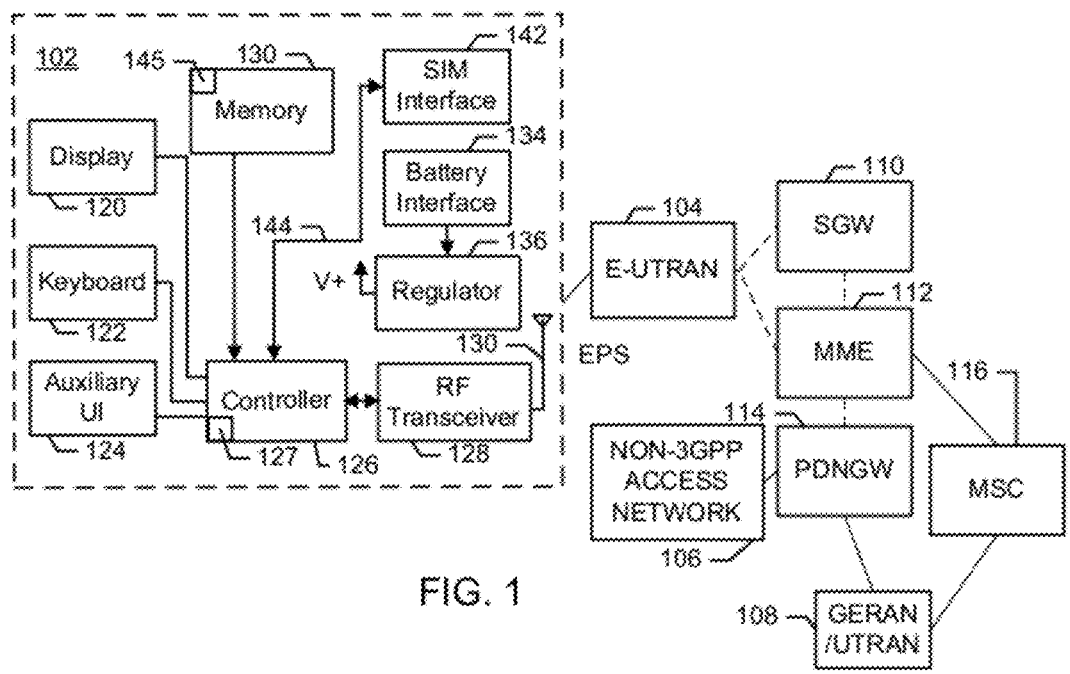
FIG. 1 is a block diagram of an example communication system.

In FIG. 1, a block diagram of an example communication system 100 implemented as described herein to provide packet switched service (PS) continuity during circuit switched fallback (CSFB) operation. According to an illustrated example, user equipment (UE) 102 may communicate with one or more wireless communication networks. For example the UE 102 may communicate with a long term evolution (LTE) network 104, one example of which is shown as Evolved Universal Terrestrial Radio Access Network (E-UTRAN). Other access networks such as networks that are not third generation partnership project (non-3GPP access networks) 106, GSM/EDGE Radio Access Networks/ UTRAN 108, etc. In the example of FIG. 1, the UE 102 is shown in communication with E-UTRAN 104 and exchanges information therewith using an evolved packet system (EPS) protocol. Non-3GPP access networks 106 may include, but are not limited to, wireless networks such as wireless local area networks (WLANs), etc.

As shown in FIG. 1, E-UTRAN 104 is coupled to a serving gateway (SGW) 110 and a mobility management entity (MME) 112, which is also coupled to the SGW 110. The MME 112 is coupled to a packet data network gateway (PDN-GW) 114, which is also coupled to the non-3GPP access network 106. GERAN/UTRAN 108 is coupled to a mobile switching center (MSC) 116.

As shown in one example in FIG. 1, the UE 102 includes a visual display 120, a keyboard 122, and perhaps one or more auxiliary user interfaces (UI) 124, each of which are coupled to a controller 126. The controller 126 is also coupled to a radio frequency (RF) transceiver circuitry 128, which is further coupled to an antenna 130. In one example, the controller 126 is implemented using a central processing unit (CPU) that runs operating system software stored in a memory 130. The controller 126 will normally control overall operation of UE 102, whereas signal processing operations associated with communication functions are typically performed by the RF transceiver circuitry 128. The controller 126 interfaces with the display 120 to present received information, stored information, user inputs, and the like.

The example controller 126 includes a CSFB manager 127 that manages UE 102 connectivity when transitioning to and from CSFB. For example, in addition to other functionality, the CSFB manager 127 may operate to facilitate the transition of PS services to the UE 102 from the E-UTRAN 104 to the non-3GPP access network 106 during CSFB. Additionally, the CSFB manager 127 facilitates the provision of PS services upon termination of a CS-based task, such as a CS voice call, and a transition back to the E-UTRAN 104. Example methods and apparatus to implement the CSFB manager 127 are described below in conjunction with the figures.

The keyboard 122, which may be a telephone type keypad or full alphanumeric keyboard, is normally provided for entering data for storage in the UE 102, information for transmission to the network, such as the E-UTRAN 104, the non-3GPP access network 106, etc. Such data may include a telephone number to place a telephone call, commands to be executed on the UE 102, and possibly other or different user inputs.

The UE 102 sends communication signals to, and receives communication signals from the communication network 104 over a wireless link via the antenna 130. The RF transceiver circuitry 128 performs, for example, modulation/ demodulation, encoding/decoding, and encryption/decryption. The RF transceiver circuitry 128 is adapted to particular wireless network or networks in which UE 102 may operate.

The UE 102 further includes a battery interface 134 to receive one or more rechargeable batteries (not shown) that provide power to electrical circuitry in UE 102. The battery interface 134 provides for a mechanical and electrical connection for the battery. The battery interface 134 is coupled to a regulator 136 that regulates power V+ to the device. When the UE 102 is operational, an RF transmitter of the RF transceiver circuitry 128 is typically keyed or turned on only when it is sending information to the network, and is otherwise turned off to conserve resources. Similarly, an RF receiver of the RF transceiver circuitry 128 is typically periodically turned off to conserve power until it is needed to receive signals or information (if at all) during designated time periods.

The UE 102 operates using a Subscriber Identity Module (SIM) (not shown) that is connected to or inserted in the UE 102 at a SIM interface 142. Without the SIM, the UE 102 may be referred to as mobile equipment (ME). The SIM is one type of a removable memory module or smart card used to identify an end user of UE 102 (or subscriber) and to personalize the device, among other things. Without the SIM, the example UE 102 is not fully operational for communication. By inserting the SIM into the UE 102, an end user can have access to any and all of his/her subscribed services.

The SIM generally includes a processor and memory for storing information. Because the SIM is coupled to the SIM interface 142, it is coupled to the controller 126 through communication lines 144. To identify the subscriber, the SIM contains some user parameters such as an International Mobile Subscriber Identity (IMSI). An advantage of using the SIM is that end users are not necessarily bound by any single physical mobile station because the SIM may be used in any number of different mobile stations. The SIM may store additional user information for the UE 102 as well, including datebook (or calendar) information, recent call information, and network connection information.

The UE 102 may be a single unit, such as a data communication device, a cellular telephone, a multiple- function communication device with data (e.g., electronic mail, internet access, personal information management, etc.) and voice communication capabilities, a personal digital assistant (PDA) enabled for wireless communication, or a computer incorporating an internal modem. Alternatively, the UE 102 may be a multiple-module unit comprising a plurality of separate components, including but in no way limited to a computer or other device connected to a wireless modem. In particular, for example, in the mobile station block diagram of FIG. 1, the RF transceiver circuitry 128 and antenna 130 may be implemented as a radio modem unit that may be inserted into a port on a laptop computer. In this case, the laptop computer would include the display 120, keyboard 122, one or more auxiliary UIs 124, and the controller 126 may be the computer's CPU. A computer or other equipment not normally capable of wireless communication may be adapted to connect to and effectively assume control of the RF transceiver circuitry 128 and the antenna 130 of a single-unit device such as one of those described above.

The CSFB in EPS enables the provisioning of voice and other CS-domain services by reuse of CS infrastructure when the UE 102 is served by E-UTRAN 104. The CSFB- enabled UE 102 connected to E-UTRAN 104 may use GERAN/UTRAN 108 to connect to the CS-domain. This function is available in case E-UTRAN 104 coverage is overlapped by GERAN/UTRAN 108 coverage. CSFB and Internet Protocol multimedia subsystem (IMS)-based service can co-exist in the same operator's network. However, as the main purpose of CSFB is to provide CS service, such as voice, while the UE 102 is served by E-UTRAN 104 for PS services, such as data services, it is more likely that the CSFB is deployed by operators that have yet to deploy IMS.

Figure 2:
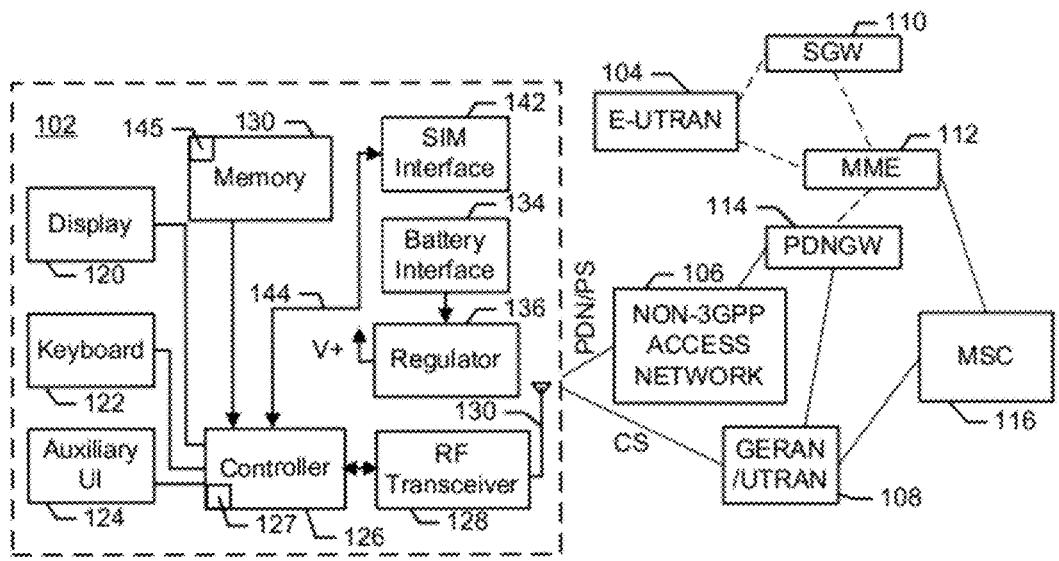
FIG. 2 is a block diagram of the example communication system of FIG. 1 after a circuit-switched fallback operation has been carried out.

FIG. 2 shows one result of a CSFB procedure. Whereas FIG. 1 showed that EPS services were provided to the UE 102 via the E-UTRAN 104, FIG. 2 shows that the UE 102 is connected to the non-3GPP access network for PS services and is connected to GERAN/UTRAN 108 for CS services that are provided through the MSC 116. CSFB is realized in EPS by using the SGs interface mechanism between the MSC 116 and the MME 112. The SGs interface mechanism between the MSC 116 and the MME 112 is an extension of the Gs interface between an SGSN and the MSC. To facilitate CSFB, the UE 102 attaches to the EPS (e.g., attaches to the E-UTRAN 104) using a combined EPS/IMSI Attach Procedure or combined Tracking Area Update Procedure specified in 3GPP TS 23.401, which is incorporated herein by reference. During CSFB (triggered either by a Mobile Originating (MO) Call or a Mobile Terminating (MT) Call), the UE 102 moves to a new cell in GERAN/UTRAN 108 by inter-radio access technology (RAT) PS hand over (HO) procedures if this is supported by the target network, or otherwise by a radio resource control (RRC) connection release with redirection to GERAN/UTRAN 108 or Network Assisted Cell Change (NACC). The CSFB procedure is specified in the 3GPP TS 23.272, which is incorporated herein by reference.

The wireless link shown in communication system 100 of FIG. 1 represents one or more different channels, typically different radio frequency (RF) channels, and associated protocols used between the wireless network 104 and the UE 102. An RF channel is a limited resource that must be conserved, typically due to limits in overall bandwidth and a limited battery power of the UE 102. A wireless network may include hundreds of cells, each served by a base transceiver station 150 (i.e. or station sector), depending upon desired overall expanse of network coverage. All pertinent components may be connected by multiple switches and routers (not shown), controlled by multiple network controllers.

A wireless network may be connected to other systems, possibly including other networks, not explicitly shown in FIG. 1. A network may transmit some sort of paging and system information on an ongoing basis, even if there is no actual packet data exchanged. Although the network consists of many parts, these parts all work together to result in certain behaviors at the wireless link.

Block diagrams of apparatus and flowcharts representative of example processes that may be executed to implement some or all of the elements of the system 100 and mobile communication devices described herein are described below and shown in the drawings.

In these examples, the process represented by each flowchart may be implemented by one or more programs comprising machine readable instructions for execution by: (a) a processor, such as the microprocessor 1612 shown in the example computer system 1600 discussed below in connection with FIG. 16, (b) a controller, such as the controller 126 of FIG. 1, and/or (c) any other suitable device. The one or more programs may be embodied in software stored on a tangible medium such as, for example, a flash memory, a CD-ROM, a floppy disk, a hard drive, a DVD, or a memory associated with the processor 1612, but the entire program or programs and/or portions thereof could alternatively be executed by a device other than the microprocessor 1612 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually.

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. For example, blocks may be implemented as part of a mobility manager such as a mobility management entity of an LTE system or may be implemented as a part of a mobile station, etc. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Overcoming Lack of Dual Transfer Mode Support Upon CSFB

One issue with current operation is what occurs during CSFB when there is no support for dual transfer mode (DTM) in the UE 102 or the GERAN network 108. When the UE 102 performs CSFB from E-UTRAN 104 to a RAT that does not support DTM, such as, for example, GERAN/UTRAN 108, the PS services active over E-UTRAN 104 before CSFB are suspended by the UE in the EPS through the GPRS suspend procedure. In such cases, if a UE 102 is involved in a long CS service (e.g. a one-hour voice call), the PS services will be unavailable during the CS service until the UE 102 has terminated the CS service (i.e., the service from GERAN/UTRAN 108) and the UE 102 either stays in GERAN/UTRAN 108 or the UE 102 returns to E-UTRAN 104. DTM is rarely supported by GERAN/UTRAN operators, so this problem directly affects most UEs.

Hand Over to Non-3GPP Access Network

One manner in which the lack of DTM support during CSFB may be addressed is, if the UE 102 needs to perform a GPRS suspend procedure upon performing CSFB to GERAN/UTRAN 108 because, for example, the target RAT is GERAN/UTRAN 108 and DTM is not supported, the UE 102 hands all PDN connections over from E-UTRAN 104 to the available non-3GPP access network 106.

Figure 3:
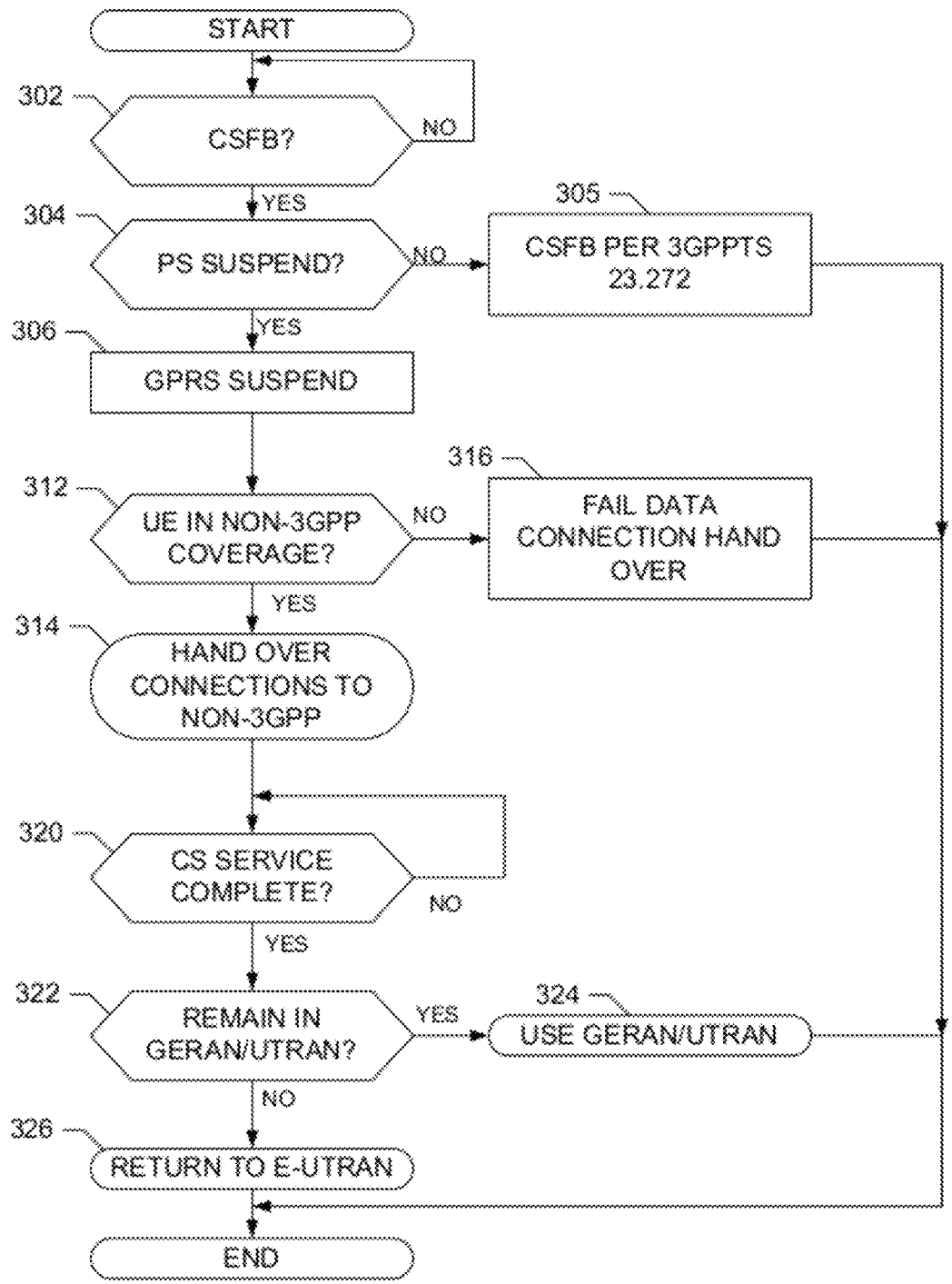
FIG. 3 is a flowchart of an example process that may be carried out at least partially by communication equipment to facilitate hand overs in the example communication system of FIG. 1.

In one example, the process of handing over PS services from E-UTRAN 104 to the non-3GPP access network 106 is shown in FIG. 3. When CSFB of an MO or MT CS service is triggered (block 302) and the UE 102 performs the steps defined by CSFB specification 3GPP TS 23.272, the UE 102 determines if PS services need to be suspended (block 304). In one example, the determination of whether PS services need to be suspended may be dependent upon a target system to which a handover is to be made. For example, the UE 102 may determine that the target system does not support PS handover and make a decision to suspend PS services based on that determination. If PS services are not being suspended (block 304), the UE performs the CSFB currently defined in 3GPP TS 23.272 (block 305). However, if the UE 102 determines that PS services need to be suspended (block 304) the UE performs the GPRS suspend procedure (block 306).

If the UE 102 is within the coverage of the non-3GPP access network 106 (block 312), then the UE 102 triggers a hand over of the active PDN connections from E-UTRAN to a non-3GPP access network (block 314). Different examples of how the hand over of block 314 may be carried out are provided below. If, however, the hand over is not authorized or the UE 102 is not within coverage of the non-3GPP access network 106 (block 312), the connection hand over fails (block 316).

Upon completing the CS service (block 320), if the UE 102 decides to remain in GERAN/UTRAN 108 (block 322), a process is performed to facilitated to continued use of GERAN/UTRAN 108 (block 324). Different examples of how GERAN/UTRAN 108 can be used (block 324) are provided below. Alternatively, if the UE 102 decides to return to E-UTRAN (block 322), the UE performs the procedure for returning to E-UTRAN (block 326). This process may, for example, be defined in TS 23.272, which is incorporated herein by reference. For example, the UE 102 can either perform an attach procedure as defined in TS 23.272 and send an Attach Request to the MME 112 and the UE 102 indicates "combined EPS/IMSI attach" in the EPS attach type information element (IE) and the UE indicates "handover" in the Request type (defined in 3GPP TS 24.301 in section 9.9.4.14 and in TS 3GPP 24.008 in section 10.5.6.17, all of which are incorporated herein by reference) of the PDN CONNECTIVITY REQUEST message sent for each PDN connection that needs to be handed over from the non-3GPP access network 106. Different examples of how the return to E-UTRAN (block 324) may be carried out are provided below.

The process described above in connection with FIG. 3, enables the non-3GPP access network 106 to provide PS service to the UE 102 while the UE 102 is carrying out the CS service over GERAN/UTRAN 108 in CS domain if the UE 102 is in coverage of the non-3GPP access network 106 connected to the EPC. In one example, after the hand over to the non-3GPP access network 106, only the non-GBR bearers are active if the PS bearers were suspended because the GBR bearers were deactivated due to the suspension (block 306).

FIG. 3A shows example changes that may be made to TS23.272 for CS Fallback Triggering when there is a mobile originating call in active mode and packet switched hand over is supported. The example changes of FIG. 3A may be used to implement Hand Over to non-3GPP Access Network and Hand Over to non-3GPP Access Network-Selected Connections.

FIG. 3B shows example changes that may be made to TS23.272 for CS Fallback Triggering when there is a mobile originating call in active mode and packet switched hand over is not supported.

FIG. 3C shows example changes that may be made to TS23.272 for CS Fallback Triggering when there is a mobile terminating call in active mode and packet switched hand over is supported.

FIG. 3D shows example changes that may be made to TS23.272 for CS Fallback Triggering when there is a mobile terminating call in active mode and packet switched hand over is not supported.

FIG. 3E-3G show example changes that may be made to 23.402 for hand over to non-3GPP access network and hand over of selected connections to non-3GPP access network.

Figure 4:
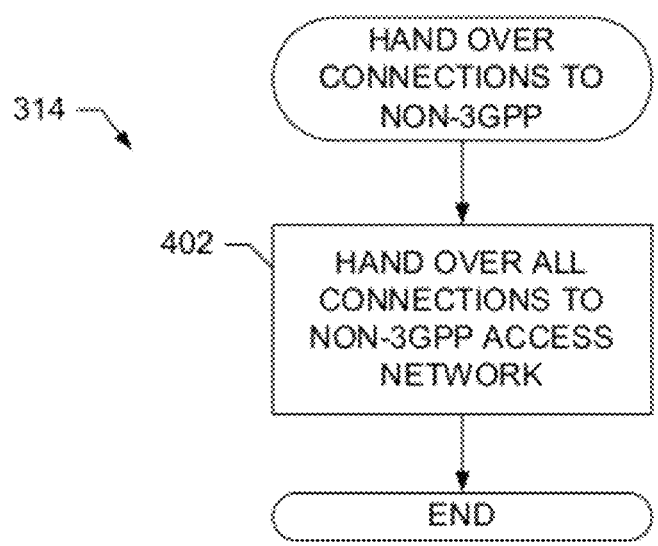
FIG. 4 is a flowchart of an example hand over connections process that may be carried out at least partially by communication equipment.

FIG. 4 shows one example in which the hand over of connections to the non-3GPP access network 106 (block 314) may be carried out. In the example of FIG. 4, all connections may be handed over to the non-3GPP access network 106 (block 402). The process of FIG. 3 may later suspend all the connections that were handed over (block 314).

Hand Over to Non-3GPP Access Network-Selected Connections

As explained above, all connections may be handed over from E-UTRAN 104 to the non-3GPP access network 106. However, it is also possible that only selected connections be handed over to the non-3GPP access network 106. One manner which selected connections may be handed over is through the use of multiple access PDN connectivity (MAPCON) features. MAPCON features allow the UE 102 to hand over one or more of the PDN connections to the non-3GPP access network 106, while suspending the PS bearers of the other PDN connections when performing the CSFB procedure. MAPCON is the ability, based on release 10 mechanisms, to move (i.e. hand over) a subset (e.g., one or more) PDN connections existing over E-UTRAN 104 or GERAN/UTRAN 108 to the non-3GPP access network 106, while maintaining others over E-UTRAN 104.

Figure 5:
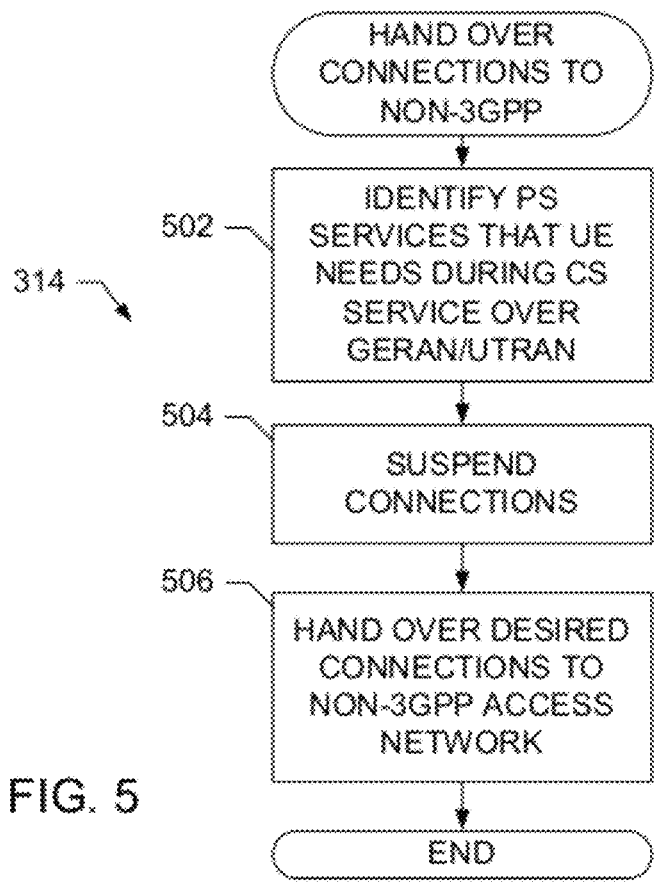
FIG. 5 is a flowchart of a second example hand over connections process that may be carried out at least partially by communication equipment.

As shown in FIG. 5, the selective hand over of connections may be carried out by the UE 108 identifying PS services that the UE 102 needs while the CS is engaged in a CS service over GERAN/UTRAN 108 (block 502) and the UE has performed the GPRS suspend procedure (block 504). The UE 102 may choose to maintain, over E-UTRAN 104 or GERAN/UTRAN 108 in suspended mode, the PS bearers of one or more PDN connections, e.g., the PDN connections with lowest relative priority or less expected traffic or no traffic based, for example, on operator policies and/or user policies. All connections are suspended (block 504) when the UE performs the CSFB procedure when either or both of the UE and the network do not support DTM. The PS bearers corresponding to the PDN connections that are to be suspended are suspended in the SGW 110, the MME 112, and the PDN GW 114, as per conventional CSFB procedures. The UE 102 hands over the selected PDN connections to the non-3GPP access network 106 (block 506). Upon the UE 102 performing the hand over of one or more PDN connections to the non-3GPP access network 106, the hand over procedures defined in TS 23.402, which is incorporated by reference herein, are executed. In all the variants of these procedures, the PDN GW 114 initiates a PDN GW Initiated Bearer Deactivation as defined, for example, in TS 23.402, section 5.4.4.1.

FIG. 5A shows example changes that may be made to 23.401. The functional modifications shown in the example of FIG. 5A are used both in the case in which the UE handovers all the connections to the non-3GPP access and the case in which the UE uses MAPCON to handover only a subset of the PDN connections.

FIGS. 5B and 5C show an alternative example set of modifications that may be made to 23.401 supporting Hand Over to non-3GPP Access Network and Hand Over to non-3GPP Access Network-Selected Connections. The functional modifications of FIGS. 5B and 5C are used both in the case in which the UE handovers all the connections to the non-3GPP access and the case in which the UE uses MAPCON to handover only a subset of the PDN connections.

Figure 6:
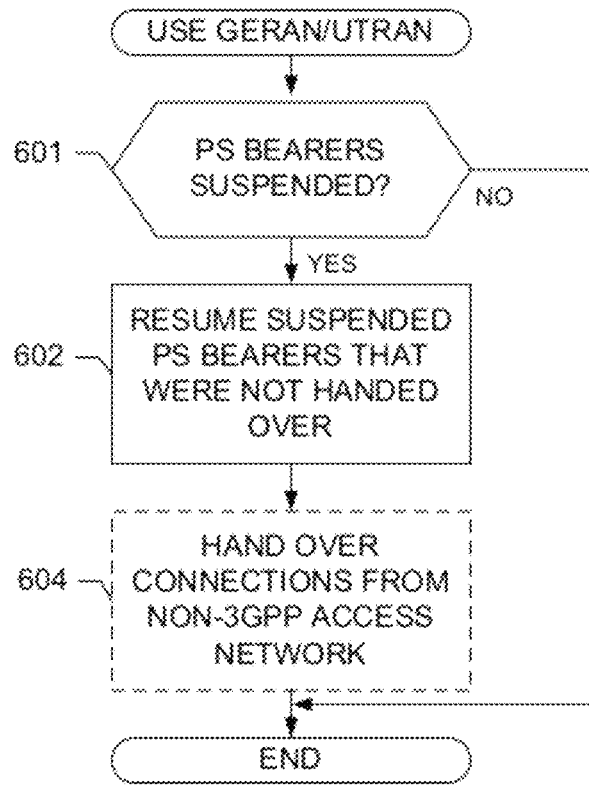
FIG. 6 is a flowchart of an example use GERAN/UTRAN process that may be carried out at least partially by communication equipment.

FIG. 6 is a flow diagram of a process for the use of GERAN/UTRAN (block 324), which is shown in FIG. 3, if selected connections are handed over as described in conjunction with FIG. 5. As shown in FIG. 6, upon completing the CS service, if the UE 102 decides to remain in GERAN/UTRAN 108, determines that a packet switched bearer corresponding to a packet data network connection is suspended (block 601). If there are suspended PS bearers (block 601), the UE 102 resumes the suspended PS bearers, which results in resuming the PS bearers for the PDN connections that the UE 102 did not hand over to the non-3GPP access network 106 (block 602). The UE 102 may also perform a hand over of one or more or all the PDN connections from the non-3GPP access network 106 to GERAN/UTRAN 108 (block 604).

Figure 7:
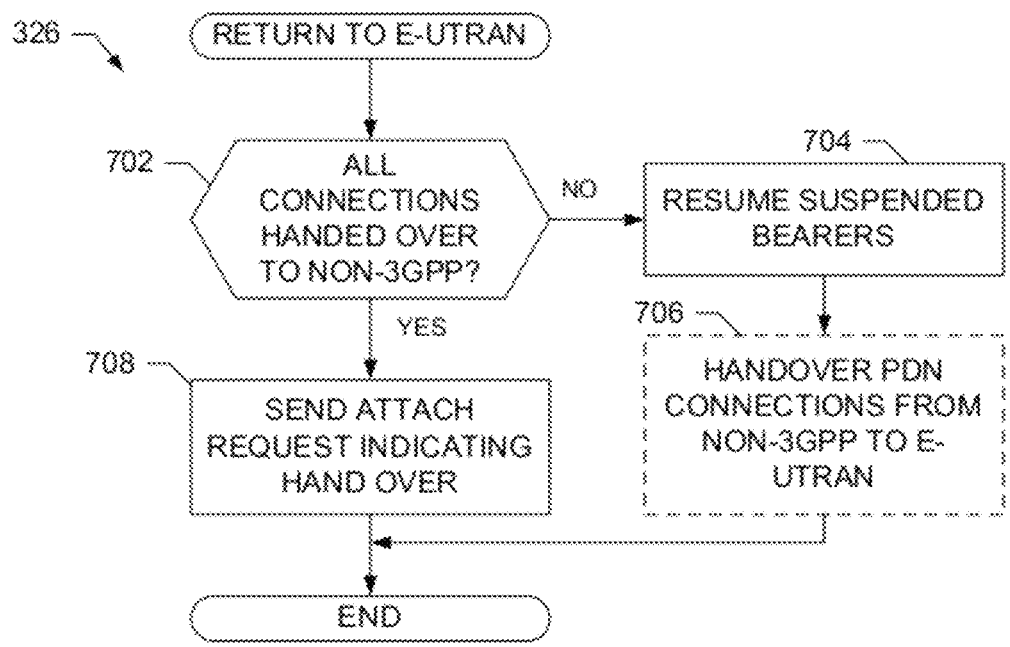
FIG. 7 is a flowchart of an example use return to E-UTRAN process that may be carried out at least partially by communication equipment.

FIG. 7 is a flow diagram of a process for returning to E-UTRAN (block 326), which is shown in FIG. 3, if selected connections are handed over as described in conjunction with FIG. 5. As shown in FIG. 7, upon completing the CS service, if the UE 102 decides to return to E-UTRAN 104, the UE 102 determines if all connections were handed over to the non-3GPP access network 106 and that a packet data network connection is to resume 3GPP access (e.g., E-UTRAN or GERAN) (block 702). If not all connections were handed over (block 702), the suspended bearers are resumed according to a procedure for returning to E-UTRAN defined in TS 23.272 based on the current procedures (block 704). The UE may also perform a hand over of one or more or all the PDN connections from the non-3GPP access network 106 to E-UTRAN 104 (block 706). If all the PDN connections had been handed over to the non-3GPP access network 106 (block 702), the UE 102 triggers a procedure (e.g., sends an attach request to the MME 112) indicating "handover" in the Attach Type IE (block 708).

The MAPCON procedures are transparent to the CSFB, in the sense that the MAPCON procedures do not impact CSFB and CSFB does not impact MAPCON procedures. The PS bearers for the PDN connections left over E-UTRAN or GERAN/UTRAN remain in suspended mode even after some PDN connections have been moved to a non-3GPP access network, but the respective bearers remain in suspended mode.

The solution described above for moving selected connections to the non-3GPP access network 106 is more suitable to the scenarios in which the UE 102 uses more than one PDN to access services over E-UTRAN 104, GERAN/UTRAN 108 and the non-3GPP access network 106, in which case the UE 102 can move one or more PDNs while leaving one in suspended more over E-UTRAN 104.

FIG. 7A shows example changes that may be made to 23.272[1] for returning to E-UTRAN after hand over to a non-3GPP access network. The changes of FIG. 7A apply to 23.272[1] in addition to the previous changes to 23.272[1] but solely for Hand Over to non-3GPP Access Network (and for Hand Over to non-3GPP Access Network-Selected Connections if by the time the UE returns back to E-UTRAN the UE has handed over all the PDN connections to a non-3GPP access network). This example implements a mechanism to perform the come-back to E-UTRAN once the CS service over 2G/3G is completed by performing a combined registration over E-UTRAN indicating that it is an handover so that the PDN connections are handed back to 3GPP.

FIG. 7B shows example changes that may be made to 23.272[1] for returning to E-UTRAN after hand over of selected connections to a non-3GPP access network. The changes of FIG. 7A apply to 23.272[1] in addition to the previous changes to 23.272[1] but solely for Hand Over of selected connections to non-3GPP Access Network, where at the end of CS service the UE returns to E-UTRAN and resumes the suspended PS bearer for the PDN connection that was left over E-UTRAN, and then may trigger the handover of the other PDN connections back to E-UTRAN.

FIG. 7C shows example changes that may be made to 23.272[1] for returning to E-UTRAN after hand over of selected flows to a non-3GPP access network. The changes of FIG. 7A apply to 23.272[1] in addition to the previous changes to 23.272[1] but solely for Hand Over of selected flows to non-3GPP Access Network, where at the end of CS service the UE returns to E-UTRAN and resumes the suspended PS bearer for the Internet Protocol (IP) flow(s) belonging to the PDN connection(s) that was (were) left over E-UTRAN, and then may trigger the handover of the other IP flows back to E-UTRAN.

FIG. 7D shows example changes that may be made to 23.401 for returning to E-UTRAN after hand over to a non-3GPP access network or when selected flows have been handed over and/or when some or all PDN connections have been handed over.

Hand Over to Non-3GPP Access Network-Selected Flows

As explained above, a subset or all connections may be handed over from E-UTRAN 104 to the non-3GPP access network 106. However, it is also possible that only selected IP flows be handed over to the non-3GPP access network 106. One manner in which selective connections may be handed over is through the use of IP flow mobility (IFOM) features to allow the UE 102 to hand over selected IP flows to the non-3GPP access network 106, while maintaining other IP flows suspended in the SGW 110, the MME 112, and the PDN-GW 114 in E-UTRAN 104. This could be one IP flow of one PDN connection or multiple IP flows, or one IP flow or multiple IP flows of multiple PDN connections.

Figure 8:
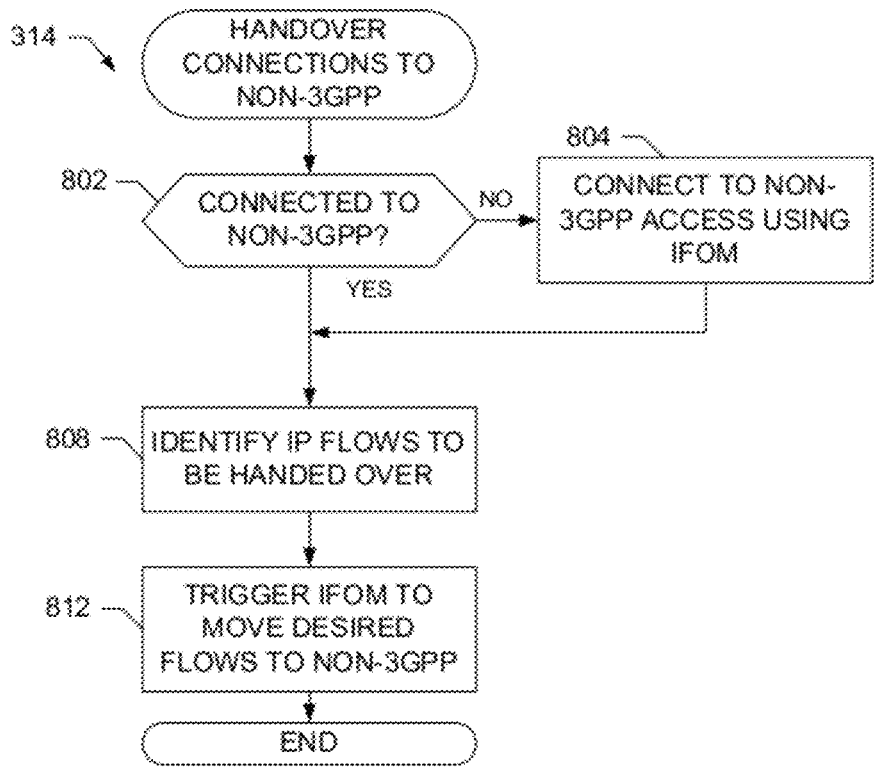
FIG. 8 is a flowchart of a third example hand over connections process that may be carried out at least partially by communication equipment.

As shown in FIG. 8, which is a flow diagram of a process to hand over connections to the non-3GPP access network (block 314), the selective hand over of flows may be carried out by determining if the UE 102 is connected to the non-3GPP access network 106 (block 802). If upon CSFB triggering the UE 102 is not connected on the non-3GPP access network 106 (block 802), the UE 102 gains connectivity to the non-3GPP access network 106 using IFOM procedures, thereby adding a new access to the PDN connections (block 804). The IP flows to be handed over are then identified (block 808). IP flow mobility procedures are then triggered to move any additional desired IP flows to the non-3GPP access network 106 (block 812).

If upon CSFB triggering the UE 102 is already connected to the non-3GPP access network 106, the UE 102 carries out the functionality represented in blocks 808 and 812, as described above.

The PS bearers corresponding to the IP flows that are suspended are suspended in the SGW 110, the MME 112, and PDN GW 114, as per conventional CSFB procedures. The PDN GW 114 may mark each of the IP flows being suspended as "suspended", and when the UE 102 hands over one or more of the suspended IP flows, the PDN GW 114 marks the one or more IP flows handed over to non-3GPP as "not suspended" or unmarks the one or more IP flows.

FIG. 8A shows example changes that may be made to TS23.272 for CS Fallback Triggering using IFOM for a mobile originating call in active mode when packet switched hand over is supported. In the example of FIG. 8A, the UE does suspend the packet switched bearers that remain over E-UTRAN, whereas in prior cases the UE may or may not suspend such bearers.

FIG. 8B shows example changes that may be made to TS23.272 for CS Fallback Triggering using IFOM for a mobile terminating call in idle mode.

FIG. 8C shows example changes that may be made to TS23.272 for CS Fallback Triggering using IFOM for a mobile terminating call in active mode when packet switched hand over is not supported.

FIG. 8D shows example changes that may be made to 23.261 for hand over of selected flows to non-3GPP access with IP flows suspended in the PDN gateway.

Figure 9:
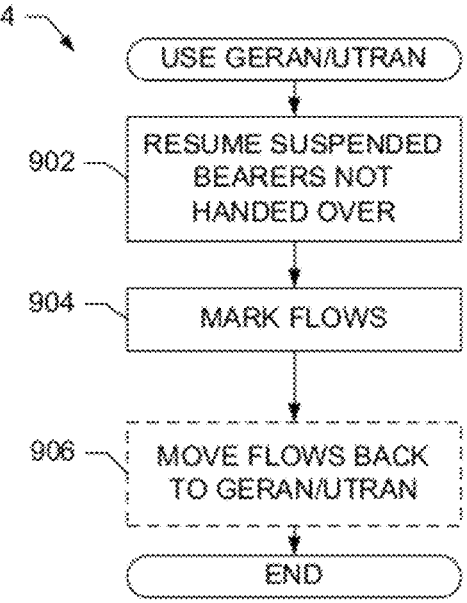
FIG. 9 is a flowchart of a second example use GERAN/UTRAN process that may be carried out at least partially by communication equipment.

FIG. 9 is a flow diagram of a process for using GERAN/UTRAN 324, which is shown in FIG. 3, if selected flows are handed over as described in conjunction with FIG. 8. As shown in FIG. 9, upon completing the CS service, if the UE 102 decides to remain in GERAN/UTRAN 108, the UE 102 resumes the suspended PS bearers which results in the UE 102 resuming the PS bearers for the IP flows of the PDN connection(s) that the UE 102 did not hand over to the non-3GPP access network 106 (block 902). When the UE 102 resumes the PS bearers, the PDN GW 114 marks the one or more suspended IP flows as "not suspended" or unmarks the one or more IP flows (block 904). The UE 102 may also perform IP flow mobility of one or more or all IP flows of one or more PDN connections from the non-3GPP access network 106 to GERAN/UTRAN 108 (block 906).

As with the selected connections discussed above, if the UE 102 is to return to E-UTRAN after handing over flows as described above, the UE 102 carries out a process as described in conjunction with FIG. 7.

If the UE 102 accesses PS services over E-UTRAN 104 using more than one PDN connection, the UE 102 can uses a combination of IFOM and MAPCON mechanisms (i.e., the selective connections and selective flows concepts described above). The UE 102 can move one or more PDN connections to the non-3GPP network access 106, maintaining at least one PDN connection, which has been suspended, over E-UTRAN 104 and/or GERAN/UTRAN 108, and for such at least one PDN connection the UE 102 can hand over one or more IP flows to the non-3GPP network access 106 but maintains at least one IP flow over E-UTRAN 104.

The IFOM procedures described above are transparent to the CSFB, in the sense they do not impact CSFB and CSFB does not impact IFOM procedures. The IP flows remaining over E-UTRAN 104 and/or GERAN/UTRAN 108 are not active after some IP flows have been moved to non-3GPP access network 106, but the respective bearers remain in suspended mode.

When the UE 102 that has performed the CSFB to GERAN/UTRAN 108 wants to move back to E-UTRAN 104, the UE 102 needs to perform the procedures defined in TS 23.272 in section 6.5 to resume the PS bearers for the connection(s) that was (were) left with suspended bearers over E-UTRAN 104 and/or GERAN/UTRAN 108. The UE 102 may also trigger IP flow mobility of one or more of the IP flows from the non-3GPP access network 106 to E-UTRAN 104 (e.g. using mechanisms defined in IFOM procedures).

Moving flows as described above is advantageous in scenarios where the UE 102 uses one PDN/APN to access services over E-UTRAN 104, UTRAN/GERAN 108, and the non-3GPP access network 106, in which case in order for the UE 102 to maintain some applications active (not suspended) during the CS service the UE 102 must be able to move at least one IP flow to the non-3GPP access network 106.

UE Configuration

In any of the foregoing, it may be advantageous for the network (e.g. the HPLMN) to provide configuration information to the UE 102.

The configuration information make take the form of a management object indicating whether a hand over to the non-3GPP access network 106 shall/should/shall not be executed during the CSFB procedure, or after the CS Fall-back procedure is completed and for which CS services the CSFB shall be performed (e.g. voice or LCS or USSD, etc.).

Upon performing CSFB for a CS Service, the UE 102 that is configured to move PS traffic of active PDN connections to the non-3GPP access network 106 when the UE 102 performs CSFB. Moving the PS traffic of active PDN connections to the non-3GPP access network 106 includes performing the hand over of all PDN connections from a 3GPP access (e.g., E-UTRAN 104) to the non-3GPP access network 106, performing the hand over of one or more PDN connections from a 3GPP access (e.g., E-UTRAN 104) to the non-3GPP access network 106, performing IP flow mobility of one or more IP flows of one or more PDN connections from a 3GPP access (e.g., E-UTRAN 104) to the non-3GPP access network 106.

The UE may be provided with such configuration information through a Management Object defined for such purpose, or as part of the ANDSF (Access Network Discovery and Selection Function) management object.

Support of Hand Over and Impact on UE that has Performed CSFB

During a hand over between E-UTRAN 104 and the non-3GPP access network 106, independently of the IP interface used to obtain access (i.e., S2a, S2b or S2c) to the non-3GPP access network 106 and the type of non-3GPP access network 106, at the end of the procedure each of the PDN GWs 114 (in case the UE 102 is connected to more than one PDN through more than one PDN GW 114) initiates one of two procedures: (1) a PDN GW Initiated PDN Disconnection procedure over the 3GPP access network 106 as defined in clause 5.6.2.2 of TS 23.402 (which is incorporated herein by reference) (i.e., when GTP is used) or (2) the PDN GW Initiated Bearer Deactivation procedure as defined in clause 5.4.4.1 of TS 23.401 (which is incorporated by reference) (i.e. when PMIP is used).

The S2a IP interface provides a user plane with related control and mobility support between the non-3GPP access network 106 and the gateway 114. The S2a IP interface is based on Proxy Mobile IP. The S2b IP interface provides the user plane with related control and mobility support between evolved an Packet Data Gateway (ePDG) (not shown) and the PDN GW 114. The S2c IP interface provides the user plane with related control and mobility support between the UE 102 and the PDN GW 114.

If the UE 102 was combined attached to E-UTRAN 104, the hand over and its associated procedures causes the MME 112 to detach the UE 102 from E-UTRAN 104. Additionally, the hand over and associated procedures also causes the MME 112 to send a request to the MSC 116 to detach the UE 102 from the CS domain (e.g., the MME 112 through the SGs interface) instructs the MSC 116 to disconnect the UE 102 from GERAN/UTRAN 108).

For example, when the UE 102 performed a combined attach/TAU over E-UTRAN 104, an SGs association was created between the MME 112 and the MSC 116 that allowed the MME 112 to register (i.e., an IMSI-attach) the UE 102 with the MSC 116. Conventionally, when in CSFB and the UE 102 cannot perform a PS HO (for example, because PS services are not available and DTM is not operational), the UE 102 suspends all the PS bearers to the GERAN/UTRAN 108 with explicit signaling that reaches the MME 112, the SGW 110, and the PDN-GWs 114. For as long as the UE remains in CS domain, as specified in TS 23.272 the MME 112 maintains an active status for the UE 102 (according to what specified in TS 23.272). However, when the MME 112 detaches the UE 102 (independent of the reason), the MME 112 releases the status for the UE 102 and sends an IMSI Detach Indication to the MSC 112 to detach the UE 102 and release the SGW association.

Based on the foregoing, if for any reason a UE 102 that is (1) combined registered/attached to E-UTRAN 104, (2) has performed CSFB and is now in the CS domain, and had to perform the GPRS suspend procedure, triggers an HO of the PS connection from E-UTRAN 104 to the non-3GPP access network 106 (as described above), then based on current procedures (i.e., the combination of the procedures for handover from E-UTRAN 104 to the non-3GPP access network 106 (as specified in TS 23.272), and bearer deactivation and PDN disconnection specified in TS 23.402, and MME-initiated detach in of TS 23.272) this operation would trigger the UE 102 to detach from both the E-UTRAN 104 and the CS domain (e.g., GERAN/UTRAN 108), thus dropping the CS services the UE 102 is accessing. Under these conditions, the MME 112 will not be able to signal the detach to the UE 102, because now the UE is connected to 2G/3G (e.g., GERAN/UTRAN 108) with the MSC 116, but the MME 112 detaches the UE 102 through instructions to the MSC 116 nonetheless because, as a result of the PDN GW 114 triggering the PGW initiated bearer deactivation procedure of TS 23.401, the MME 112 needs to clean up the network context. As per CSFB procedures in TS 23.272, upon detaching the UE 102, the MME 112 sends an IMSI Detach to the MSC 116. The IMSI Detach causes the disconnection of the UE 102 over the CS domain because the IMSI Detach causes the MSC to release the UE context. Note that this is not an issue in normal hand over of PDN connections between E-UTRAN 104 and the non-3GPP access network 106 because the UE 102 does not have an active connection over the CS domain and, therefore, cannot be disconnected via the MSC 116.

Controlled IMSI Detach

As explained above, after the UE 102 performs CSFB, the hand over of PS services to the non-3GPP access network 106 cause disruption of the CS services (e.g., a voice call) in progress. In one example, to address this issue upon deactivation of all the PDN connections of the UE 102 in the MME 112 upon performing the handover to the non-3GPP access network 106, the MME 112 does not send an IMSI detach to the MSC 116. Thus, after CSFB, a UE 102 hand over to the non-3GPP access network 106 does not cause disruption of CS services that are already in operation.

Figure 10:
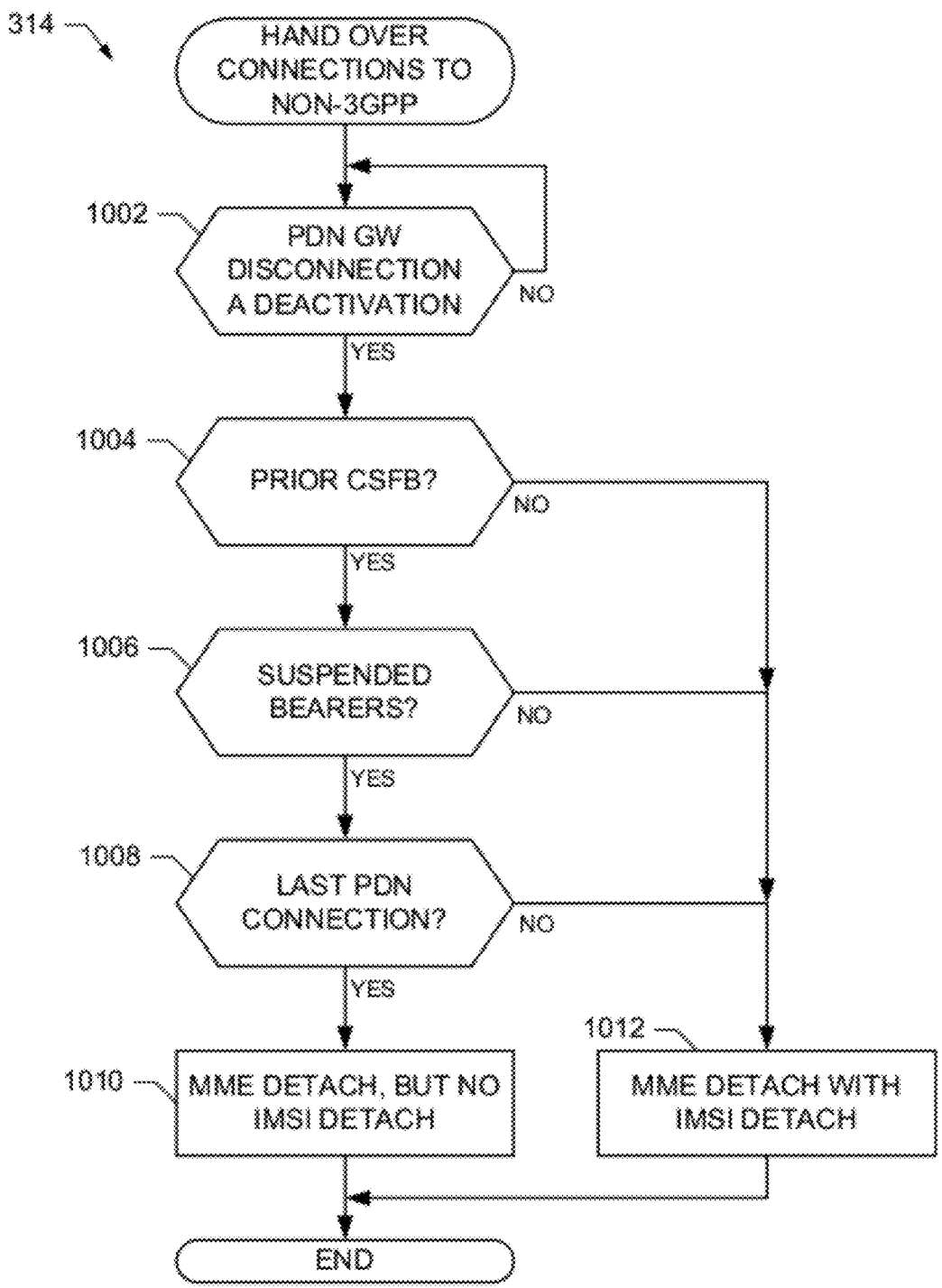
FIG. 10 is a flowchart of a second example process that may be carried out at least partially by communication equipment to facilitate hand overs in the example communication system of FIG. 1.

As shown in the flow diagram of FIG. 10, if the PDN GW 114 initiates either a PDN GW Initiated PDN Disconnection procedure over the 3GPP access (e.g., over E-UTRAN 104) as defined in clause 5.6.2.2 of TS 23.402 (i.e. when GTP is used) or the PDN GW Initiated Bearer Deactivation procedure as defined in clause 5.4.4.1 of TS 23.401 (i.e., when PMIP is used) (block 1002), if the UE 102 previously performed CSFB (block 1004) and the UE 102 suspended the EPS bearers pursuant to performing CSFB (block 1006) and the request is to disconnect the last PDN connection for the UE 102 (block 1008), then the MME 112 detaches the UE 102 but does not send the IMSI detach request to the MSC/VLR 116 (block 1010). Alternatively, the MME 112 detaches and sends the IMSI detach request to the MSC/VLR 116 (block 1012).

Handling of Loss of Non-3GPP Coverage After Hand Over

The mechanisms described above enable the UE 102 to hand over some or all data connections from E-UTRAN 104 to the non-3GPP access network 106. However, an issue may arise when during CSFB all PS services have been handed over to the non-3GPP access network 106, either through the use of MAPCON, IFOM, or any other technique.

Assuming that the UE 102 has performed CSFB and has suspended the EPS bearers, and has decided to handover the PDNs corresponding to the suspended EPS bearers to the non-3GPP access network 106. As described above, the UE 102 is then detached from E-UTRAN 104 by the MME 112. The UE 102 operates properly as long as the UE 102 is within coverage of the non-3GPP access network 106. However, if the UE 102 fall out of coverage of the non-3GPP access network 106 issues may arise. For example, in such a case (1) the UE 102 is active on the CS domain in GERAN/UTRAN 108 and (2) the UE 102 cannot communicate directly with the MME 112 because the UE 102 cannot connect to E-UTRAN 104 while connected to the CS domain. As a result, the UE 102 cannot hand over the PDN connections from the non-3GPP access network 106 back to E-UTRAN 104. Additionally, the UE 102 is not capable of exchanging data on the PDN connections because the UE 102 outside of non-3GPP access network coverage, and the PDN GWs 114 can release the connections after a period of inactivity. In this scenario, if the UE 102 terminates the CS service and decides to resume the EPS bearers while in GERAN/UTRAN 108, there will be no EPS bearers to resume. Alternatively, if the UE 102 terminates the CS service and decides to move back to E-UTRAN 104, the UE 102 cannot resume the PS services and has to re-register with the network. However, in this case in particular the UE 102 does not know whether it shall perform a regular combined attach/TAU (e.g., in case the state for the previous PDN connections has been completely released, including at the PDN GWs 110, in which case the UE 102 will be assigned new IP addresses) or whether the UE 102 shall perform a "hand over" combined attach/TAU (e.g., in case the state for the previous PDN connections has not been completely released, e.g. at the PDN GWs 114, so that the MME 112 can reconnect the PDN connections with the correct PDN GWs 114).

Maintaining Attachment and Information

Based on the foregoing issue related to the UE 102 falling out of non-3GPP access network coverage, it would be desirable for the PDN connections to not be released completely and to allow the UE 102 to either resume the EPS services in GERAN/UTRAN 108 when the UE 102 terminates the CS service and decides to remain in GERAN/UTRAN 108, or to resume the EPS services in E-UTRAN 104 when the UE 102 terminates the CS service and decides to reselect to E-UTRAN 104, instead of forcing the UE 102 to re-register with the network and forcing the MME 112 to re-establish the PDN connections.

Figure 11:
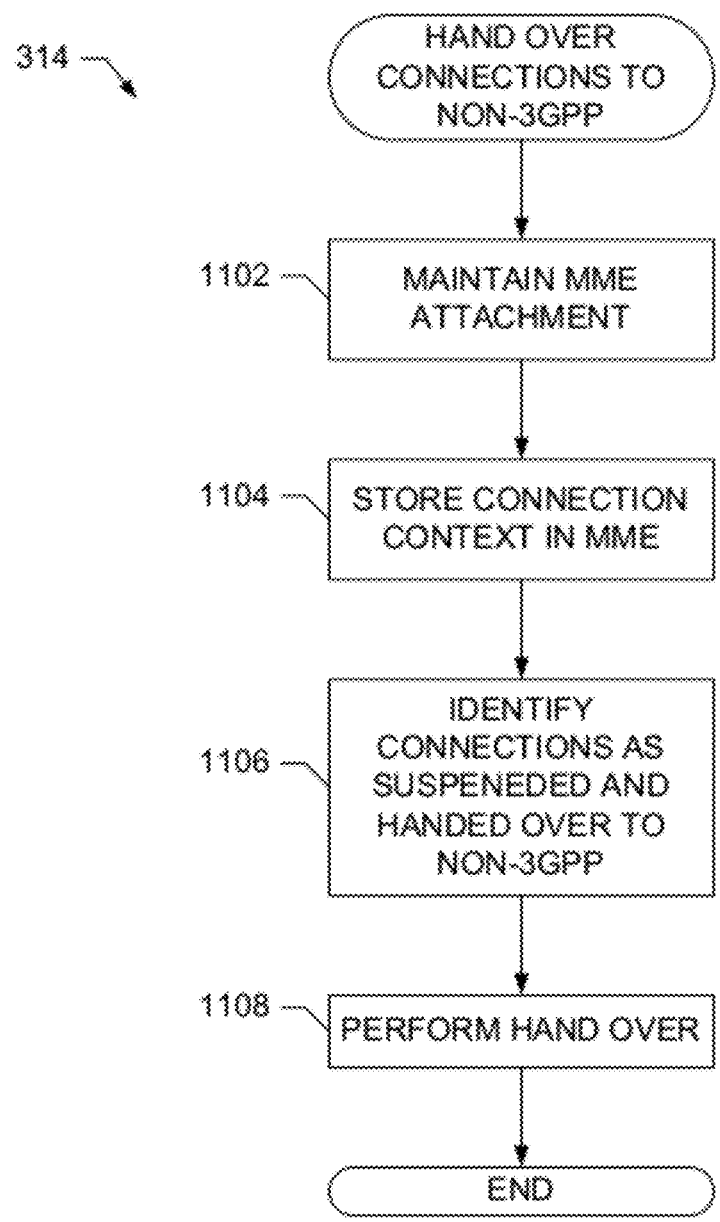
FIG. 11 is a flowchart of a third example process that may be carried out at least partially by communication equipment to facilitate hand overs in the example communication system of FIG. 1.

Referring to FIG. 11, a process 314 to address the above and other issues is shown. During the process 314, the MME 112 attachment to the UE 102 is maintained when the UE 102 performs the handover of one or more or all the PDN connections or the UE 102 performs the handover of one or more or all the IP flows to the non-3GPP access network 106 pursuant the UE 102 performing CSFB (block 1102). The MME 112 maintains the PDN connection information and contents (block 1104), and the MME 112 marks the corresponding PDN connections as "suspended EPS bearers handed over to non-3GPP" (the SGW 110 and the PDN GW 114 also create a new state "suspended EPS bearers handed over to non-3GPP" and act accordingly to the status) (block 1106). This allows the UE 102 to resume them after the CS service is completed without the need for the UE 102 to re-establish the PDN connections from scratch, both if the UE 102 remains in GERAN/UTRAN 108 and if the UE 102 reselects to E-UTRAN 104. The hand over is then carried out (block 1108).

New Status in MME Based on PDN GW Request

To handle the loss of non-3GPP coverage after hand over to a new EPS bearer, a new EPS bearers/PDN connection status in the MME 112 is established based on PDN GW 114 request. In such a case, after the UE 102 has performed CSFB, and the UE 102 has suspended the EPS bearers, and triggered the HO to the non-3GPP access network 106, during the HO procedure the PDN GW 114 knows that the bearers have been suspended and therefore sends signaling to the MME 112 (either to disconnect the PDN connections or modify the bearers) indicating to the MME 112 that this is a special case and that the MME 112 shall not release the PDN connections context. The MME 112 then does not release the context for the PDN connections but associates a new status "suspended PDN connection over non-3GPP" or "suspended EPS bearer over non-3GPP" to the PDN connections that have been handed over to non-3GPP.

Figure 12:
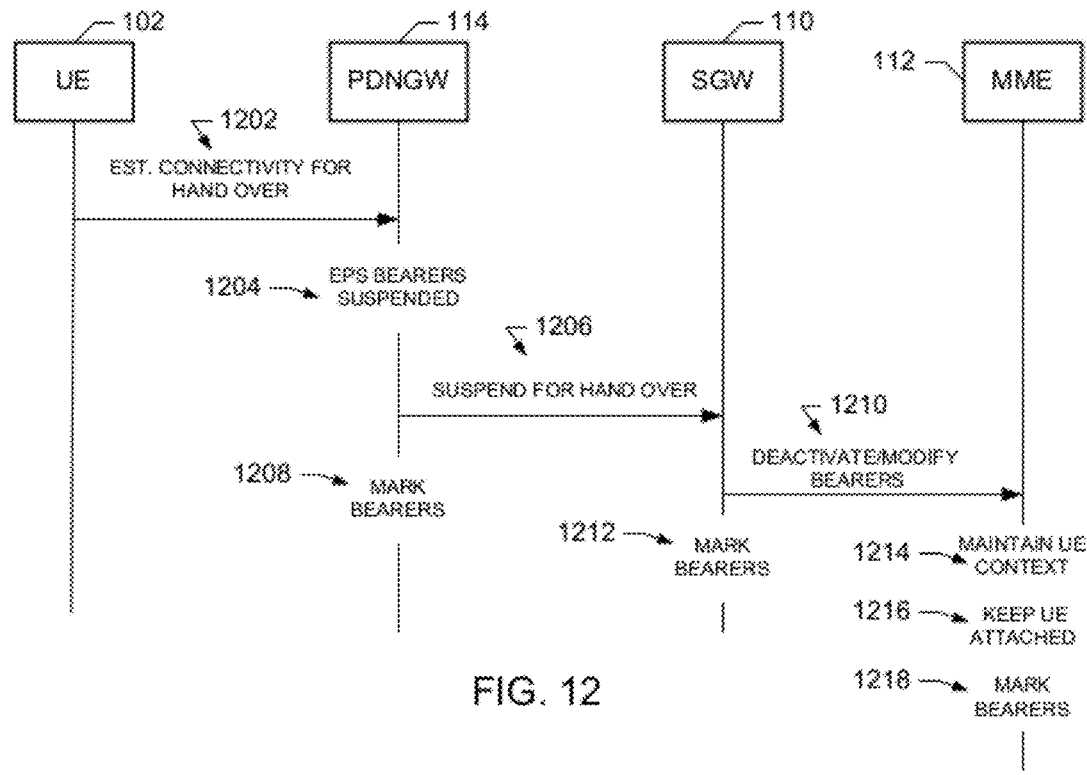
FIG. 12 is a diagram illustrating an example communication flow of various network components during a hand over.

FIG. 12 shows a connection flow that occurs after the UE 102 has performed CSFB and the UE 102 has performed a GPRS suspend procedure to suspend the EPS bearers. The UE 102 performs a set of procedures (e.g., attach over the non-3GPP access network) indicating hand over. These procedures result in the PDN GW 114 receiving a request to perform the hand over 1202. When the S2c interface is used, it is the UE 102 that makes the request to the PDN GW 114, as shown in FIG. 12. However, in other situations, it can be the UE 102 that causes the PDN-GW 114 to receive such a message from other network entities. The PDN GW 114 determines that the EPS bearers corresponding to the one or more PDN connections are suspended 1204. Subsequently, the PDN GW 114 performs a PDN GW initiated bearer deactivation procedure, or a PDN GW initiated bearer modification procedure for each of the one or more PDN connections by sending a request to the SGW 110 1206 and by providing an indication that the request is for suspended bearers being handed over to a non-3GPP access. The PDN GW 114 then marks the EPS bearers and/or PDN connections corresponding to the one or more PDN connections being handed over to the non-3GPP access network 106 as "suspended PDN connection over non-3GPP" or "suspended EPS bearer over non-3GPP" 1208.

The SGW 110 then performs the PDN GW initiated bearer deactivation procedure or the PDN GW initiated bearer modification procedure for each of the one or more PDN connections by sending a request to the MME 112, as shown at reference numeral 1210. The SGW 110 also provides an indication that the request is for suspended bearers being handed over to the non-3GPP access network 106.

The SGW 110 marks the EPS bearers and/or PDN connections corresponding to the one or more PDN connections being handed over to non-3GPP as "suspended PDN connection over non-3GPP" or "suspended EPS bearer over non-3GPP" 1212.

In response to the request from the SGW 110, the MME 112 maintains the UE context information for each of the one or more PDN connections 1214. Additionally, the MME 112 keeps the UE attached 1216 and marks the EPS bearers and/or PDN connections corresponding to the one or more PDN connections being handed over to non-3GPP as "suspended PDN connection over non-3GPP" or "suspended EPS bearer over non-3GPP" 1218.

Of course numerous variations on the foregoing are possible. For example, in one variation the MME 112 maintaining the UE context information for each of the one or more PDN connections includes not detaching the UE 102 if all the PDN connections are handed over to a non-3GPP access. Another variation includes the MME 112 maintaining the UE context information for each of the one or more PDN connections includes the MME marking the EPS bearers and/or PDN connections corresponding to the one or more PDN connections being handed over to non-3GPP as "suspended PDN connection over non-3GPP" or "suspended EPS bearer over non-3GPP."

In another variation, the UE 102 triggering the handover of one or more PDN connections to the non-3GPP access network 106 includes the UE handing over one or more IP flows of one or more PDN connections to the non-3GPP access network 106.

A variation of the above, where the PDN GW 114 and SGW 110 sending a request and by providing an indication that the request is for suspended bearers being handed over to the non-3GPP access network 106 includes the PDN GW 114 and SGW 110 including a Cause indication set to "RAT changed from 3GPP to Non-3GPP for suspended bearers."

A concept in which the UE 102 maintains the E-UTRAN and GERAN/UTRAN NAS context information pursuant to the UE 102 performing CSFB, and the UE 102 performing the GPRS Suspend procedure to suspend the EPS bearers and the UE performing the handover of PDN connections to the non-3GPP access network 106. In a variation of the above, the UE 102 maintaining the E-UTRAN and GERAN/UTRAN NAS context information for the PDN connections being handed over to the non-3GPP access network 106 includes the UE 102 marking the E-UTRAN and GERAN/UTRAN NAS context information for the PDN connections being handed over to non-3GPP as "suspended PDN connection over non-3GPP" or "suspended EPS bearer over non-3GPP." In a variation of the above, the UE 102 maintaining the E-UTRAN and GERAN/UTRAN NAS context information for the PDN connections being handed over to the non-3GPP access network 106 includes the UE entering a state "BEARER CONTEXT SUSPENDED ON NON-3GPP ACCESS."

In a variation of the above, the UE 102 maintaining the E-UTRAN NAS context information for the PDN connections being handed over to the non-3GPP access network 106 includes maintaining the identity of the MME 112 the UE 102 was registered with when CSFB was triggered. In a variation of the above, the UE 102 maintaining the E-UTRAN NAS context information for the PDN connections being handed over to the non-3GPP access network 106 includes the UE 102 maintaining the E-UTRAN NAS context until the UE 102 resumes the PS bearers over GERAN/UTRAN 108. A variation of the above, in which the UE 102 maintaining the E-UTRAN and GERAN/UTRAN NAS context information includes the UE 102 maintaining the context of the EPS bearers. A variation of the above, in which the UE 102 maintaining the E-UTRAN and GERAN/UTRAN NAS context information includes the UE 102 maintaining the context until the UE resumes the EPS bearers. A variation of the above, in which the UE 102 maintaining the E-UTRAN and GERAN/UTRAN NAS context information includes the UE 102 maintaining the context until the UE performs PS signaling. A variation of the above, in which the UE 102 performing PS signaling including performing SM signaling defined in TS 24.008 or MM signaling defined in TS 24.008 or ESM signaling defined in TS 24.301 or EMM signaling defined in TS 24.301, all of which specifications are incorporated herein by reference.

In a variation of the above, upon the UE 102 completing the CS service, and the UE 102 having previously handed over the PDN connections to the non-3GPP access network 106 pursuant to performing CSFB, and the UE 102 remaining in the current GERAN/UTRAN cell, the UE 102 resuming the suspended EPS bearers.

In a variation of the above, the UE 102 resuming the suspended EPS bearers includes the SGSN sending a resume request to the SGW 110, and the SGW 110 receiving the indication to resume the EPS bearers, and the SGW 110 determining that the EPS bearers are marked as "suspended PDN connection over non-3GPP" or "suspended EPS bearer over non-3GPP," and the SGW 110 sending the resume indication to the PDN GW 114, and the PDN GW 114 determining that the EPS bearers are marked as "suspended PDN connection over non-3GPP" or "suspended EPS bearer over non-3GPP," and the SGW 110 and the PDN GW 114 resuming the PDN connections and EPS bearers.

In an alternative of the above, the UE 102 resuming the suspended EPS bearers includes the UE 102 sending a Routing Area Update message with indication that the handover of PDN connections from the non-3GPP access network 106 to 3GPP access shall be triggered.

In a variation of the above, the UE 102 providing an indication that the handover of PDN connections from the non-3GPP access network 106 to 3GPP access shall be triggered includes the UE providing a Request Type set to "Handover."

A variation of the above, where the PDN GW 114 resuming the PDN connections and EPS bearers includes the PDN GW 114 triggering handover of bearers/PDN connections to GERAN/UTRAN 108 for the EPS bearers or PDN connections marked as "suspended PDN connection over non-3GPP" or "suspended EPS bearer over non-3GPP."

In a variation of the above, the UE 102 resuming the suspended EPS bearers includes the UE 102 sending a resume request to the SGSN, and the SGSN sending a resume request to the SGW 110, and the SGW 110 sending a resume request to the PDN GW 114, and the PDN GW 114 triggering handover of bearers/PDN connections to GERAN/UTRAN 108 for the EPS bearers or PDN connections marked as "suspended PDN connection over non-3GPP" or "suspended EPS bearer over non-3GPP."

In one variation, the UE 102 returns to E-UTRAN 104, and sends an indication to the MME 112 to resume the EPS bearers, and the MME 112 determines that the EPS bearers are marked as "suspended PDN connection over non-3GPP" or "suspended EPS bearer over non-3GPP," and the MME 112 re-establishes the corresponding PDN connections performs the PDN connectivity establishment procedures defined in TS 23.401 and 24.301 and includes the Handover Indication in the Create Session Request that the MME sends to the SGW 110 and the PDN GWs. This can occur when the UE 102, upon completing the CS service, and the UE 102 having previously handed over the PDN connections to the non-3GPP access network 106 pursuant to performing CS fallback. In this case, the PDN GW 114 determines that the EPS bearers/PDN connections are marked as "suspended PDN connection over non-3GPP" or "suspended EPS bearer over non-3GPP", and the PDN GW 114 completes the PDN connection establishment procedure and deletes the marking "suspended PDN connection over non-3GPP" or "suspended EPS bearer over non-3GPP."

In an alternative of the above, the UE 102 returning to E-UTRAN includes the UE 102 performing the procedure for returning to E-UTRAN defined in 23.272 (procedures 6.5 and 7.6, here copied in section 2.2).

In an alternative of the above, the UE 102 returning to E-UTRAN includes the UE 102 performing an attach procedure including an indication that the handover of PDN connections from the non-3GPP access network 106 to 3GPP access shall be triggered.

In an alternative of the above, the UE 102 sending an indication to the MME 112 to resume the EPS bearers includes the UE 102 providing in a TRACKING AREA UPDATE REQUEST message the EPS bearer context status IE indicating which EPS bearer contexts are marked "suspended EPS bearer over non-3GPP" and shall be re-established by the MME 112.

In an alternative of the above, the UE 102 sending an indication to the MME 112 to resume the EPS bearers includes the UE 102 providing in a SERVICE REQUEST message the EPS bearer context status IE indicating which EPS bearer contexts are marked "suspended EPS bearer over non-3GPP" and shall be re-established by the MME 112.

In an alternative of the above, the UE 102 sending an indication to the MME 112 to resume the EPS bearers includes the UE 102 providing in a TRACKING AREA UPDATE REQUEST message an indication that the hand over of PDN connections from to 3GPP access shall be triggered.

In an alternative of the above, the UE 102 sending an indication to the MME 112 to resume the EPS bearers includes the UE 102 providing in an ATTACH REQUEST message an indication that the handover of PDN connections from the non-3GPP access network 106 to 3GPP access shall be triggered.

In an alternative of the above, the UE 102 sending an indication to the MME 112 to resume the EPS bearers includes the UE 102 providing in a SERVICE REQUEST message an indication that the handover of PDN connections from the non-3GPP access network 106 to 3GPP access shall be triggered.

In an alternative of the above, the UE 102 sending an indication to the MME 112 to resume the EPS bearers includes the UE 102 providing the identity of the MME 112 the UE 102 was connected to before CSFB.

In a variation of the above, the UE 102 providing an indication that the handover of PDN connections from the non-3GPP access network 106 to 3GPP access shall be triggered includes the UE 102 providing a Request Type set to "Handover."

In a variation of the above, the PDN GW initiated bearer modification includes the PDN GW initiated bearer modification without bearer quality of service (QoS) update defined in 3GPP TS 23.401 in section 5.4.3, which is incorporated by reference herein.

In a variation of the above, the PDN GW 114 providing an indication to the SGW 110 and the SGW 110 providing an indication to the MME 112 that the request is for suspended bearers being handed over to the non-3GPP access network 106 includes the PDN GW 114 including a 'Cause' IE in the Delete Bearer Request message or the Update Bearer Request message sent to the SGW 110 and setting the IE to 'RAT changed from 3GPP to Non-3GPP for suspended bearers' if the Delete Bearer Request message is caused when hand over without optimization occurs from 3GPP to the non-3GPP access network 106 and the EPS bearers corresponding to the PDN connection are suspended.

In a variation of the above, the MME 112 marking the EPS bearers and/or PDN connections corresponding to the PDN connections being handed over to the non-3GPP access network 106 as "suspended PDN connection over non-3GPP" includes the MME 112 starting a SUSPENDED-PDN-CONNECTION Timer for each connection marked as "suspended PDN connection over non-3GPP", and the MME 112 deleting the context information for the "suspended PDN connection over non-3GPP" when the timer expires. If the MME 112 deletes the context information for all the UE PDNs, the MME 112 detaches the UE 102 but does not send an IMSI detach to the MSC.

In a variation of the above, the MME 112 marking the EPS bearers and/or PDN connections corresponding to the PDN connections includes the MME 112 maintaining the MM state of the UE 102 to EMM-DEREGISTERED if all the bearers belonging to a UE 102 are released and if the PDN GW 114 sets the 'Cause' IE to 'RAT changed from 3GPP to Non-3GPP for suspended bearers.'

In a variation of the above, the MME 112 deleting the context information for the "suspended PDN connection over non-3GPP" when the SUSPENDED-PDN-CONNECTION Timer expires includes performing an MME 112 initiated PDN disconnection procedure as defined in 3GPP TS 23.401, which is incorporated by reference herein.

In a variation of the above, the UE 102 marking the E-UTRAN and GERAN/UTRAN NAS context information for the PDN connections being handed over to the non-3GPP access network 106 as "suspended PDN connection over non-3GPP" or "suspended EPS bearer over non-3GPP" includes the UE 102 entering the BEARER CONTEXT SUSPENDED ON NON-3GPP ACCESS state.

New Status in MME Based on Bearer Suspension and Hand Over

To handle the loss of non-3GPP coverage after hand over to a new EPS bearer, a new EPS bearers/PDN Connection status in MME 112 established upon EPS bearer suspension and handover to the non-3GPP access network 106. In such case, after the UE 102 has performed CSFB, and the UE 102 has suspended the EPS bearers (and thus the MME 112, SGW 110 and PDN GW 114 know that the bearers are suspended), and the UE 102 triggers the HO to the non-3GPP access network 106, during the HO procedure the MME 112, SGW 110 and PDN GW 114 knows that the bearers have been suspended and therefore treat the handover procedure as a special case. Specifically, the MME 112 does not release the context for the PDN connections but associates a new status "suspended PDN connection over non-3GPP" or "suspended EPS bearer over non-3GPP" to the PDN connections that have been handed over to the non-3GPP access network 106. The SGW 110 and the PDN GW 114 may or may not release the context, depending on the embodiment.

Figure 13:
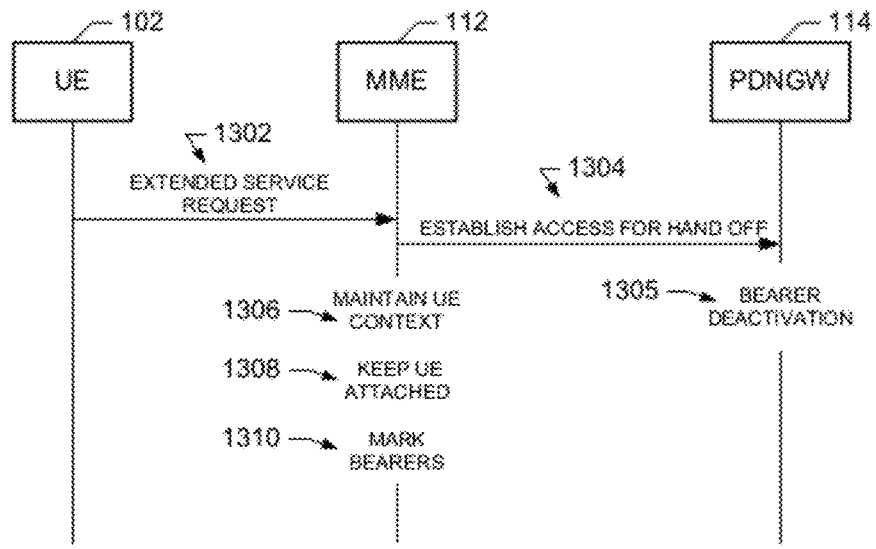
FIG. 13 is a diagram illustrating a second example communication flow of various network components during a hand over.

In this concept, the assumption is that the MME 112 is informed during the GPRS suspend procedure that the EPS bearers are suspended. Alternatively, the assumption is that during the CSFB procedure and the preparation or execution of the Packet Switched Handover from E-UTRAN to the target GERAN/UTRAN, the MME is informed that PS services are not possible at the target GERAN/UTRAN. The concept is very similar to the new status in MME based on PDN GW request described above, but from other points of view. Referring to FIG. 13, a concept is described in which a UE 102 performing CSFB sends an Extended Service Request message to the MME 112 to trigger the CSFB 1302. The MME 112 processes the Extended Service Request, which includes performing the CSFB procedure, determining that the EPS bearers need to be suspended, and the UE 102 triggers the hand over of one or more PDN connections to the non-3GPP access network 106. The PDN GW 114 receiving a request to establish PDN connectivity over the non-3GPP access network 106 with the indication this is a handover for one or more PDN connections 1304. In response to the request 1204, the PDN GW 114 performs the PDN GW initiated bearer deactivation procedure for each of the one or more PDN connections 1305. The MME 112 maintains the UE context information for each of the one or more PDN connections 1306 and does not detach the UE 1308, and marks the EPS bearers and/or PDN connections corresponding to the one or more PDN connections being handed over to non-3GPP as "suspended PDN connection over non-3GPP" or "suspended EPS bearer over non-3GPP" 1310.

A variation of the above where the PDN GW 114 performing the PDN GW initiated bearer deactivation procedure for each of the one or more PDN connections includes the PDN GW 114 determining that the EPS bearers corresponding to the one or more PDN connections are suspended.

A variation of the above where the MME 112 maintaining the UE context information for each of the one or more PDN connections includes not detaching the UE.

A variation of the above in which the UE 102 performing CSFB includes the UE 102 performing the GPRS Suspend procedure to suspend the EPS bearers.

A variation of the above where the PDN GW 114 performing the PDN GW initiated bearer deactivation procedure for each of the one or more PDN connections includes the PDN GW 114 marking the EPS bearers and/or PDN connections corresponding to the PDN connections being handed over to non-3GPP as "suspended PDN connection over non-3GPP" or "suspended EPS bearer over non-3GPP."

A variation of the above where the PDN GW 114 performing the PDN GW initiated bearer deactivation procedure for each of the one or more PDN connections includes the SGW 110 marking the EPS bearers and/or PDN connections corresponding to the PDN connections being handed over to non-3GPP as "suspended PDN connection over non-3GPP" or "suspended EPS bearer over non-3GPP."

The variations described above in the section entitled New Status in MME based on PDN GW Request also apply, but with the following differences.

A variation of the above, where the PDN GW 114 resuming the PDN connections and EPS bearers includes the PDN GW 114 triggering handover of bearers/PDN connections to GERAN/UTRAN 108 for the EPS bearers or PDN connections marked as "suspended PDN connection over non-3GPP" or "suspended EPS bearer over non-3GPP."

In a variation of the above, the UE 102 resuming the suspended EPS bearers includes the UE 102 sending a resume request to the MME 112, and the MME sending a resume request to the SGW 110, and the SGW sending a resume request to the PDN GW 114, and the PDN GW 114 triggering handover of bearers/PDN connections to E-UTRAN 104 for the EPS bearers or PDN connections marked as "suspended PDN connection over non-3GPP."

A variation of the above where the MME 112 maintaining the UE context information for each of the one or more PDN connections includes the MME 112 determining that the UE 102 has performed CSFB and that the UE 102 has handed over one or more PDN connections to the non-3GPP access network 106.

A variation of the above where the MME 112 maintaining the UE context information for each of the one or more PDN connections includes the MME 112 setting the UE status to "SUSPENDED BEARERS" pursuant to the UE performing CSFB and the UE 102 performing the GPRS suspend procedure.

A variation of the above where the MME 112 processing the Extended Service Request message includes the MME 112 storing information that the UE 102 has performed CSFB.

A variation of the above where the MME 112 maintaining the UE context information for each of the one or more PDN connections includes the MME 112 setting the UE status to "SUSPENDED BEARERS" pursuant to the UE 102 performing CSFB and the UE 102 performing the GPRS suspend procedure.

A variation of the above where MME 112 storing information that the UE 102 has performed CSFB includes setting the UE state to BEARER CONTEXT SUSPENDED.

New Status in MME Based on SGW Request

To handle the loss of non-3GPP coverage after hand over to a new EPS bearer, a new EPS bearers/PDN Connection status in MME 112 established based on SGW 110 request. In such case, after the UE 102 has performed CSFB, and the UE 102 has suspended the EPS bearers, the SGW 110 during the suspend procedure informs the MME 112 that the EPS bearers are being suspended. When the MME 112 subsequently receives the request by the PDN GWs to disconnect the PDN connections due to the hand over to the non-3GPP access network 106, the MME 112 does not release the context for the PDN connections but associates a new status "suspended PDN connection over non-3GPP" or "suspended EPS bearer over non-3GPP" to the PDN connections that have been handed over to the non-3GPP access network.

Figure 14:
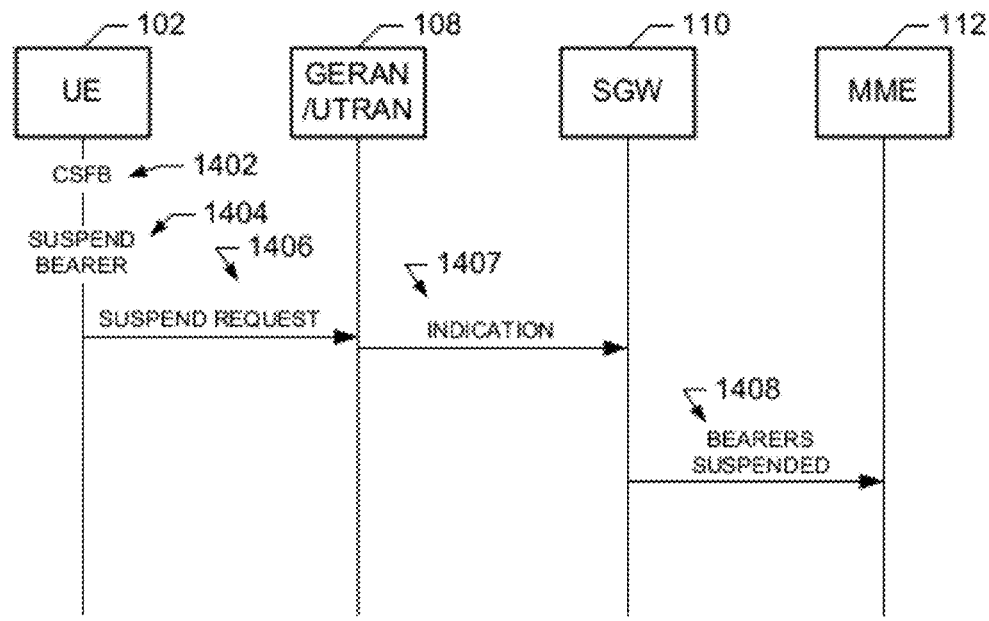
FIG. 14 is a diagram illustrating a third example communication flow of various network components during a hand over.

Referring to FIG. 14, a UE 102 performs CSFB 1402 and suspends EPS bearers 1404 using the GPRS Suspend procedure. The UE 102 sends a suspend request 1406 to GERAN/UTRAN 108. GERAN/UTRAN 108 sends an indication 1407 to the SGW 110. The SGW 110 then sends a message to the MME 112 indicating that the EPS bearers are being suspended 1408.

In a variation of the above, the UE 102 triggering the handover of PDN connections to the non-3GPP access network 106. The PDN GW 114 receives a request to establish PDN connectivity over the non-3GPP access network 106 with the indication this is an hand over, and the PDN GW 114 determining that the EPS bearers corresponding to the PDN connections are suspended. The PDN GW 114 performing the PDN GW initiated bearer deactivation procedure and the PDN GW 114 marking the EPS bearers and/or PDN connections corresponding to the PDN connections being handed over to the non-3GPP access network 106 as "suspended PDN connection over non-3GPP" or "suspended EPS bearer over non-3GPP." The SGW 110 marking the EPS bearers and/or PDN connections corresponding to the PDN connections being handed over to the non-3GPP access network 106 as "suspended PDN connection over non-3GPP" or "suspended EPS bearer over non-3GPP." The MME 112 determining that the EPS bearers corresponding to the PDN connections are suspended, and the MME 112 maintaining the UE context information and not detaching the UE, and the MME 112 marking the EPS bearers and/or PDN connections corresponding to the PDN connections being handed over to non-3GPP as "suspended PDN connection over non-3GPP" or "suspended EPS bearer over non-3GPP."

UE Policy for Handling Loss of Non-3GPP Access Network Coverage

The UE 102 is provisioned with a policy, described in a managed object, indicating whether the UE 102, upon losing connectivity over non-3GPP access pursuant to the UE 102 having performed CSFB and the UE 102 having performed the GPRS suspend procedure and the UE 102 having performed handover of the 3GPP connections to the non-3GPP access network 106, shall maintain the status information for the PDNs and resume them upon completion of the CS service or delete the status.

Signaling Via MSC When Non-3GPP Coverage Fails

After the UE has performed the hand over of the PDN connections to the non-3GPP access network 106 pursuant the UE 102 performing CSFB and the UE loses the non-3GPP access network 106 coverage, the UE 102 using signaling, such as unstructured supplementary service data (USSD) to exchange signaling with the MSC 116 and trigger the MSC 116 to send a signaling message to the MME 112 in order to request the MME 112 to handover the PDN connections from the non-3GPP access network 106 to E-UTRAN 104 and suspend the associated EPS bearers.

This builds on the concepts above and addresses the issue associated with a UE 102 falling out of the non-3GPP access network coverage after CSFB. In particular, this builds on the concepts related to the creation of a new status for the EPS bearer context in the MME and the new EPS bearer status in the UE and the new UE state. This following does not require the creation of a special context in SGW and PDN GW.

Figure 15:
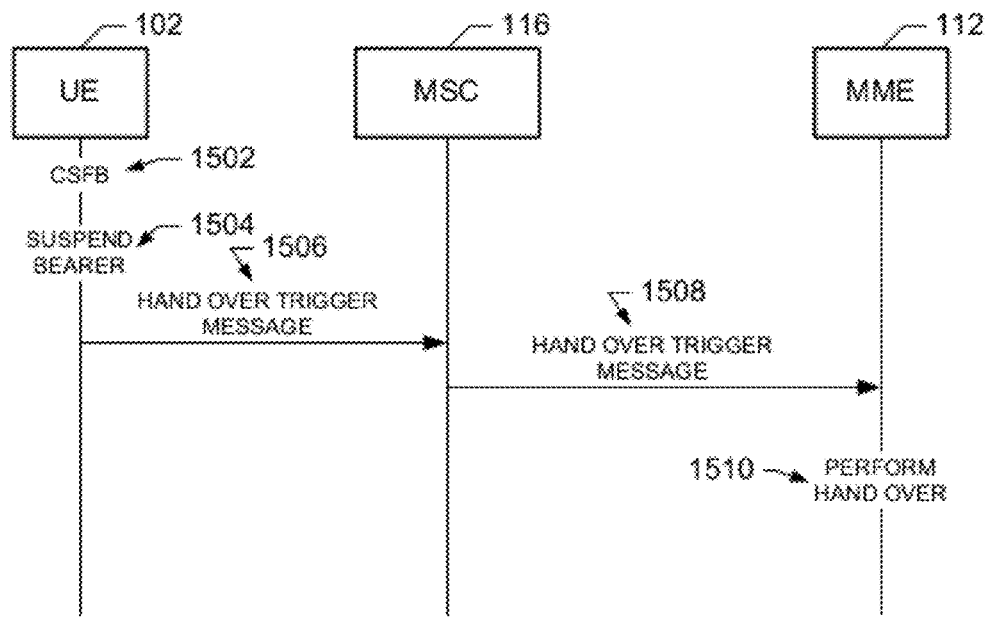
FIG. 15 is a diagram illustrating a fourth example communication flow of various network components during a hand over.

As shown in FIG. 15, a UE 102 performs CSFB 1502 and performs the GPRS Suspend procedure to suspend the EPS bearers 1504. The UE 102 then triggers the handover of PDN connections to the non-3GPP access network 106 and sends a message to trigger the handover of the PDN connections from the non-3GPP access network 106 to E-UTRAN 104 via the MSC 116, as shown at reference numeral 1506. The MME 112 then receiving a message to trigger the hand over of the PDN connections from the non-3GPP access network 106 to E-UTRAN 108 1508. The MME performing the handover procedure for the PDN connection from the non-3GPP access network 106 to E-UTRAN 108, as shown at reference numeral 1510.

A variation of the above, where the UE 102 sending a message to the MME 112 to trigger the handover of the PDN connections from the non-3GPP access network 106 to E-UTRAN 108 includes the UE 102 determining that connectivity over the non-3GPP access network 106 has been lost.

A variation of the above, where the MME 112 performing the handover procedure for the PDN connection from the non-3GPP access network 106 to E-UTRAN 104 includes performing the handover for all the PDN connections of the UE 102. A variation of the above, where the UE 102 sending a message to the MME 112 to trigger the handover of the PDN connections from the non-3GPP access network 106 to E-UTRAN 104 includes the UE 102 indicating which PDN connection shall be handed over.

A variation of the above, where the MME 112 performing the handover procedure for the PDN connection from the non-3GPP access network 106 to E-UTRAN 108 includes performing the handover for the PDN connections indicated by the UE 102.

A variation of the above, where the MME 112 performing the handover procedure for the PDN connection from the non-3GPP access network 106 to E-UTRAN 108 includes the MME 112 determining that the EPS bearers are suspended.

A variation of the above, where the UE 102 sending a message to the MME 112 to trigger the hand over of the PDN connections from the non-3GPP access network 106 to E-UTRAN 108 includes the UE 102 sending an unstructured supplementary service data (USSD) message to the MSC 116.

A variation of the above, where the MME 112 receiving a message to trigger the handover of the PDN connections from the non-3GPP access network 106 to E-UTRAN 104 includes the MSC 116 sending a message to the MME 112 to trigger the handover of the PDN connection from the non-3GPP access network 106 to E-UTRAN 104.

Figure 16:
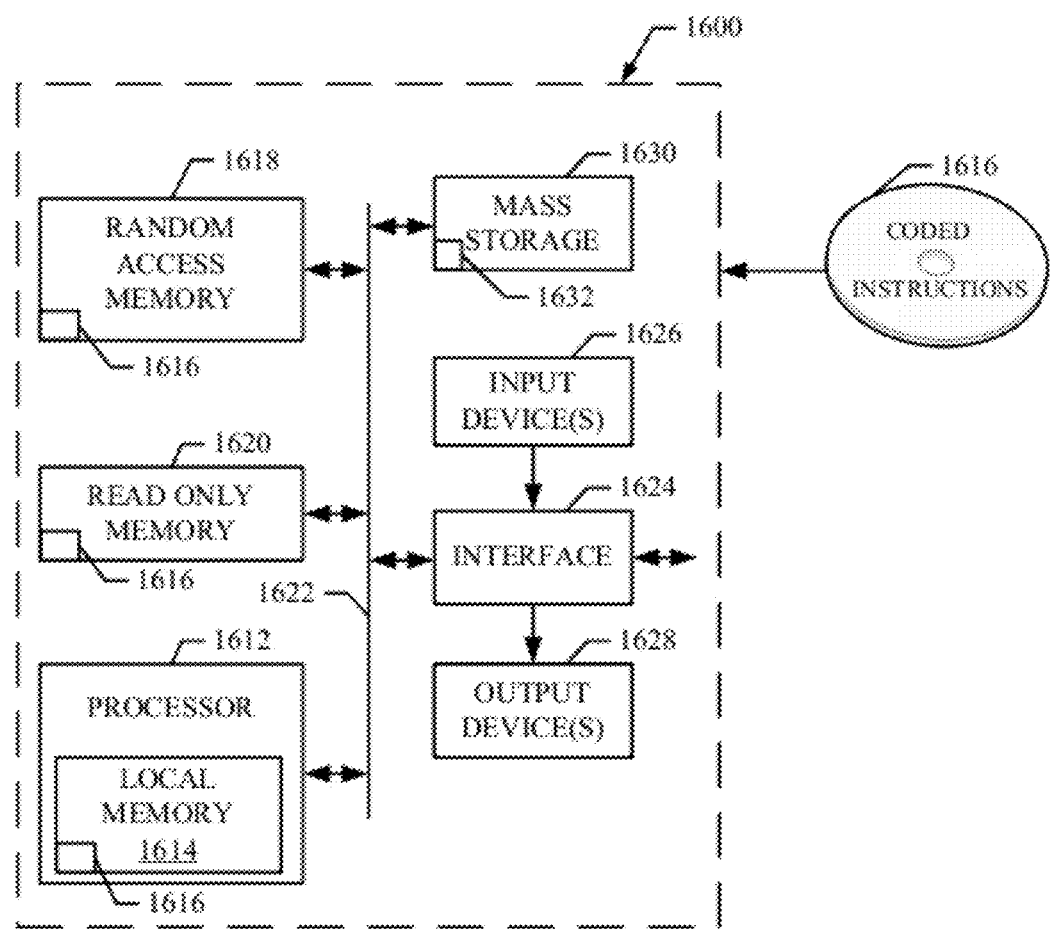
FIG. 16 is a block diagram of an example processing system capable of implementing the apparatus and methods disclosed herein.

FIG. 16 is a block diagram of an example processing system 1600 capable of implementing the apparatus and methods disclosed herein. The processing system 1600 can correspond to, for example, a mobile station processing platform, a network element processing platform, a server, a personal computer, a personal digital assistant (PDA), an Internet appliance, a mobile phone, or any other type of computing device. For example the processing system 1600 may implement the UE 102 and any component of the mobile communication networks shown in FIG. 1 and FIG. 2.

The system 1600 of the instant example includes a processor 1612 such as a general purpose programmable processor, an embedded processor, a microcontroller, etc. The processor 1612 includes a local memory 1614, and executes coded instructions 1616 present in the local memory 1614 and/or in another memory device. The processor 1612 may execute, among other things, machine readable instructions to implement the processes represented in the drawings described above. The processor 1612 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PICO family of microcontrollers, etc. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 is typically controlled by a memory controller (not shown).

The system 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, typically includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the system 1100 also includes one or more non-transitory, computer-readable mass storage devices 1630 for storing software and data. Examples of such mass storage devices 1630 include floppy disk drives, hard drive disks, compact disk drives and digital versatile disk (DVD) drives.

As an alternative to implementing the methods and/or apparatus described herein in a system such as the device of FIG. 16, the methods and or apparatus described herein may be embedded in a structure such as a processor and/or an ASIC (application specific integrated circuit).

FIGS. 17A-17B show example specification changes to 23.402 and the definition of ANDSF behavior for UE configuration.

FIG. 18 shows example specification changes to 24.302 and the definition of ANDSF behavior.

FIGS. 19A-19C show example specification changes to ANDSF MO for UE configuration.

FIG. 20 shows example specification changes to 44.018 regarding GPRS Suspension procedure. These changes apply to concepts Hand Over to non-3GPP Access Network, Hand Over to non-3GPP Access Network-Selected Connections and Hand Over to non-3GPP Access Network-Selected Flows.

FIG. 21 shows example specification changes to 3GPP TS 24.301 for Hand Over to non-3GPP Access Network. These changes apply to the steps the UE needs to perform to return to E-UTRAN after the termination of the CS services and after the UE has handed over all the services to non-3GPP.

FIG. 22 shows example specification changes that may be made for controlled IMSI detach.

FIGS. 23A-23E show example specification changes that may be made for PDN disconnections.

FIG. 24 shows example specification changes that may be made to TS29.274 for SGW and PGW suspension behavior.

FIG. 25 shows example specification changes that may be made to TS29.274 for MME suspension behavior.

FIGS. 26A-26G show example specification changes that may be made to TS29.274 for SGW and PGW and MME.

FIGS. 27A-27J show example specification changes that may be made to 24.301.

FIGS. 28A-28B show example specification changes that may be made to implement the invention disclosed herein.

FIG. 29 shows example specification changes that may be made to implement the invention disclosed herein.

FIGS. 30A-30F show example specification changes that may be used to implement the invention disclosed herein.

FIGS. 31A-31E show example specification changes that may be used to implement the invention disclosed herein.

Finally, although certain example methods, apparatus and articles of manufacture have been described herein, the scope of coverage of this disclosure is not limited thereto. On the contrary, this disclosure covers all methods, apparatus and articles of manufacture fairly falling within the scope of the appended claims either literally or under the doctrine of equivalents.

The foregoing concepts may be implemented in any number of different ways. The changes described may be made to various specifications to implement the various concepts in example manners. The specification changes herein are merely examples. Reference is made to the following specifications all of which are incorporated herein by reference:

[1] 3GPP TS 23.272
[2] 3GPP TS 23.402

[3] 3GPP TS 23.401
[4] 3GPP TS 24.303
[5] 3GPP TR 23.861
[6] 3GPP TS 23.261
[7] 3GPP TS 33.402
[8] 3GPP TS 33.234
[9] 3GPP TS 24.303
[10] 3GPP TS 24.312
[11] 3GPP TS 44.018
[12] 3GPP TS 23.060
[13] 3GPP TS 24.008
[14] 3GPP TS 24.301

What is claimed is:

1. A method in a user equipment (UE), the method comprising:
   initiating a circuit switched fallback (CSFB) operation;
   during the CSFB operation in which a circuit switched service triggers the UE to fall back to a target system, determining to refrain from handing over a packet switched connection from a first system to the target system based on the target system not supporting packet switched service;
   determining that packet switched service is available via a wireless local area network (WLAN), the WLAN being of a radio access technology different from the target system; and
   in response to determining to refrain from handing over the packet switched connection to the target system during the CSFB operation and that packet switched service is available via a wireless local area network (WLAN), handing over the packet switched connection from the first system to the WLAN.

2. The method of claim 1, wherein determining that packet switched service is available via the WLAN comprises determining that the UE is currently connected to the WLAN.

3. The method of claim 1, further comprising starting a suspend procedure for an active packet data network connection.

4. The method of claim 3, wherein the suspend procedure is started before the handing over to the WLAN.

5. The method of claim 1, wherein the handing over the packet switched connection comprises handing over an active packet data network connection.

6. The method of claim 5, wherein the handing over the active packet data network connection occurs when all active packet data network connections are handed over.

7. The method of claim 5, wherein the handing over the active packet data network connection comprises a handover of less than all active packet data network connections.

8. The method of claim 1, wherein the UE is processing a mobile originated call.

9. The method of claim 1, wherein the UE is processing a mobile terminated call.

10. The method of claim 1, wherein the handing over comprises a handover of an Internet Protocol (IP) flow of a packet data network connection.

11. The method of claim 10, further comprising initiating IP flow mobility of the IP flow.

12. The method of claim 11, further comprising maintaining one IP flow on an Evolved Universal Terrestrial Radio Access Network (E-UTRAN).

13. The method of claim 1, further comprising determining that the target system does not support packet switched handover based on determining that the target system does not support dual transfer mode.

14. The method of claim 1, further comprising detecting a need to perform circuit switched fallback to the target system.

15. A user equipment (UE) comprising:
   a memory; and
   at least one hardware processor communicatively coupled with the memory and configured to:
   initiate a circuit switched fallback (CSFB) operation;
   during the CSFB operation in which a circuit switched service triggers the UE to fall back to a target system, determine to refrain from handing over a packet switched connection from a first system to the target system based on the target system not supporting packet switched service;
   determine that packet switched service is available via a wireless local area network (WLAN), the WLAN being of a radio access technology different from the target system; and
   in response to determining to refrain from handing over the packet switched connection to the target system during the CSFB operation and that packet switched service is available via a wireless local area network (WLAN), hand over the packet switched connection from the first system to the WLAN.

16. The user equipment of claim 15, wherein determining that packet switched service is available via the WLAN comprises determining that the UE is currently connected to the WLAN.

17. The user equipment of claim 15, wherein the at least one hardware processor is further configured to start a suspend procedure for an active packet data network connection.

18. The user equipment of claim 17, wherein the suspend procedure is started before the handing over to the WLAN.

19. The user equipment of claim 15, wherein the handing over the packet switched connection comprises handing over an active packet data network connection.

20. The user equipment of claim 19, wherein the handing over the active packet data network connection occurs when all active packet data network connections are handed over.

21. The user equipment of claim 19, wherein the handing over the active packet data network connection comprises a handover of less than all active packet data network connections.

22. The user equipment of claim 15, wherein the at least one hardware processor is to process a mobile originated call when the at least one hardware processor is to hand over the packet switched connection.

23. The user equipment of claim 15, wherein the at least one hardware processor is to process a mobile terminated call when the at least one hardware processor is to hand over the packet switched connection.

24. The user equipment of claim 15, wherein the handing over comprises a handover of an Internet Protocol (IP) flow of a packet data network connection.

25. The user equipment of claim 24, wherein the at least one hardware processor is further configured to initiate IP flow mobility of the IP flow.

26. The user equipment of claim 25, wherein the at least one hardware processor is further configured to maintain one IP flow on an Evolved Universal Terrestrial Radio Access Network (E-UTRAN).

27. The user equipment of claim 15, wherein the at least one hardware processor is further configured to determine that the target system does not support packet switched handover based on determining that the target system does not support dual transfer mode.

28. The user equipment of claim 15, wherein the at least one hardware processor is further configured to detect a need to perform circuit switched fallback to the target system.

* * * * *

UNITED STATES PATENT AND TRADEMARK OFFICE
CERTIFICATE OF CORRECTION

PATENT NO. : 9,723,528 B2
APPLICATION NO. : 13/237890
DATED : August 1, 2017
INVENTOR(S) : Xinhua Ling, Xiaoming Zhao and Stefano Faccin It is certified that error appears in the above-identified patent and that said Letters Patent is hereby corrected as shown below:

Column 25, Line 19, In Claim 1, delete "fall back" and insert -- fallback --, therefor.

Column 26, Line 10, In Claim 15, delete "fall back" and insert -- fallback --, therefor.

Signed and Sealed this
Twenty-fourth Day of April, 2018

Andrei Iancu
*Director of the United States Patent and Trademark Office*